(12) United States Patent
Maeda et al.

(10) Patent No.: US 6,282,687 B1
(45) Date of Patent: Aug. 28, 2001

(54) IMAGE-PROCESSING APPARATUS

(75) Inventors: Hiroshi Maeda; Toshihiro Okahashi, both of Kashihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/030,426

(22) Filed: Feb. 25, 1998

(30) Foreign Application Priority Data

Feb. 26, 1997 (JP) .................................................. 9-041793
May 7, 1997 (JP) .................................................. 9-117305
Dec. 11, 1997 (JP) .................................................. 9-341645

(51) Int. Cl.$^7$ .................................................. G11C 29/00
(52) U.S. Cl. .................................................. 714/763
(58) Field of Search .................................. 358/1.1–1.18, 358/448; 714/763

(56) References Cited

U.S. PATENT DOCUMENTS 5,535,017 7/1996 Hideaki .................................. 358/444
5,586,228 * 12/1996 Tokishige et al. .................. 358/1.16

FOREIGN PATENT DOCUMENTS

722141A2  12/1995  (EP) .
722141A2   7/1996  (EP) .

\* cited by examiner

*Primary Examiner*—Albert Decady
*Assistant Examiner*—Shelly A Chase

(57) ABSTRACT

Any error in a hard disk is predicted by an error-prediction self-diagnosis, and error-predicting information, obtained by the error-prediction self-diagnosis, is analyzed so as to carry out appropriate preventive measures (such as a restriction of the use of the hard disk, control for assigning image data to be stored in the hard disk and a shift of image data stored in the possible error area). With this arrangement, it is possible to provide an image-processing apparatus which can predict any error in the disk memory device prior to the occurrence of the error, and based upon the prediction, carry out a process for reducing troubles that might be caused by the error.

17 Claims, 35 Drawing Sheets

FIG. 8

RELATIONSHIP BETWEEN CAUSES OF ERROR AND FORMAT OF ERROR-PREDICTING INFORMATION

| CONTENTS OF ERROR | CAUSES | SENSE KEY 1 | SENSE KEY 2 | SENSE CODE |
|---|---|---|---|---|
| DEFECTIVE SECTOR | EXPANSION/CONTRACTION DUE TO TEMPERATURES SCRATCH DUE TO CONTAMINANT CORROSION DUE TO ORGANIC GAS DEFECTIVE MAGNETIC LAYER | 02H/ERROR DETECTION: RECOVERY OPERATION POSSIBLE | 01H/MEDIUM ERROR: | 0010H/READ ERROR 0020H/WRITE ERROR 0030H/SECTOR ERROR 0050H/ERROR IN ALTERNATE AREA 0070H/ERROR IN PREAMPLIFIER |
| ERROR IN HEAD | DUSTS, DIRT | 02H/ERROR DETECTION: RECOVERY OPERATION POSSIBLE | 01H/MEDIUM ERROR: 03H/HARDWARE ERROR: | 0010H/READ ERROR 0020H/WRITE ERROR 0040H/SEEK ERROR |
| ERROR IN MECHANICAL SYSTEM | DEFECTIVE MOTOR DEFECTIVE BEARING | 02H/ERROR DETECTION: RECOVERY OPERATION POSSIBLE | 03H/HARDWARE ERROR: | 0060H/MAGNETIC DISK MOTOR ERROR 0061H/ACTUATOR MOTOR ERROR |
| ERROR IN ELECTRIC SYSTEM | DEFECTIVE SUBSTRATE DEFECTIVE CONTROL CHIP | 01H/ERROR DETECTION: RECOVERY OPERATION IMPOSSIBLE | 02H/READY ERROR: | SUDDEN OCCURRENCE ERROR-PREDICTION IMPOSSIBLE |

F I G. 1 4

| NAME OF FUNCTION | FUNCTION 1 | FUNCTION 2 | FUNCTION 3 | ......... | FUNCTION N |
|---|---|---|---|---|---|
| NAME OF MODE | SINGLE COPY | MULTI-SHOT | NET PATTERN | ......... | FILING |
| START ADDRESS | 0 | 0 | 0 | ......... | 400 |
| END ADDRESS | 100 | 400 | 4 | ......... | 500 |
| HISTORY OF RETRY NUMBER | 0 | 0 | 0 | ......... | 0 |

IMAGE-PROCESSING APPARATUS

FIELD OF THE INVENTION

The present invention relates to an image-processing apparatus that is installed in a digital copying machine having a plurality of functions such as a copying machine, a facsimile and a printer, and in particular, concerns an image-processing apparatus that is installed in a digital copying machine having a hard disk, etc. for storing a large amount of image information.

BACKGROUND OF THE INVENTION

In recent years, a large number of multi-functional digital copying machines, which has functions such as a copying machine, a facsimile and printer in a unified manner, have been commercialized. These digital copying machines are used with a lot of external apparatuses being connected to form a network, and a large amount of image information is inputted thereto from these external apparatuses.

The above-mentioned digital copying machine requires a storage device with a large capacity for storing the inputted image information. However, if the storage device is constituted by semiconductor memories, and if the large amount of image information is all managed by the semiconductor memories, a problem of high costs is raised. Therefore, in general, disk memory devices, such as, for example, hard disks, are adopted as the storage devices. These disk memory devices successively record image information that is forwarded from the external apparatuses, and also store information, such as filing, for a long time.

With respect to processing methods, etc., for outputting data by using a disk memory device with a large capacity as a temporary storage device for a plurality of pieces of input data, for example, U.S. Pat. No. 5,535,017 has suggested some of those methods.

However, in such conventional arrangements, since the disk memory device records and manages a large amount of image information, stored in the disk memory device, might disappear in the event of a failure in the disk memory device.

For example, in the multi-shot function in which image data, which corresponds to a plurality of sheets of documents that have been read, is automatically magnified or reduced so as to output it on one sheet of recording paper, a plurality of pieces of image information have to be successively stored in the disk memory device. Further, in the filing function in which data of documents to be shared in an office, etc., is stored in a shared manner on the disk memory device, the image information is stored and maintained for a long time.

Therefore, if the disk memory device has broken down during the use of the above-mentioned functions, image information which has been processed so far might become useless in the multi-shot function, or the importance of filing might be blemished in the filing function. In the event of a failure, the larger the capacity of the disk memory device, the greater the seriousness of these problems.

SUMMARY OF THE INVENTION

The objective of the present invention is to provide an image-processing apparatus which predicts the occurrence of any error in the disk memory device beforehand and which, based on the prediction, carries out a process for reducing possible troubles that might occur in the event of the error.

In order to achieve the above-mentioned objective, the image-processing apparatus of the present invention, which is used in an image-forming apparatus using a disk memory device as an image data memory, is provided with: an error-predicting means for predicting any error in the disk memory device prior to the occurrence of the error in the disk memory device; and an image-outputting means which, in the case when any error is predicted in the disk memory device by the error-predicting means, outputs image data stored at an area in the disk memory device at which the error is predicted.

In the above-mentioned image-processing apparatus, prior to the occurrence of any error in the disk memory device used as an image-data storage memory of the image-forming apparatus, the error-predicting means predicts the possible error. Based upon the error-predicting information, a prediction is made so as to preliminarily detect any error in the hard disk and any abnormality such as abnormal access speeds to image data that is stored with continuous addresses, and a preventive measure is taken, thereby making it possible to ensure the reliability of image data stored in the disk memory device.

For example, in the case when compressed data is stored in the disk memory device, any abnormality in data causes serious problems when the user tries to completely restore the data. For this reason, upon prediction of any error in the disk memory device, a preventive measure is taken by outputting the data (print-out or output to another storage device) prior to the occurrence of the error so that filing of the data becomes possible.

Moreover, in another arrangement for achieving the aforementioned objective, the image-processing apparatus of the present invention, which is used in an image-forming apparatus using a disk memory device as an image data memory, is provided with: an error-predicting means for predicting any error in the disk memory device prior to the occurrence of the error in the disk memory device; and a restriction means which, in the case when the predicting means has predicted any error in the disk memory device, restricts the use of a processing function that processes the image data by using the disk memory device.

In the above-mentioned processing apparatus, upon prediction of any error in the disk memory device by the error-predicting means, the restriction means restricts the use of a processing function that processes the image data by using the disk memory device. Normally, in the image-forming apparatus using the disk memory device as an image-data storing memory, there are two types of functions, that is, the functions that are operative without using the disk memory device and the functions that become operative only by using the disk memory device. Therefore, in the image-processing apparatus of the present invention, since only the latter functions are restricted, the former functions are usable even after any error has been predicted in the disk memory apparatus.

Moreover, in another arrangement for achieving the aforementioned objective, the image-processing apparatus, which is used in an image-forming apparatus using a disk memory device as an image data memory, the disk memory device being provided with a data-storing region that are divided into a plurality of areas, is provided with: an error-predicting means for predicting any error in the disk memory device for each of the divided areas in the disk memory device prior to the occurrence of the error in the disk memory device; a feature-extracting means for extracting a feature of image data to be stored in the disk memory device; and an assigning means which, in the case when the error-predicting means has predicted any error in the disk memory device, assigns the image data to one of the areas to be stored in based upon the feature of the image data that has been extracted by the feature-extracting means.

In the above-mentioned image-processing apparatus, the error-predicting means predicts any error in the disk memory device for each of the divided areas in the disk memory device. Upon prediction of any error in the disk memory device by the error-predicting means, the feature-extracting means extracts a feature of image data that is to be stored in the disk memory device. The assigning means assigns the image data to one of the areas to be stored in based upon the feature of the image data.

Depending on features of image data (character images, half-tone images, compressed images, or non-compressed images), there are some differences in the image data: In the event of an error in the area at which the image data is stored, some are easily restored, but others are difficult to restore, or some are greatly affected by the error or others are less affected, when outputted as they are. In the image-processing apparatus of the present invention, with respect to those image data that are, for example, easily restored, or less affected even when outputted as they are, they are assigned to the area at which any error has been predicted, and with respect to those image data that go against the above-mentioned cases, they are assigned to another area at which no error has been predicted. Even in the event of the error as predicted, this arrangement makes it possible to reduce the adverse effects caused by the error.

Furthermore, in another arrangement for achieving the aforementioned objective, the image-processing apparatus of the present invention, which is used in an image-forming apparatus using a disk memory device as an image data memory, the disk memory device being provided with a data-storing region that are divided into a plurality of areas, is provided with: an error-predicting means for predicting any error in the disk memory device for each of the divided areas in the disk memory device prior to the occurrence of the error in the disk memory device; a feature-extracting means for extracting a feature of image data stored in the disk memory device; and a data-shifting means for shifting image data stored in any area in the disk memory device to another area. In the case when the error-predicting means has predicted any error in the disk memory device, the feature-extracting means extracts a feature of image data stored in the area at which any error has been predicted by the feature-extracting means, and the data-shifting means shifts the image data stored in the area at which the error has been predicted to another area in accordance with the feature of the image data that has been extracted.

In the above-mentioned image-processing apparatus, the error-predicting means predicts any error in the disk memory device for each of the divided areas in the disk memory device. Upon prediction of any error in the disk memory device by the error-predicting means, the feature-extracting means extracts a feature of image data stored in the area at which any error has been predicted. The data-shifting means shifts the image data stored in the area at which the error has been predicted to another area in accordance with the feature of the image data that has been extracted.

For example, when the image data, stored in the area at which any error has been predicted, are those that are easily restored, or less affected even when outputted as they are, they are stored in the same area as they are. However, with respect to those image data that go against the above-mentioned cases, they are shifted to another area at which no error has been predicted. Even in the event of the error as predicted, this arrangement makes it possible to reduce the adverse effects caused by the error.

For a fuller understanding of the nature and advantages of the invention, reference should be made to the ensuing detailed description taken in conjunction with the accompanying drawings.

BRIEF DESCRIPTION OF THE DRAWINGS

FIG. 8 is an explanatory view that shows the relationship between the cause of the error of the hard disk and the error-diagnosis information.

FIG. 14 is an explanatory view that shows a management table for managing the use of the hard disk.

DESCRIPTION OF THE EMBODIMENT

Embodiment 1

The following description will discuss one embodiment of the present invention. In the present embodiment, an image-processing apparatus in accordance with the present invention is applied to a digital copying machine.

[CONSTRUCTION OF THE DIGITAL COPYING MACHINE]

Figure 2:
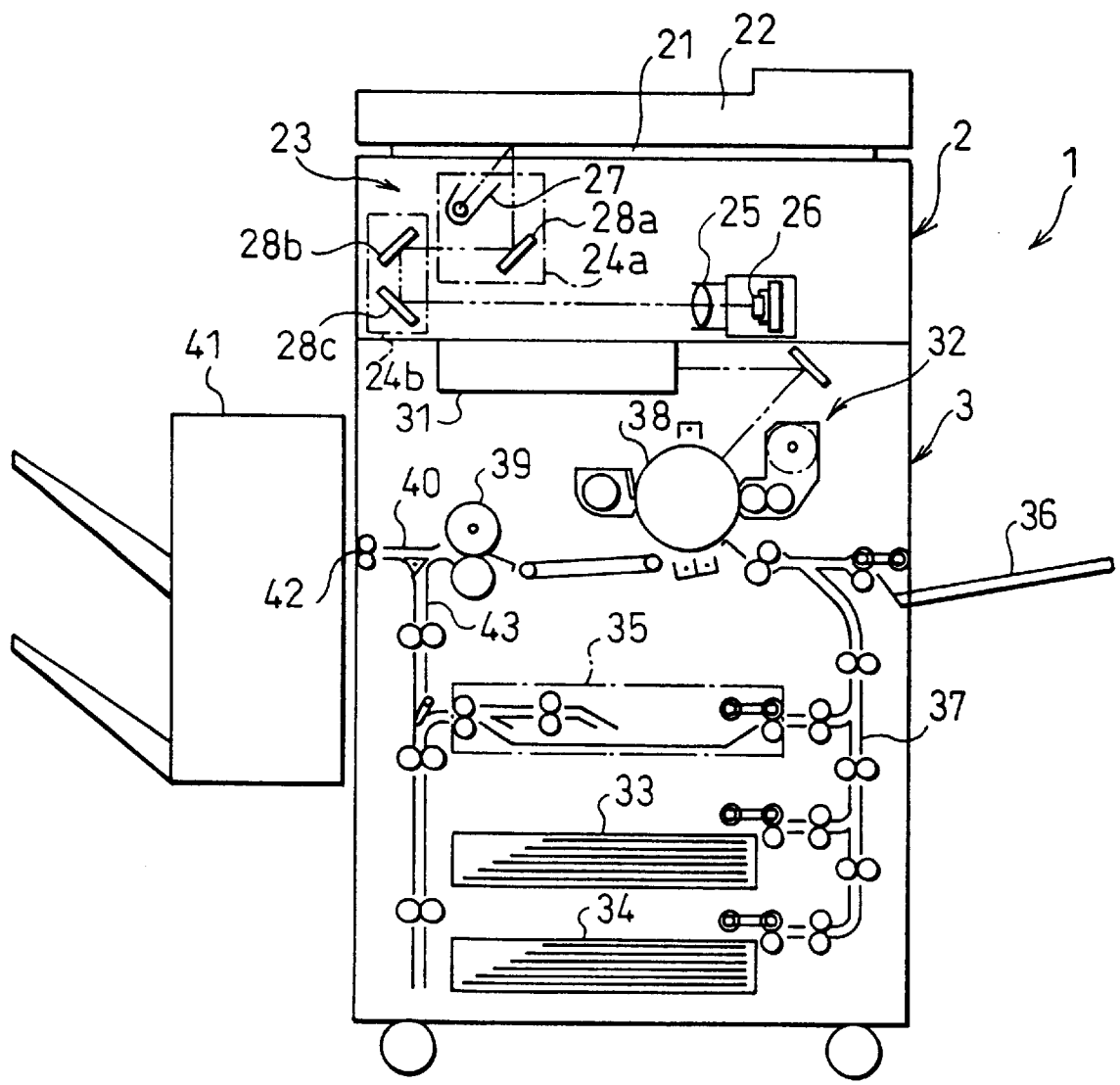
FIG. 2 is a cross-sectional view showing a construction of the digital copying machine.

As illustrated in FIG. 2, the digital copying machine 1 has a scanner section 2 and a laser printer section 3.

The scanner section 2 is constituted by a document platen 21 made of transparent glass, a recirculating automatic document feeder 22 (hereinafter, referred to as RADF) for automatically supplying and feeding documents onto the document platen 21 and a document-image reading unit (that is, a scanner unit 23) for scanning and reading an image of a document that has placed on the document platen 21.

The above-mentioned RADF 22, which is provided with a document tray on which a plurality of documents are set as one lot, automatically feeds the documents set on the document tray to the document platen 21 one sheet by one sheet. Further, the RADF 22 is constituted by a transport path for one-sided document, a transport path for double-sided document, a switching means for the transport paths, etc. so as to allow the scanner unit 23 to read the one side or the both sides of a document in response to the selection made by the operator. With respect to the RADF 22, since a lot of patent applications and commercialized products have been conventionally known, any further description thereof is not given.

The scanner unit 23 is provided with a first scanner unit 24a, a second scanner unit 24b, an optical lens unit 25 for converging reflected light from the document, and a charge coupled device 26 (hereinafter, referred to as a CCD) for converting a reflected-light image converged by the optical lens unit 25 into an electrical image signal. Here, the first scanning unit 24a is constituted by a lamp reflector assembly 27 for irradiating with light the surface of the document and a first reflection mirror 28a for directing the reflected-light image from the document to the CCD 26, and the second scanning unit 24b is constituted by second and third reflection mirrors 28b and 28c.

While successively placing documents to be read onto the document platen 21, the scanner section 2 allows the scanner unit 23 to move along the lower surface of the document platen 21 so as to scan the document image through cooperative operations between the RADF 22 and the scanner unit 23.

The laser printer section 3 is provided with a paper housing and transporting section, a laser-writing unit 31, and an image-forming section 32 for forming images.

The paper housing and transporting section has a first paper-feed cassette 33, a second paper-feed cassette 34, a double-side copying unit 35 and a multi-manual tray 36 which house sheets of paper to be transported to the image-forming section 32. The first and second paper-feed cassettes 33 and 34 house sheets of paper for respective sizes. When the operator selects a cassette which contains sheets of paper having a desired size, the sheets of paper are fed one by one from the top of the sheets of paper inside the cassette, and successively transported toward the image-forming section 32 through the transport path 37.

The laser-writing unit 31 has a semiconductor laser for releasing a laser light beam in response to the image data read by the scanner 2, a polygon mirror for deflecting the laser light beam with a constant angular velocity, and an f-θ lens for correcting the laser light beam that has been subjected to the deflection with a constant angular velocity so that it is subjected to a constant-velocity deflection onto the photoconductor drum 38 in the image-forming section 32.

In the same manner as conventional arrangements, the image-forming section 32 is provided with the photoconductor drum 38, and devices, such as a charger, a developing device, a transfer device, a separating device, a cleaning device, and a static eliminating device, all of which are disposed around the photoconductor drum 38. Further, a fixing device 39, which fixes a toner image formed on the sheet of paper by the photoconductor drum 38, is placed on the downstream side of the photoconductor drum 38 in the transporting direction of the sheet of paper.

A paper-discharge transport path 40 is placed on the downstream side of the fixing device 39 in the paper transport direction. The paper-discharge transport path 40 is branched to a transport path 42 connecting to a post-process device (sorter) 41 and a transport path 43 connecting to the double-side copying unit 35.

Figure 3:
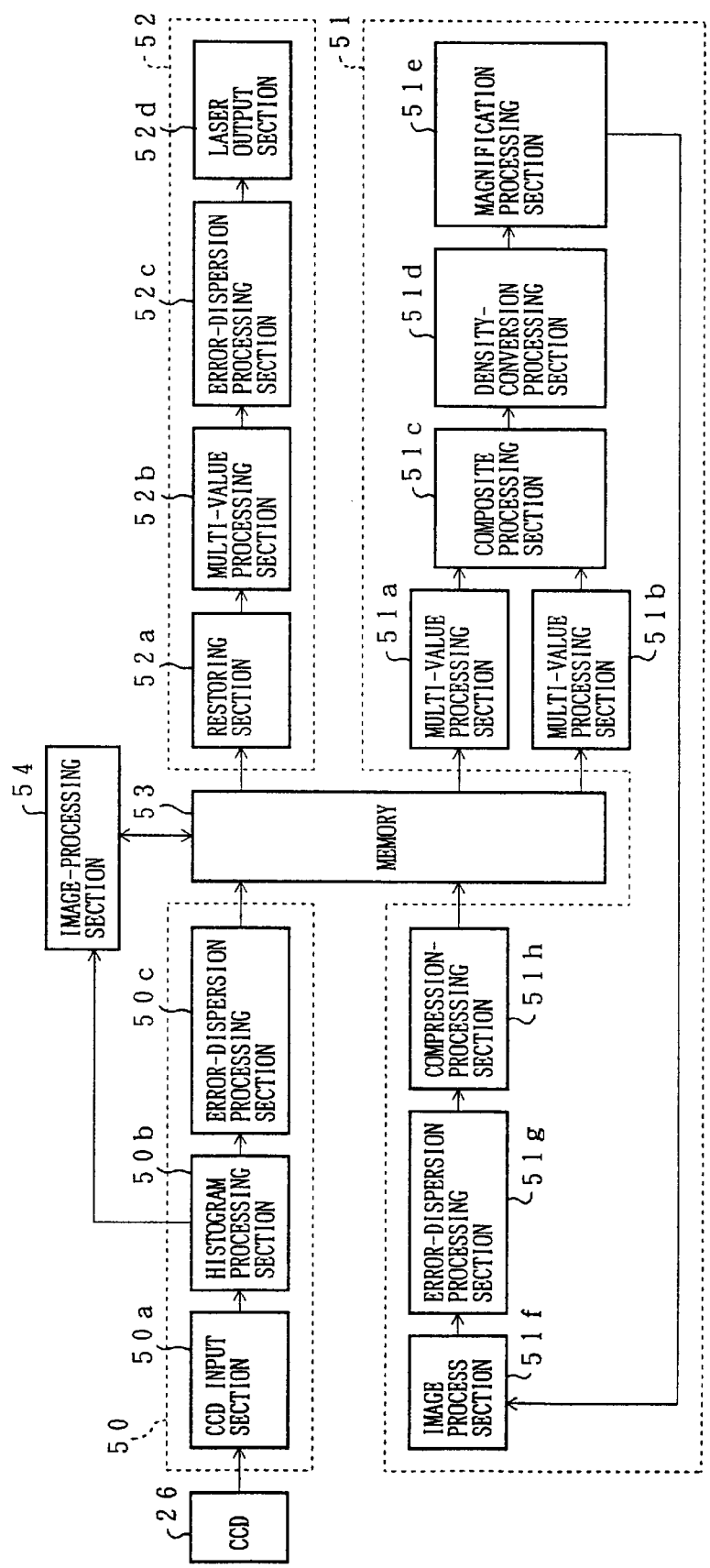
FIG. 3 is a block diagram showing a construction of an image-processing apparatus used in the digital copying machine.

Image data, obtained by reading an original image with the scanner 23, is sent to the image-processing apparatus (see FIG. 3), which will be described later, and after having been subjected to various processes, it is temporarily stored in the memory 53 of the image-processing apparatus (see FIG. 3). The image data, which has been stored in the memory 53, is outputted to the laser printer section 3 in response to an output instruction.

The laser printer section 3 allows the laser-writing unit 31 to carry out a scanning operation using a laser light beam based upon the image data so that an electrostatic latent image is formed on the surface of the photoconductor drum 38. The electrostatic latent image is visualized by toner, and the visualized toner image is electrostatically transferred onto the surface of a sheet of paper transported from either the paper-feed unit 33 or 36, and fixed by the fixing device 39.

The sheet of paper, on which the image is formed in this manner, is selectively transported to the post-process device 41 from the fixing device 39 through the transport paths 40 and 42, or to the double-side copying unit 35 through the transport paths 40 and 43.

[IMAGE-PROCESSING DEVICE]

Next, an explanation will be given of the construction and function of an image-processing device for carrying out an image-processing operation on the original-image information that has been read. FIG. 3 shows the block diagram of the image-processing device installed in the digital copying machine 1 of FIG. 2.

The image-processing device is provided with an image-processing section 54 having an image-data input section 50, an image-data processing section 51, an image-data output section 52, a memory 53 constituted by a RAM (a random access memory), a hard disk (a disk memory device), etc. and a CPU.

The image-data input section 50 has a CCD input section 50a, a histogram processing section 50b and an error-dispersion processing section 50c. The image-data input section 50 is designed so that it converts image data of a document that has been read by the CCD 26 into binary coded data, and processes the image data by using the error-dispersion method while representing the data as binary digital quantity in the histogram, thereby temporarily storing the resulting data in the memory 53.

In other words, in the CCD section 50a, analog signals, which correspond to pixel densities of the image data, are analog-to-digital converted, and then subjected to an MTF (Modulation Transfer Function) correction and a black-and-white correction, or a gamma correction, and the resulting signals are released to the histogram processing section 50b as digital signals with 256 gray scales (8 bit).

In the histogram processing section 50b, the digital signals released from the CCD section 50a are added individually for the respective pixel densities of 256 gray scales; thus, density information (histogram data) is obtained. If necessary, the resulting histogram data is sent to the image-processing section 54, or sent to the error-dispersion processing section 50c as pixel data.

In the error-dispersion processing section 50c, the digital signals of 8 bits/pixel, released from the CCD input section 50a, are converted into one bit (binary coded) by the error-dispersion method which is one type of pseudo intermediate processing, that is, by the method for reflecting the error of binary coded digits to the binary coding decision between the adjacent pixels; thus, re-distributing operations for exactly reproducing the densities of local regions of a document are carried out.

The image-data processing section 51 is provided with a multi-value processing sections 51a and 51b, a composite processing section 51c, a density-conversion processing section 51d, a magnification processing section 51e, an image process section 51f, an error-dispersion processing section 51g and a compression-processing section 51h. The image-data processing section 51 serves as a processing section for converting the inputted image data into image date that is desired by the user. Various processes are carried out in this section until final output image data has been stored in the memory 53. Additionally, the above-mentioned processing sections, contained in the image-data processing section 51, are used on demand, and are not necessarily used.

In the multi-value processing sections 51a and 51b, the image data that has been binary coded in the error-dispersion processing section 50c is again converted into data with 256 gray scales.

In the composite processing section 51c, logical operations, that is, OR, AND or exclusive-OR operation, are selectively carried out for each pixel. The data used in this operation is pixel data stored in the memory 53 and bit data from a pattern generator (PG).

In the density-conversion processing section 51d, the relationship of the output density to the input density is properly set with respect to the data with 256 gray scales based upon a predetermined gray-scale conversion table. In the magnification processing section 51e, pixel data (density value) on a target pixel that is to be obtained after a specified change in magnification is found by carrying out an interpolating process based on the inputted known data in accordance with a specified magnification.

Thereafter, in accordance with the pixel data, the change in magnification is carried out in the sub-scanning direction, and then is carried out in the scanning direction.

In the image process section 51f, various image processes are carried out on the inputted pixel data.

Further, information extraction with respect to data rows, such as feature extraction, is carried out. In the error-dispersion processing section 51g, the same process as that carried out in the error-dispersion processing section 50c in the image-data input section 50 is carried out.

In the compression processing section 51*h*, the binary data is compressed by a coding process that is referred to as "run length". Here, with respect to the compression of image data, the compression is operated in the last processing loop at the time when the final output image data has been complete.

The image-data output section 52 is provided with a restoring section 52*a*, a multi-value processing section 52*b*, an error-dispersion processing section 52*c* and a laser output section 52*d*. The image-data output section 52 restores the image data that has been stored in the memory 53 in a compressed state so as to again convert it to the original data with 256 gray scales, carries out an error dispersion process for quaternary data that provides smoother intermediate gray-scale expressions than binary data, and then transmits the resulting data to the laser output section 52*d*.

In the restoring section 52*a*, the image data that has been compressed by the compression processing section 51*h* is restored. The multi-value processing section 52*b* carries out the same process as that carried out in the multi-value processing sections 51*a* and 51*b* in the image-data processing section 51. The error-dispersion processing section 52*c* carries out the same process as that carried out in the error-dispersion processing section 50*c* in the image-data input section 50. In the laser output section 52*d*, the digital pixel data is converted to a laser on/off signal in accordance with a control signal from a sequence controller which is not shown. The semiconductor laser in the laser-writing unit 31 is turned ON/OFF in response to the on/off signal, thereby allowing an electrostatic latent image to be written on the photoconductor drum 38.

The memory 53 is constituted by a main memory 53*a* made of a RAM for storing image data and a hard disk 53*b* that is used when a large amount of image data has to be stored.

Additionally, data, which is dealt in the image-data input section 50 and the image-data output section 52, is basically stored in the memory 53 in the form of binary data so as to save the capacity of the memory 53; however, the data may be processed in the form of quaternary data in order to prevent the degradation of image data.

[CONSTRUCTION OF CONTROLLING BLOCKS OF THE DIGITAL COPYING MACHINE]

Figure 5:
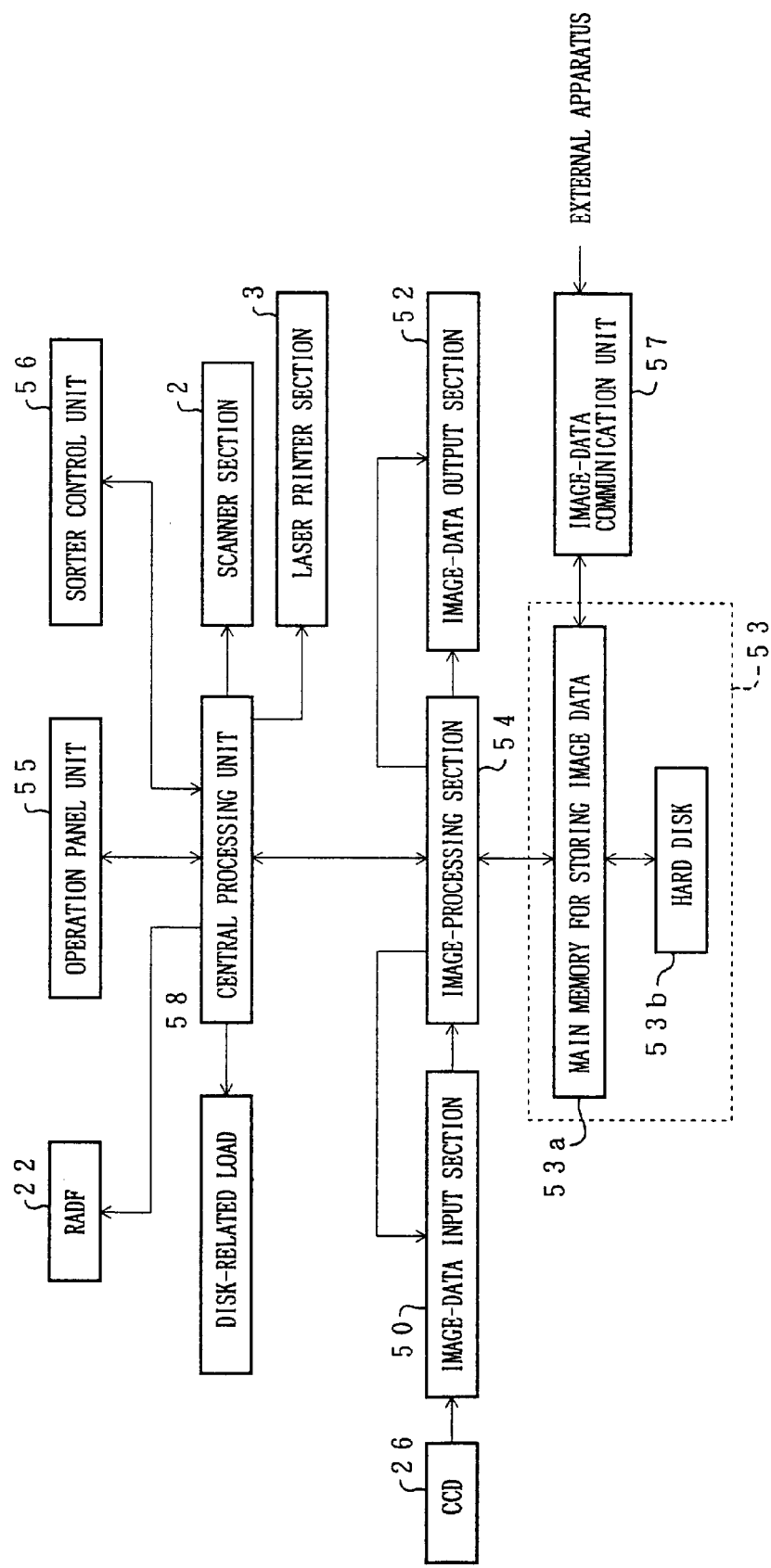
FIG. 5 is a block diagram that shows a construction of the main part of the digital copying machine.

FIG. 5 shows a state in which the respective sections of the digital copying machine 1 are controlled in their operations by the central processing unit 58. In FIG. 5, explanations of a CCD 26, an image-data input section 50, an image-data output section 52, an image memory 53 and an image-processing section 54 are omitted since these sections overlap with those explained in FIG. 3.

The central processing unit 58 supervises the respective mechanical sections constituting the digital copying machine 1, such as the RADF 22, the scanner section 2 and the laser printer section 3 by sequential control, and releases control signals to the respective mechanical sections.

Further, the central processing unit 58 is connected to an operation panel unit 55 made of an operation panel in a manner so as to communicate with each other, and in accordance with a copying mode set and inputted by the operator, a control signal is transmitted to the central processing unit 58 so as to operate the digital copying machine 1 in response to the mode. Further, a control signal, which indicates an operating state of the digital copying machine, is transmitted from the central processing unit 58 to the operation panel unit 55. Based upon the control signal, the corresponding operating state is displayed on a display, etc., of the operation panel unit 55 so as to inform the operator of the current state of the apparatus.

Reference numeral 56 indicates a sorter control unit which is a unit for managing the operations of the post-process device, such as sorting copied materials outputted from the digital copying machine 1. Reference numeral 57 is an image-data communication unit that is installed to allow information communication with other digital image apparatuses through image data, image control signals, etc. The digital copying machine 1 carries out mutual communication with other digital image apparatuses by using image data and image control signals through the image-data communication unit. The following description will discuss a digital image-forming system in accordance with the present Embodiment by exemplifying the above-mentioned digital copying machine 1.

[OPERATION PANEL OF THE DIGITAL COPYING MACHINE]

Figure 4:
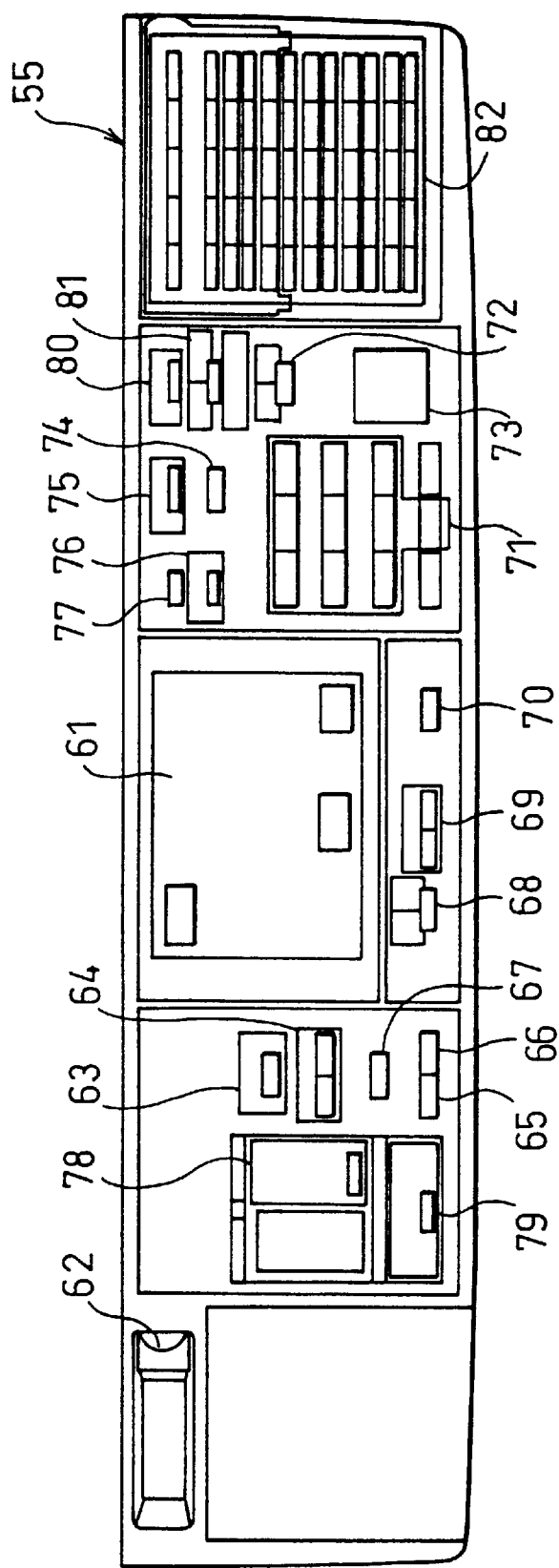
FIG. 4 is a plan view that shows an operation panel of the digital copying machine.

FIG. 4 shows an operation panel for the digital copying machine 1. A tough-panel liquid crystal display 61 is placed in the center of the operation panel, and a group of keys for setting various modes are arranged around it. setting keys. On the screen of the touch-panel liquid crystal display 61, there is an instruction area for always making a switch to a selection screen for image-editing functions. When the user directly presses this area 1*a* with his or her finger, various editing functions are displayed in a list on the screen of the liquid crystal screen so as to make it possible to select desired functions. Here, when the user presses an area of a desired editing function among display areas of the various editing functions, the specified editing function is set.

The following description will briefly discuss the group of various setting keys arranged on the operation panel. Reference numeral 62 represents a dial for adjusting the brightness of the screen of the liquid crystal display 61. Reference numeral 63 is a magnification automatic setting key which is used for setting the mode for automatically selecting the copy magnification, reference numeral 64 is a zoom key which is used for setting the copy magnification at a rate of 1 percentage point, reference numerals 65 and 66 are fixed magnification keys which are used for reading and selecting fixed magnifications, and reference numeral 67 is an equal magnification key which is used for returning the copy magnification to the reference magnification (equal magnification).

Reference numeral 68 is a density-switching key for switching the copying-density adjustment from an automatic mode to a manual mode, or to a photographic mode, and reference numeral 69 is a density-adjusting key for finely setting density levels in the case of the manual mode or the photographic mode.

Reference numeral 70 is a tray selection key used for selecting a desired paper size from paper sizes of sheets of paper that have been set in the paper feed sections of the copying machine. Reference numeral 71 is a number setting key for setting the number of copies, etc., reference numeral 72 is a clear key which is operated when the number of sheets is cleared, or when a continuous copying operation is stopped in the middle of the operation, and reference numeral 73 is a start key which is used for instructing the start of a copy process. Further, reference numeral 74 is an all cancellation key which is used for cancelling all the presently set modes so as to return the machine to the reference state, reference numeral 75 is an interruption key which is operated when upon a continuous copying process, another document is to be copied, reference numeral 76 is a operation guide key which is operated when the user does not know how to use the copying machine so that upon pressing the key, messages are displayed as to how to operate the copying machine, and reference numeral 77 is a message forwarding key which is used for switching the display of messages that have been displayed by the operation of the operation guide key 76 in a successive forwarding manner.

Reference numeral 78 is a double-side-mode setting key for setting the double-side mode, and reference numeral 79 is a post-process-mode setting key for setting the operation mode of the post-process device for sorting copied materials ejected from the copying machine. Reference numerals 80 through 82 are setting keys related to facsimile modes; and 80 is a memory-transmission mode key which is used for instructing that the transmit document be transmitted after having been temporarily stored in the memory, reference numeral 81 is a copy/facsimile mode switching key which is used for switching modes of the digital copying machine 1 between the copy and facsimile, and reference numeral 82 is a one-tough dial key which is used for dialing the phone to a receiver whose telephone number has been preliminarily stored, by a one-touch operation.

Here, the above-mentioned arrangement of the operation panel 90 related to various kinds, layout, etc. of keys is merely given as one example, and it may be modified depending on various functions to be installed in the digital copying machine 1.

[NETWORK CONNECTION CONSTITUTED BY A PLURALITY OF DIGITAL COPYING MACHINES]

An explanation will be given of a system construction in which a plurality of digital copying machines 1 are connected to a main digital copying machine 1 through communication means, as one example of system constructions using digital image-forming apparatuses.

For example, "scanners", "printers" and "digital copying machines" are listed as information apparatuses that are placed in an office (this digital copying machine may be provided with a facsimile function for transmitting and receiving data through the telephone line, a personal computer function (hereinafter, referred to as a PC) and a printer function for printing out document data from word processors).

These information apparatuses are connected to each other through general purpose I/Fs (interfaces) such as SCSIs so that data are exchanged between them. The data include command codes for use in control, bit data such as density data of images, etc.

For example, the copying machine 1 has a large-capacity memory of 1.2 GB (400 DPI, 8 bit/pix, a compression rate of ¼, A4; 100 pages) so that in addition to editing functions of a conventional copying machine, it is provided with a page-changing function, and capable of storing document data in various formats.

Further, it is provided with software for recognizing characters from data that has been read, making it possible to encode bit data. With respect to a copying speed, it is provided with a high-speed engine of 60 CPM. With respect to I/Fs, digital copying machine A, as well as digital copying machine B, is provided not only with high-speed image-data transfer lines, but also with general purpose I/Fs (SCSI, RS-232C); therefore, it is possible to interface to other information apparatuses.

Moreover, besides the digital copying machines 1, a color scanner having a reading resolution of 600 DPI and a full-color printer capable of image-recording at a recording density of 600 DPI are connected to the system through the I/Fs; this allows mutual communication between image data.

In the image-forming system, the digital copying machine 1, which has superior image-processing functions and a large-capacity image memory, is installed as a main copying machine so that the above-mentioned superior image-processing functions and the large-capacity image memory can be effectively used even from another digital copying machine that is connected thereto through a communication unit. Further, image data and information related to image data can be transmitted among the apparatuses through the communication unit, and, for example, an image, taken from the scanner section of a certain digital copying machine, may be transferred to the other digital copying machine, and outputted from the recording section thereof.

A detailed explanation will be given of the communication unit. With respect to kinds of communication data, by using bit data (gradation data per one pixel, for example, 8 bit: 256 gray scales), it is possible to transmit high-gradation images (such as natural scenery images) with high definition. Further, text data, such as characters, may be encoded and transmitted at high speeds as a small amount of data. In particular, image data having high gray scales such as those of natural scenery images may be transmitted as data that have been represented by the error-dispersion method or the dither, which is one of area-gradation methods that commonly aim to compress data. It is supposed that this conversion to error-dispersed images is preliminarily carried out in the respective apparatuses. Here, it is supposed that the form of data transmission is defined in accordance with the setting of respective digital copying machines or the printer. Therefore, image data, released from a certain scanner section, is transferred to a printer section of an apparatus that has given the instruction, and then converted into data trains required for the writing operation in the image-processing section so that the image data is outputted.

It is supposed that respective I/Fs are defined by their own regulated protocol and transmission speed and that they are selected depending on the contents (the amount of data) of data to be transmitted and the positional relationship (distance, etc.) of the respective apparatuses. Here, the respective I/Fs are not limited to those connecting the respective apparatuses on one-to-one basis; and they may be designed so as to connect the respective apparatuses on a common line, like a daisy-chain construction. In this case, the respective apparatuses are provided with addresses so as to recognize the receiver of the transmission.

[ERROR-PREDICTING FUNCTION]

Next, an explanation will be given of an error-predicting function on a hard disk 53*b* in the image-processing apparatus of the present embodiment. In the error-predicting function, the aforementioned image-processing section 54 serves as a restricting means, an allocating means and a data-shifting means which carry out various controlling processes such as transmission of image data to the hard disk 53*b* and allocation of storage regions. Operations of these means will be described later. Further, the hard disk 53*b* predicts its own error by a self-diagnosis for error-prediction. In other words, the hard disk 53*b* serves as an error-predicting means.

Error-predicting information on the hard disk 53*b* is transmitted by using check commands on interfaces that are exchanged between the hard disk 53*b* and the image-processing section 54. In other words, the status of the hard disk 53*b* is sent to the image-processing section 54 by the check commands. Moreover, the above-mentioned error prediction is achieved by executing the check commands or carrying out data comparisons between data reading and writing of the hard disk 53*b* so as to count the number of retrying operations. More specifically, the error-prediction of the hard disk 53*b* is carried out by collecting information of error factors in two aspects, that is, by making periodical measurements and error recording, and analyzing the resulting information.

For example, in the error recording, the number of retrying operations of accesses, etc., is recorded, and in the case when the cumulative number has exceeded a predetermined threshold value, an error is detected on the hard disk 53b. Further, in the periodical measurements, factors, such as noise, coherence and amplitude, appearing when the magnetic pattern of the hard disk 53b is read out as electric signals, are measured, and in the case when these values have exceed predetermined threshold values, an error is detected on the hard disk 53b.

The data, checked by the above-mentioned check command, is temporarily stored in the error-information region of the hard disk 53b, and after receipt of an output instruction from the image-processing section 54, is outputted to the image-processing section 54.

Figure 1:
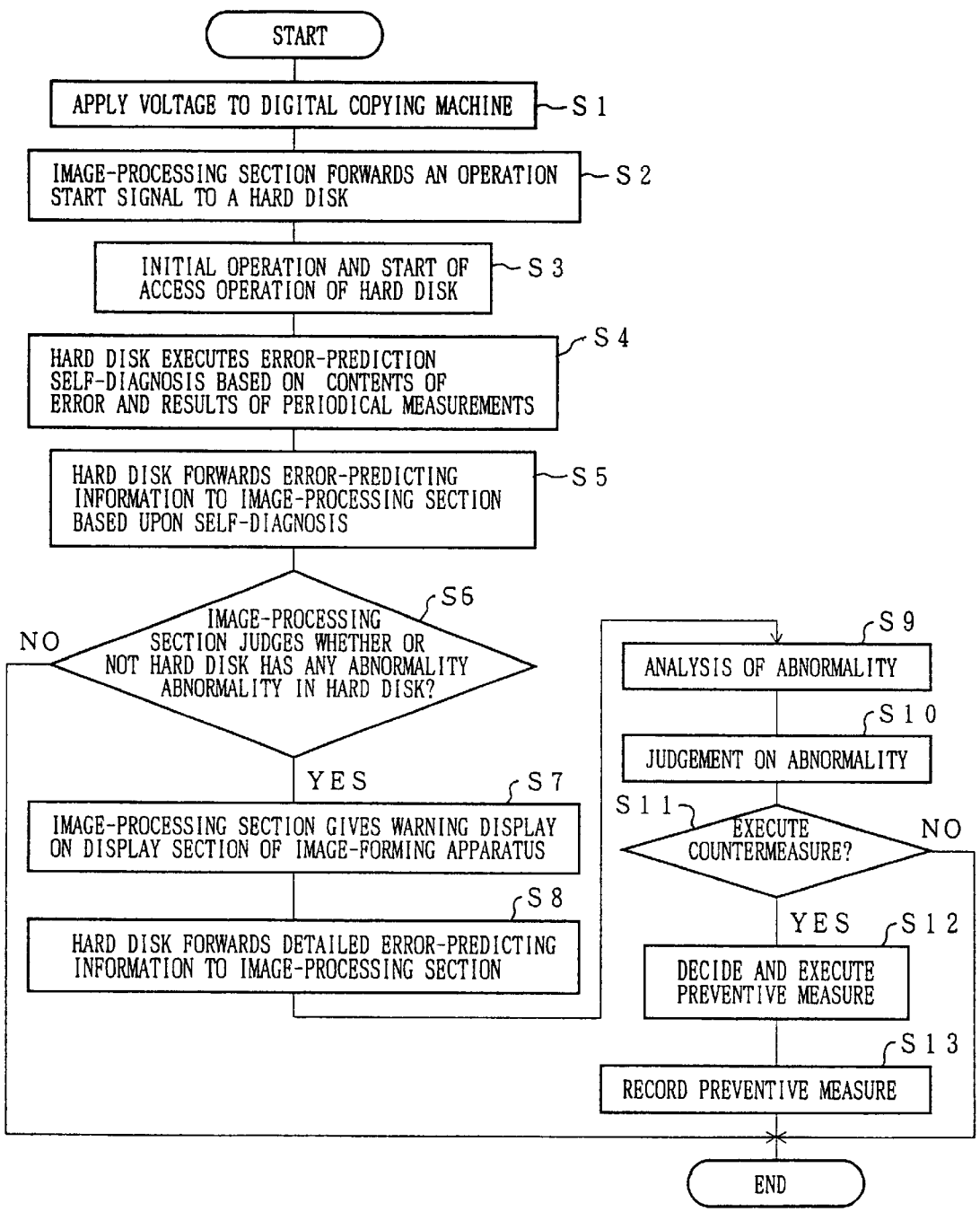
FIG. 1, which shows one Embodiment of the present invention, is a flow chart that shows processing operations related to error-prediction of a digital copying machine.
Figure 6:
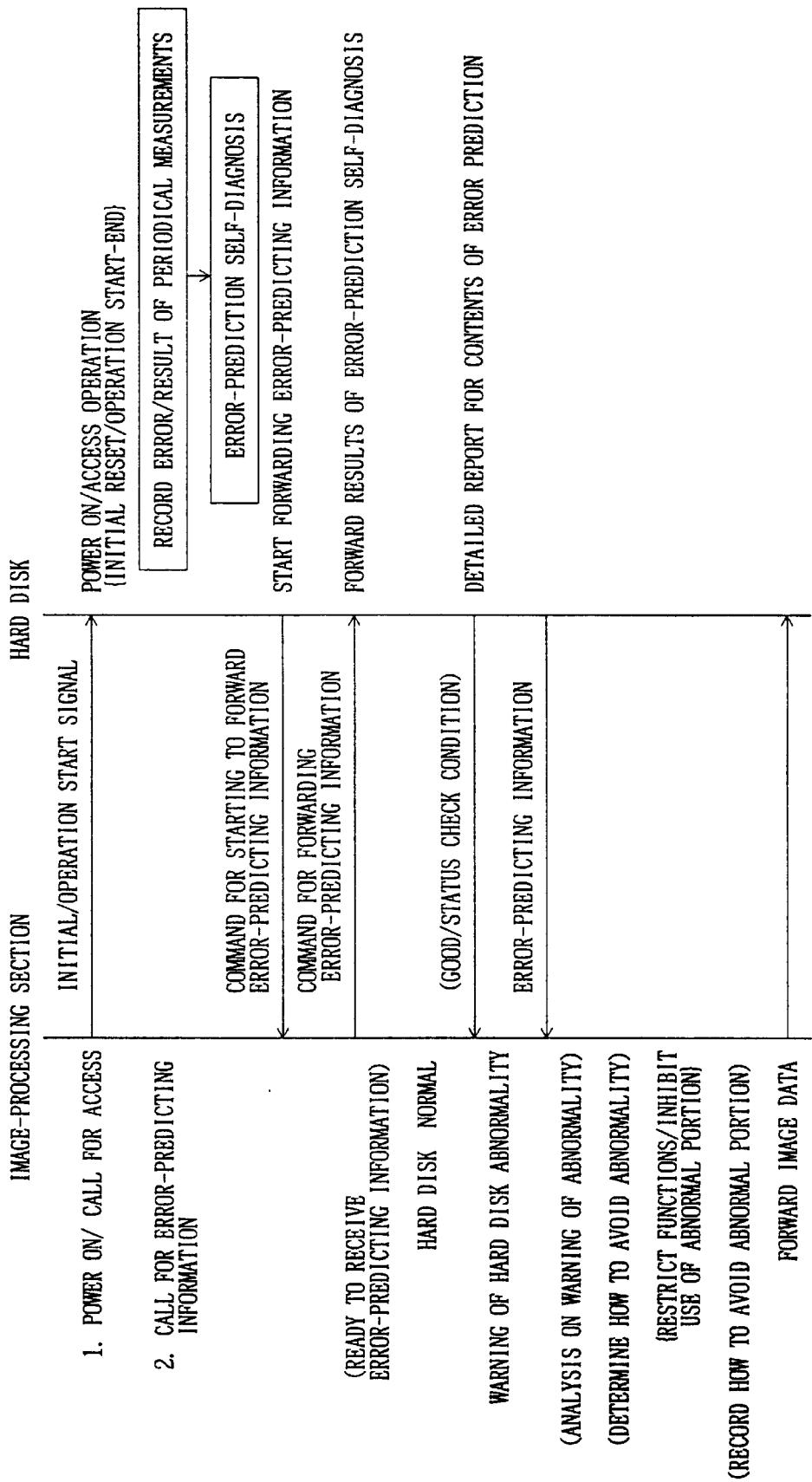
FIG. 6 is a timing chart that shows processing operations related to error-prediction of the digital copying machine.

Referring to FIG. 1 and FIG. 6, the operation of the check command will be explained. FIG. 6 shows timing in which error-prediction is carried out on the hard disk 53b so that an appropriate instruction data is forwarded.

First, upon application of power to the digital copying machine 1 (S1), the image-processing section 54 of the digital copying machine 1 forwards an operation-starting signal to the hard disk 53b (S2). Thus, the hard disk 53b carries out an initial operation, starts an accessing operation to the image-processing section 54 (S3), and creates error-prediction information by means of an error-prediction self-diagnosis. Here, the initial operation is an operation for initializing the hard disk 53b, and if there is any command, etc. which is not being executed at this time, the hard disk 53b is initialized after clearing this command. Further, the error-predicting information is formed by the contents of recorded errors and results of periodical measurements; and the method of formation will be described later.

The error-prediction information, thus created, is forwarded from the hard disk 53b to the image-processing section 54 as a starting command for transmitting error-prediction information (S5). The image-processing section 54 judges whether or not there is any error in the hard disk 53b based on the error-prediction information forwarded thereto (S6). If the judgement shows that there is any error in the hard disk 53b (YES at S6), the image-forming section 54 gives a warning sign indicating abnormality on the display section of the digital copying machine (S7).

Upon receipt of a transmission permission command for transmitting error-prediction information regarding the starting command for an error-prediction information from the image-processing section 54, the hard disk 53b again transmits detailed error-prediction information together with a status command to the image-processing section 54 (S8). The image-processing section 54 analyzes the contents of abnormality on the hard disk 53b based upon the error-prediction information (S9), and makes a judgement on the results of analysis of the contents of abnormality (S10). Further, based upon the above-mentioned results, the image-processing section 54 determines whether or not any counter measure be taken on the abnormality (S11).

Upon carrying out the countermeasure (YES at S11), the image-processing section 54 decides a preventive measure suitable for the contents of abnormality on the hard disk 53b, carries out the preventive measure (S12), and records the contents of the preventive measure (S13). Here, if the judgement at S6 shows that the hard disk 53b is normal (S5), the process is completed.

Figure 7:
FIG. 7 is an explanatory drawing that shows a format of error-diagnosis information that is released by a hard disk of the image-processing apparatus of FIG. 3.

FIG. 7 shows an error-prediction data format. The error-prediction data is constituted by an error-prediction ID, the number of error-prediction data bytes, first and second sense keys, information bytes, the total number of bytes and sense codes.

The error-prediction ID represents an identification of the contents of an error, and also represents a serial number. The number of error-prediction data bytes represents the amount of data of the error-prediction data. The first sense key indicates whether or not a recovery operation can be carried out after the error detection. The second sense key represents the classification of an error. The information bytes represent the location of the error, that is, the memory address of the hard disk 53b. The total number of bytes represents the amount of data in which the error is predicted within the hard disk 53b. The sense code represents the contents of error prediction in the coded form.

FIG. 8 shows examples of combinations of causes and data formats in the contents of error prediction. For example, in the case when an error prediction is detected on a defective sector occurring in the hard disk 53b due to expansion and contraction of the hard disk 53b with temperatures, scratches caused by dusts, etc., the first sense key shows a 02H code that indicates that a recovery operation is available after the error detection. Further, the second key shows a 01H code, that is, MEDIUM ERROR in classification, which indicates that a scratch or a data error is detected in the hard disk 53b. Moreover, the sense codes have codes indicating the detailed contents of error prediction, such as 0010H (read error: frequent failures in reading operation), 0020H (write error: frequent failures in writing operation) and 0030H (sector error: frequent detections of defective sectors).

In contrast, with respect to errors in the electrical system such as those caused by defective substrates, defective control chips, etc., the first sense key has a 01H code, which represents that no recovery operation is available even after the error detection, since such errors are not predictable. Further, the second sense key represents a 02H code, that is, READY ERROR in classification, which indicates that an access error is detected; however, in this case, no code is given for indicating the contents of the error in the sense code since it is impossible to predict an error associated with the electrical system.

As described above, in the present embodiment, an explanation has been given of the operation of error-predicting functions in the image-processing apparatus. Here, with respect to recovery operations (the preventive measure at S12 of FIG. 1) which are carried out in cases where an occurrence of error is actually predicted, various processing operations may be adopted. The following embodiments will discuss practical examples of these recovery operations.

Embodiment 2

Figure 10:
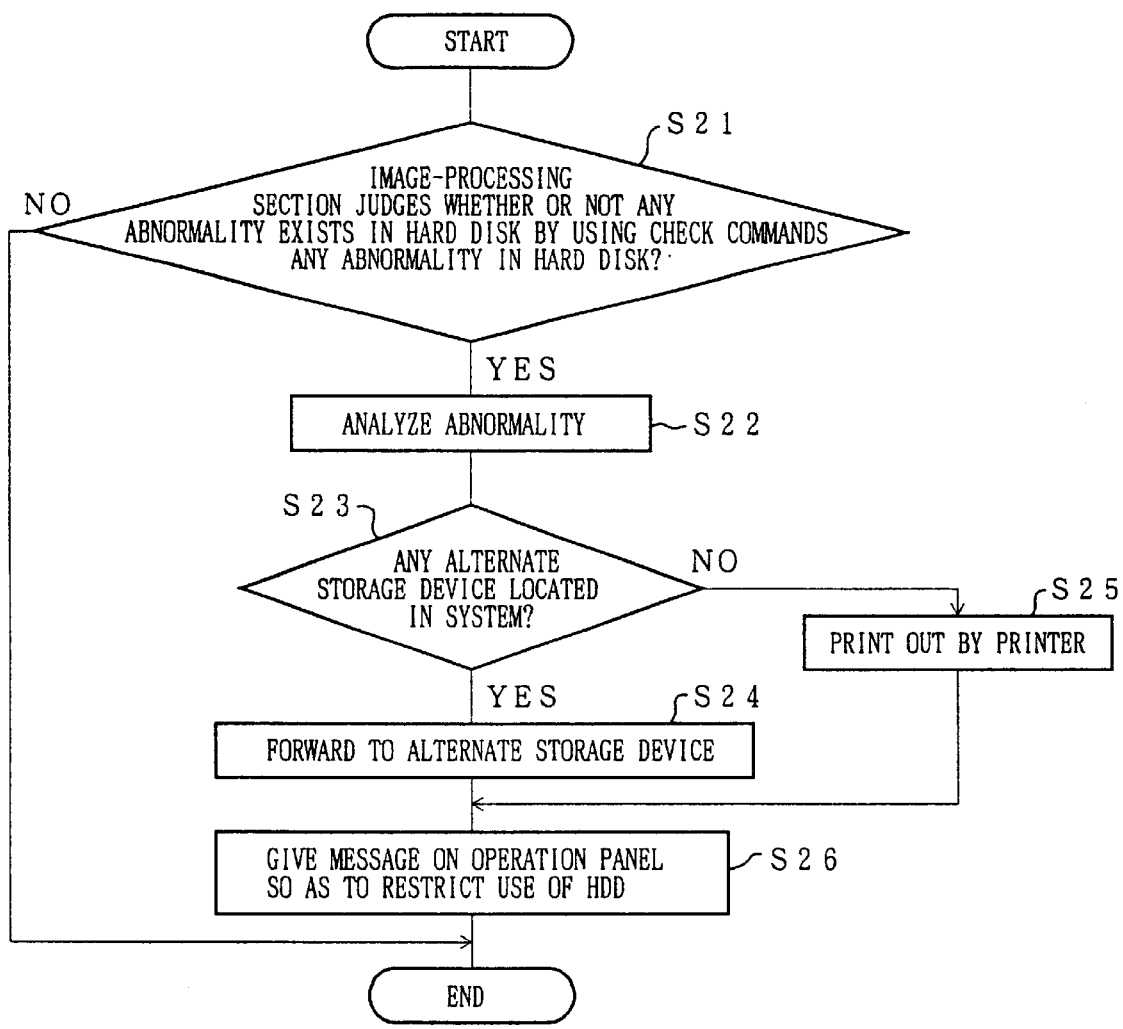
FIG. 10, which shows another embodiment of the present invention, is a flow chart that shows processing operations related to error-prediction of the digital copying machine.

Referring to a flow chart in FIG. 10, a method is explained by which, based upon error-prediction information on the hard disk 53b storing information related to an image, the image data, stored in the region at which a possible error is predicted (hereinafter, referred to as an possible error area), is outputted. In this case, it is supposed that the operations in FIG. 10 are started upon completion of the aforementioned steps S1 through S5 as shown in FIG. 1.

First, when an error-prediction diagnosis is carried out on the hard disk 53b by using check commands of an interface between the hard disk 53b and the image-processing section 54, the image-processing section 54 judges whether or not there is any abnormality in the hard disk 53 by using the check commands (S21). When the judgement shows that there is any abnormality in the hard disk 53 (YES at S21), the image-processing section 54 successively analyzes the contents of the error. (S22).

In the above-mentioned analysis, the start address and the end address of the possible error area of the hard disk 53b is detected. In the possible error area thus detected contains image data in the form of continuous addresses. If the image data is left in the stored state in the possible error region, upon occurrence of an error in the possible error area in the hard disk 53b, it becomes impossible to take measures such as restoring the image data stored therein.

For this reason, an instructive message, which demands that the image data, stored in the possible error area, be released from the hard disk 53b to another storage device or be printed out, is forwarded to the image-processing section 54. The image-processing section 54 outputs the image data in accordance with the instructive message. In the present embodiment, the image-processing section 54 serves as an image-outputting means and a storage-device searching means, disclosed in the claims.

Upon receipt of the instructive message from the hard disk 53b, the image-processing section 54 searches for another storage device (an alternative storage device) for storing the image data that has been stored in the possible error area in the hard disk 53b (S23). Here, the alternative storage device may be provided in the image-forming apparatus, or may be provided in another apparatus connected to the image-forming apparatus.

As a result of the step S24, in the case of the alternative storage device (YES at S23), the image data is forwarded to the alternative storage device (S24). Here, if there is no alternative storage device (NO at S23), the image data is outputted as printed data through a printer (S25).

In the case when, as shown in FIG. 5, the means for transmitting image data and image-controlling data to an external digital device such as a personal computer (PC) (an image-data communication unit 57) is provided with the memory, the image data is stored therein in a compressed form. Further, if another hard disk 53b is installed, the image data is forwarded thereto.

The image-processing section 54 is preferably designed so that it can restrict the use of the hard disk 53b after the image data, which was stored in the possible error area, has been outputted and forwarded (S26). With respect to the method for restricting the hard disk 53b, it will be discussed later in corresponding embodiments.

Figure 11:
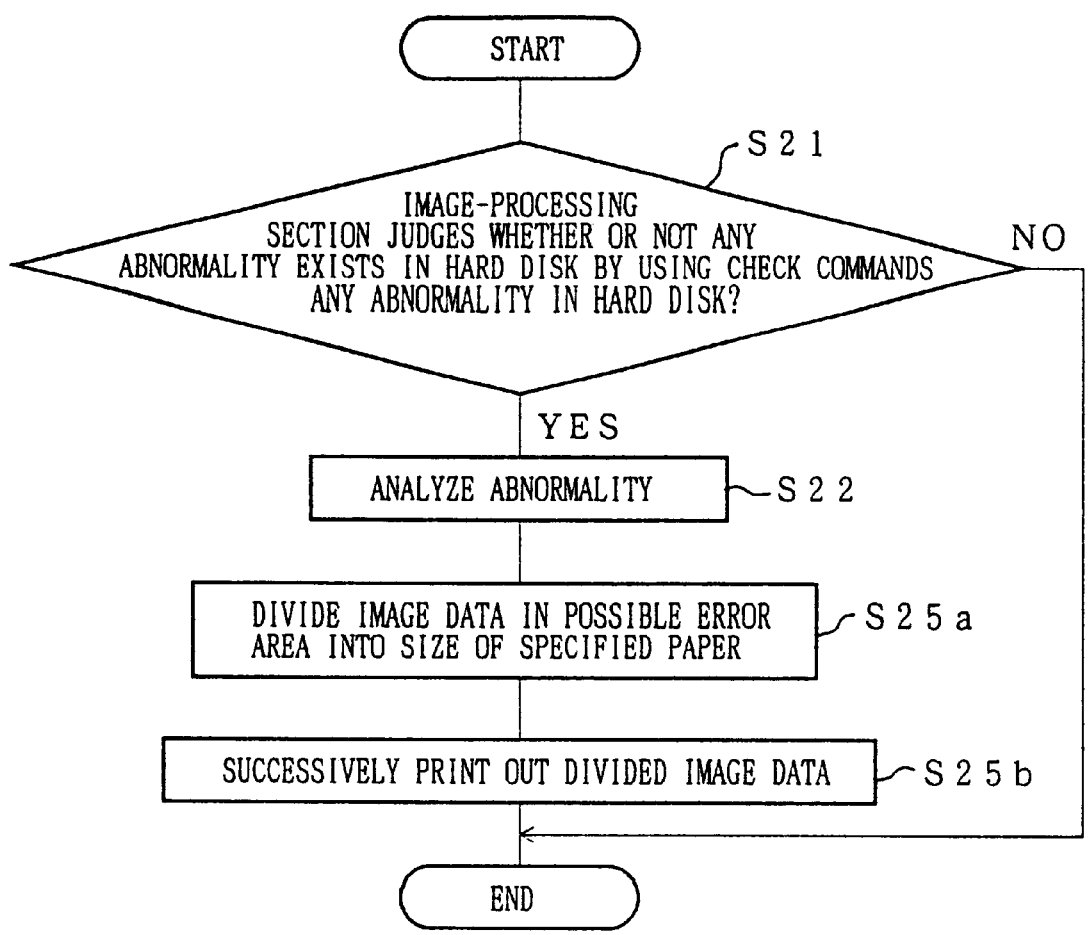
FIG. 11, which shows still another embodiment of the present invention, is a flow chart that shows processing operations related to error-prediction of the digital copying machine.

Moreover, processes as shown in a flow chart in FIG. 11 may be carried out as a modified example of FIG. 10. In the processes shown in FIG. 11, the image-processing section 54 judges whether or not there is any abnormality in the hard disk 53b (S21), and if the judgement shows that there is an abnormality (YES at S21), the same processes as those shown in FIG. 10 are carried out until the image-processing section 54 has analyzed the contents of the abnormality (S22).

Thereafter, sheets of paper are selected in accordance with the image size of the image data stored in the possible error area in the hard disk 53b that has been detected by the error analysis, and the image data is divided based on the size of the specified paper selected by the image-processing section 54 (S25a). Since the image size is managed as file information for each image data, the image-processing section 54 is readily allowed to obtain the information of the image size.

Then, the image data, divided based on the size of the specified paper, is successively printed on the specified paper, and outputted (S25b).

At this time, if no paper fits the image size, sheets of paper that has a size smaller than that of the original image data are selected as the specified paper, and the image data is further divided, and printed out using the specified paper.

In the above-mentioned processes, the filing information and dividing information are recorded without carrying out processes such as a variable-magnification process and an editing process so that the image data can be composed as one area when the image data is again read; thus, the output image data is re-stored.

Figure 12:
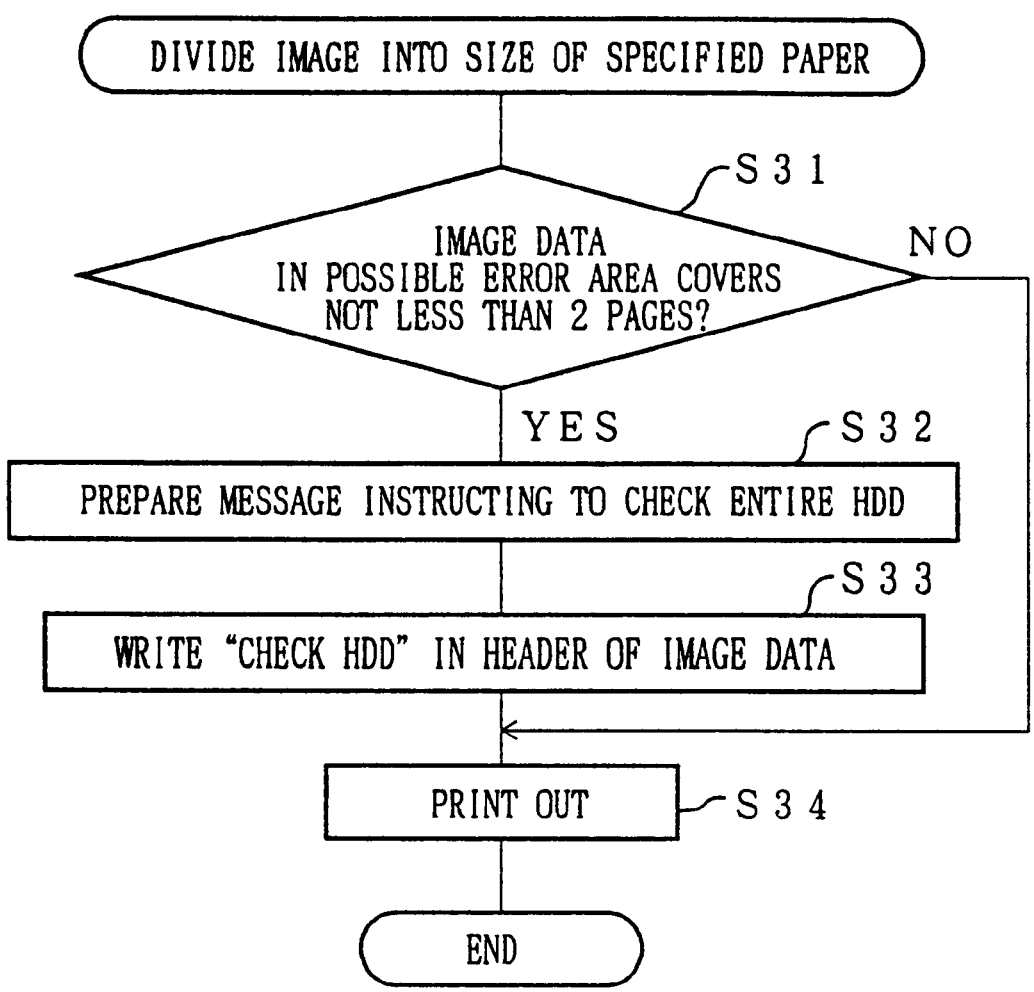
FIG. 12, which shows still another embodiment of the present invention, is a flow chart that shows processing operation related to error-prediction of the digital copying machine.

Moreover, steps as shown in FIG. 12 may be inserted between S25a and S25b of FIG. 11. More specifically, in the processes in accordance with the flow chart of FIG. 12, based upon the error-predicting information in the hard disk 53b, a message image asking for instructions is recorded in one portion of the output image, while the image data, stored in the possible error area, is outputted from the printer.

First, at S25a in the flow chart of FIG. 11, when the image data, stored in the possible error area, has been divided based on the size of the specified paper selected by the image-processing section 54, the sequence proceeds to S31 of FIG. 12. At S31, the image-processing section 54 judges whether or not the image data, stored in the possible error area, bridges more than two pages. In other words, in the present embodiment, it is considered that if there is an abnormal area bridging more than two pages, the image data may be damaged seriously.

If the judgement shows that the image data bridges over more than two pages (YES at S31), the image-processing section 54 prepares an instructive message calling for the user to check the entire region of the hard disk 53b (S32).

Successively, the instructive message is written in the header or footer of the image data that is to be printed out, that is, the image data stored in the possible error area (S33).

Thus, the image data with the instructive message written therein is outputted (S34), thereby allowing the user to restrict the use of the hard disk 53b through the operation panel unit 55 of the image-forming apparatus in accordance with the instructive message.

As described above, in the image-processing apparatus of the present embodiment, it becomes possible to preliminarily detect any error in the hard disk 53b and any abnormality such as abnormal access speeds to image data that is stored with continuous addresses, based upon the error-predicting information in the hard disk 53b. With this arrangement, it becomes possible to take an appropriate counter measure prior to the occurrence of the error, and consequently to ensure the reliability of image data stored in the hard disk 53b.

For example, when compressed data is stored in the hard disk 53b, any abnormality in data poses a serious problem upon carrying out a complete restoration of the data; however, if the data is outputted at the time when any error in the hard disk 53b is predicted, it becomes possible to file the data.

Furthermore, the arrangement in which the user is warned of any predictable error and asked for a corresponding counter measure makes it possible for the user to take a more appropriate counter measure responsive to the situation.

Embodiment 3

In this embodiment, referring to a flow chart in FIG. 13, an explanation will be given of a method in which after the image data, stored in the possible error area in the hard disk 53b, has been outputted, the image data is forwarded to another storage device based on the error-predicting information in the hard disk 53b. Here, it is supposed that the flow chart of FIG. 13 starts upon completion of the step S25a in the flow chart of FIG. 11.

When the image data, stored in the possible error area, has been printed out at S25a in FIG. 11, the image-processing section 54 judges whether or not another storage device is connected to the system including the present image-forming apparatus (S41).

When another storage device is connected to the system (YES at S41), a judgement is made as to whether or not the storage device is a storage device of a personal computer (S42). If it is a storage device of a personal computer, a message indicating that the image data, stored in the possible error area, is to be forwarded to the storage device of the personal computer is displayed through the operation panel unit 55 (S43), and when the acceptance of the data transfer is entered by the user (YES at S44), the image-data transfer is initiated (S45).

If S42 indicates that the storage device is not a storage device of a personal computer (NO at S42), a judgement is made as to whether or not it is a storage device provided in another machine (for example, another image-forming apparatus, etc.)(S46). If any machine provided with such a storage device is connected to the system, a message indicating that the image data, stored in the possible error area, is to be forwarded to the storage device of the machine is displayed through the operation panel unit 55 (S47), and when the acceptance of the data transfer is entered by the user (YES at S48), the image-data transfer is initiated (S49).

Upon completion of the image-data transfer by S45 or S49, the image data stored in the possible error area in the hard disk 53b is deleted (S50).

As described above, in the image-processing apparatus of the present embodiment, the image data, stored in the possible error area in the hard disk 53b, is printed out, and prior to deletion of the image data, a message concerning the way in which the image data is to be dealt with is displayed on the operation panel unit 55. In other words, in the above-mentioned display, a message concerning where to forward the image data is displayed. In order to provide this display, the image-processing section 54 searches for any storage devices capable of receiving the image data among all the machines (such as personal computers and image-forming apparatuses) connected to the system. For example, if a hard disk of the host computer connected to the system is available, the image data is forwarded to the hard disk. In other cases, the image data is forwarded to a hard disk 53b of another image-forming apparatus.

Figure 13:
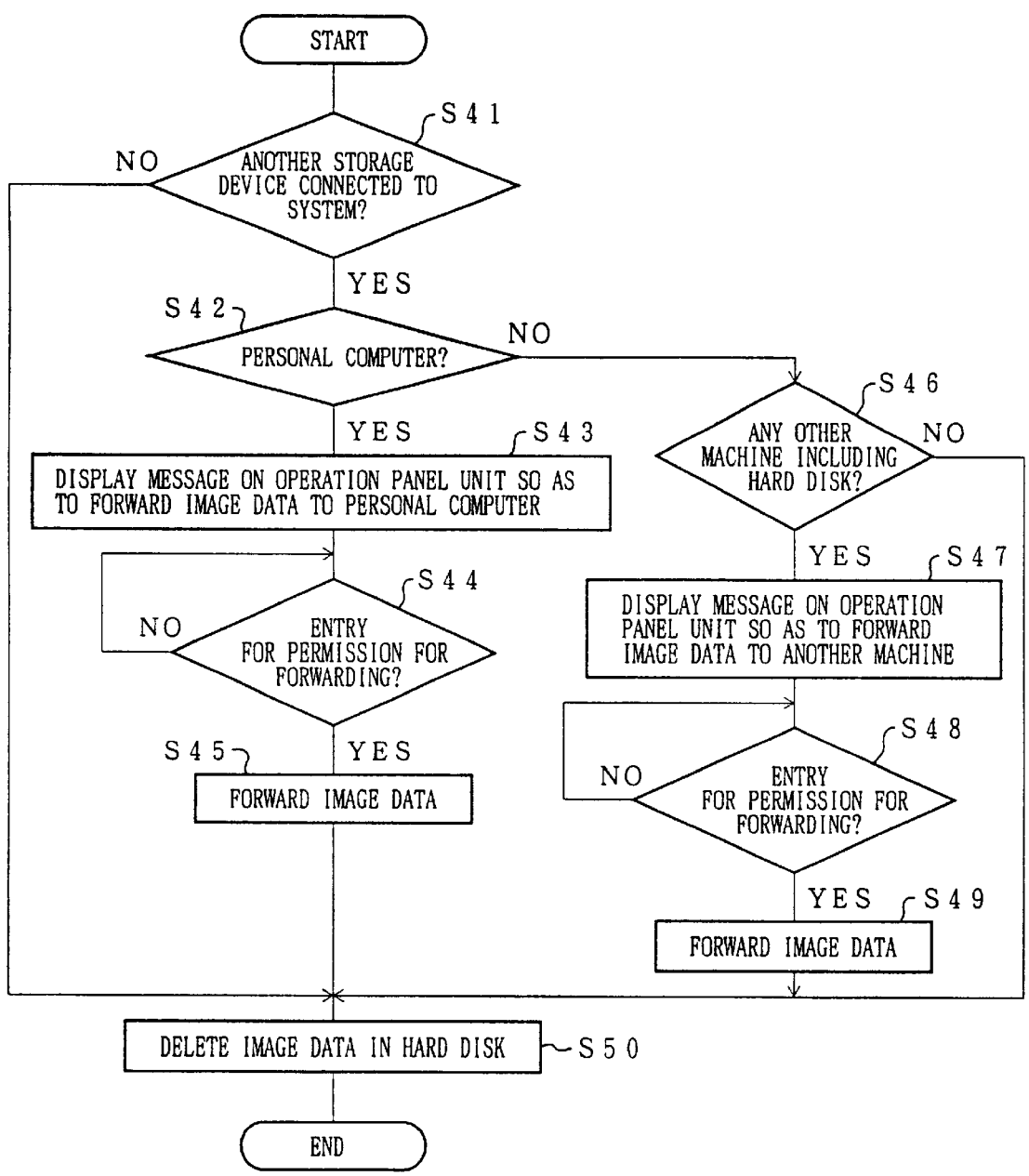
FIG. 13, which shows still another embodiment of the present invention, is a flow chart that shows processing operations related to error-prediction of the digital copying machine.

Although the flow chart of FIG. 13 exemplifies a case in which the image data, stored in the possible error area in the hard disk 53b, is forwarded to another machine, the image data may be forwarded to another area of the same hard disk 53b. In this case, the image data in the possible error area is transferred to another area after having been temporarily shifted to a buffer memory.

As described above, in the image-processing apparatus of the present embodiment, based on the error-predicting information of the hard disk 53b, the image-processing section 54 temporarily removes the image data from the possible error area by forwarding the image data in the possible error area to a personal computer, etc. of another system connected to the network.

Embodiment 4

In the image-processing apparatus of the present embodiment, the number of accesses to the hard disk 53b storing image data is counted in each image-processing mode, and based on the number of accesses, any error in the hard disk 53b is predicted. Simultaneously, modes regarding image processes are controlled. In the present embodiment, the image-processing section 54 corresponds to a first confirming means, a predicting means and a suspending means which are disclosed in the claims.

In order to manage the use of the hard disk 53b, a managing list as shown in FIG. 14 is created and used. The image-processing section 54 manages this managing list. The managing list is stored in association with respective image-processing modes that are set in the operation panel unit 55. Information, stored in the managing list, includes amounts of memory that are preliminarily required for the respective modes. Each amount of memory is given as start and end addresses of an area (storage area) required for an image-data storage and the capacity of the storage area. The number of accesses to the hard disk 53b refers to the number of retries occurring at the time of access to the image data in the hard disk 53b or at the time of entry of data during an image-processing operation. Here, retries refer to a state in which no accurate access is made to the data in the hard disk 53b; and by counting the number of retries, it becomes possible to predict any error in a recording area that is currently used.

Referring to a flow chart in FIG. 15, an explanation will be given of the above-mentioned error prediction in detail.

First, the image-processing section 54 confirms which image-processing mode is currently used (S51), and under the currently-used image-processing mode, an access to the hard disk 53b is successively carried out (S52).

Next, a judgement is made as to whether or not any retry occurs during the access, and if there is a retry (YES at S53), the number of retries, stored in the managing list, is increased correspondingly (S54). Then, a judgement is made as to whether or not the retries continuously occurred in a plurality of times in the same mode, and in the case of continuous occurrences (YES at S55), a message for inhibiting the selection of the image-processing mode that has caused continuous retries is displayed on the operation panel unit 55 (S56). Moreover, the selection of the above-mentioned image-processing mode is temporarily suspended (S57). Here, the case in which the retries continuously occurred in a plurality of times in the same mode, for example, refers to a case in which in a repeat-copy mode for copying more than two copies of an image that has been read, retries are made in a plurality of times due to a possible error.

At this time, with respect to image-processing modes other than the mode whose selection has been suspended, their selection is still effective (S58).

Additionally, areas in the hard disk 53b to be used are different depending on the image-processing modes; therefore, in the event of a write error being made onto the hard disk 53b, the use of the modes is limited. With respect to the errors, not limited to errors concerning the operation of the hard disk 53b, a plurality of the kinds of modes are listed as shown in FIG. 8.

Figure 15:
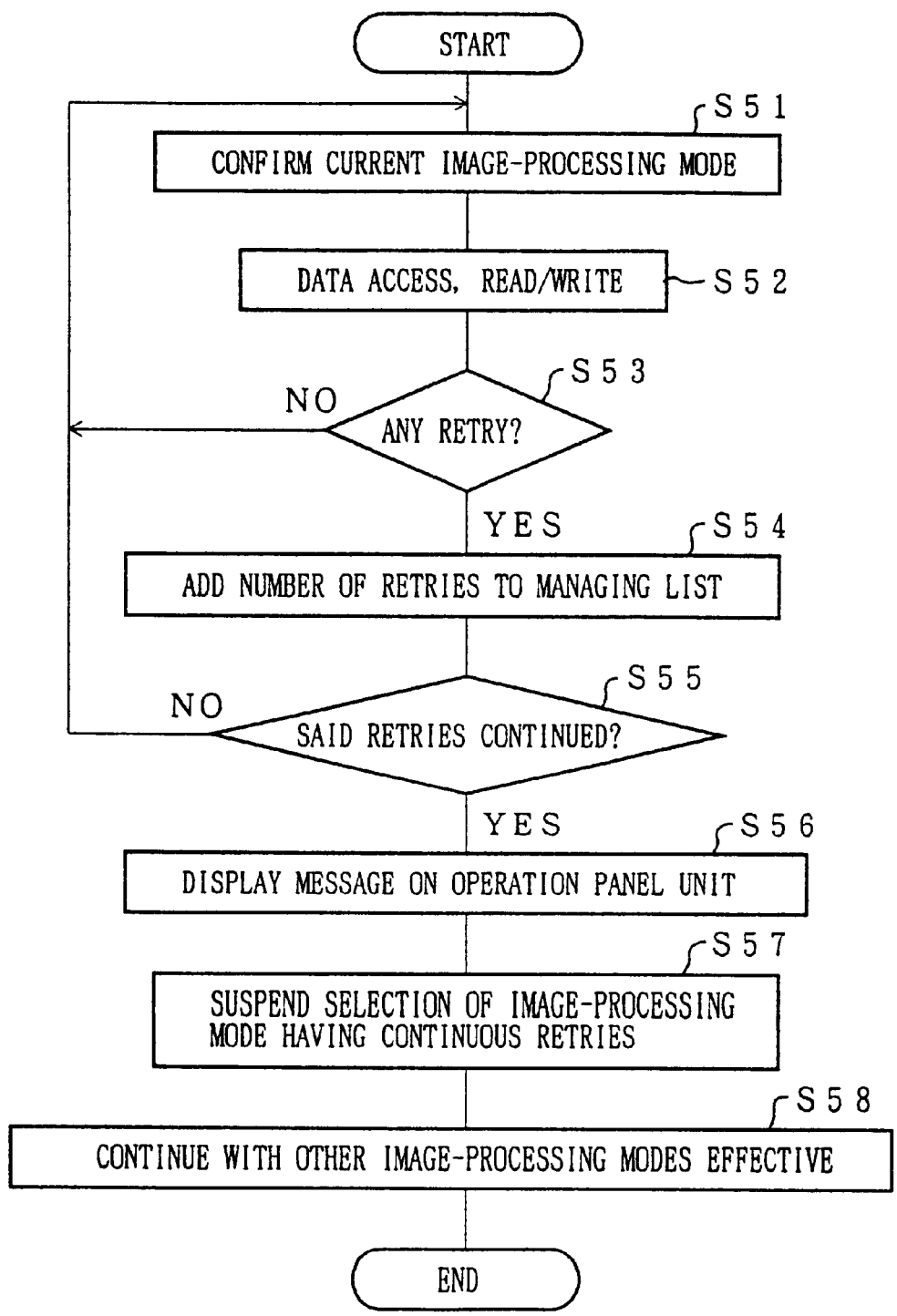
FIG. 15, which shows still another embodiment of the present invention, is a flow chart that shows processing operation related to error-prediction of the digital copying machine.
Figure 16:
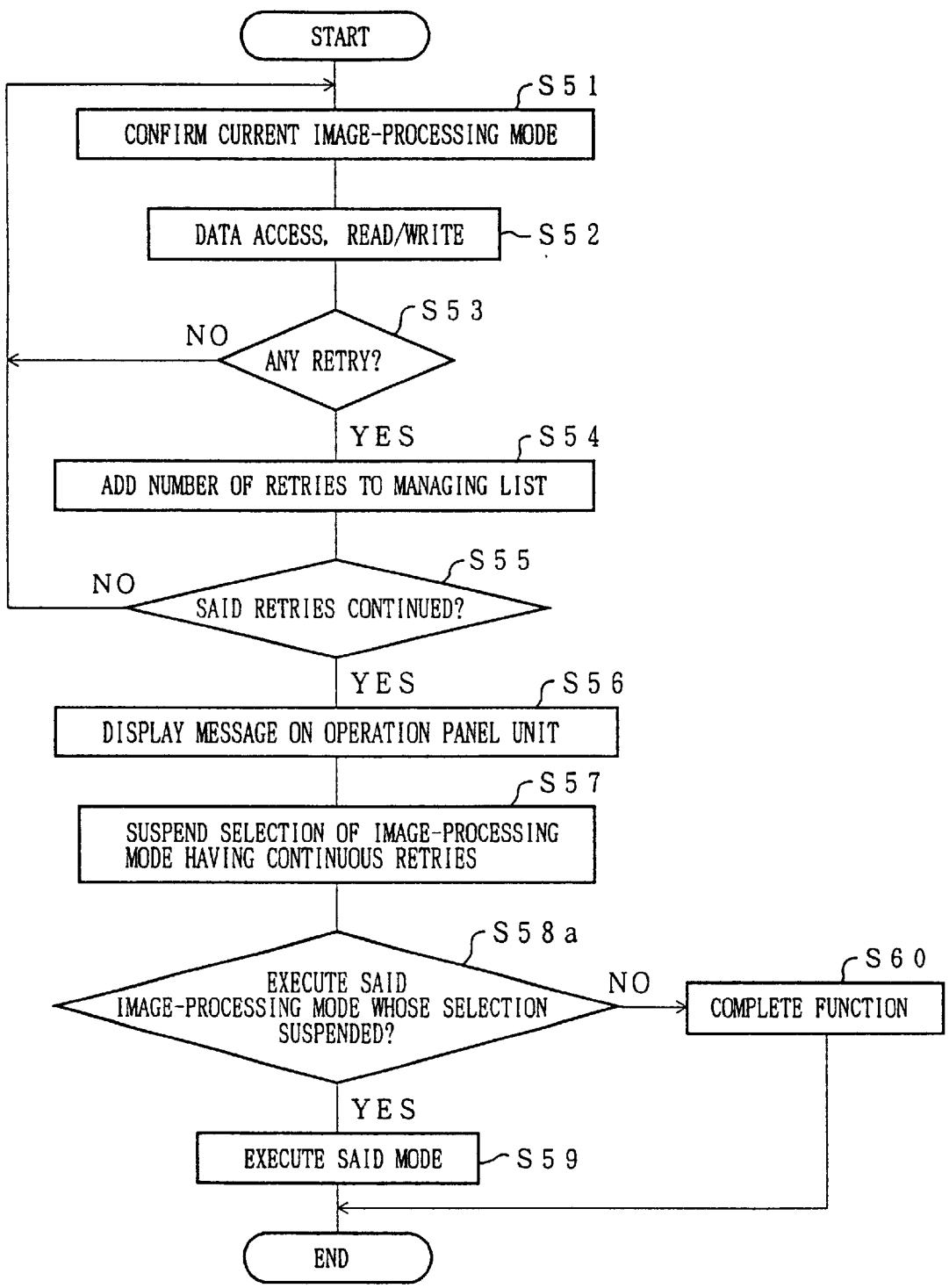
FIG. 16, which shows still another embodiment of the present invention, is a flow chart that shows processing operation related to error-prediction of the digital copying machine.

Moreover, processes as shown in a flow chart in FIG. 16 may be adopted as a modified example of FIG. 15. In the processes of FIG. 16, the same processes as those of FIG. 15 are carried out until the selection of the image-processing modes has been temporarily suspended at S57.

At S58a, a warning message for asking the user whether or not he or she wishes to carry out the image-processing mode whose selection has been temporarily suspended at S57. In other words, at S58a the image-processing mode whose selection has been suspended and a message for asking the user whether he or she wish to execute the mode continuously or to stop using it are displayed on the operation panel unit (a warning means); and in the case when the user wishes to select the execution, the sequence proceeds to S59, thereby carrying out the image-processing mode. In the case when the user wishes to stop using it, the sequence proceeds to S60, thereby completing the image-processing mode.

As described above, in the image-processing apparatus of the present embodiment, the use of the possible error area of the hard disk 53d is suspended, thereby carrying out an image-processing operation without using the possible error area. Thus, it becomes possible to eliminate abnormality in image data.

Moreover, with respect to the image-processing mode that needs to use the possible error region of the hard disk 53b, it is possible to alternate the process and also to clarify the cause of abnormality in the image by giving messages to the user.

Embodiment 5

In the image-processing apparatus of the present embodiment, the number of accesses to the hard disk 53b storing image data is counted in each image-processing mode, and based on the number of accesses, any error in the hard disk 53b is predicted. Simultaneously, one portion of the set mode (the number of copies, etc.) is restricted.

The above-mentioned process is achieved by recording the number of occurrences of retries for each memory area in the recording of error prediction. The number of retries is accumulated in the hard disk 53b as the managing list shown in FIG. 14.

Figure 17:
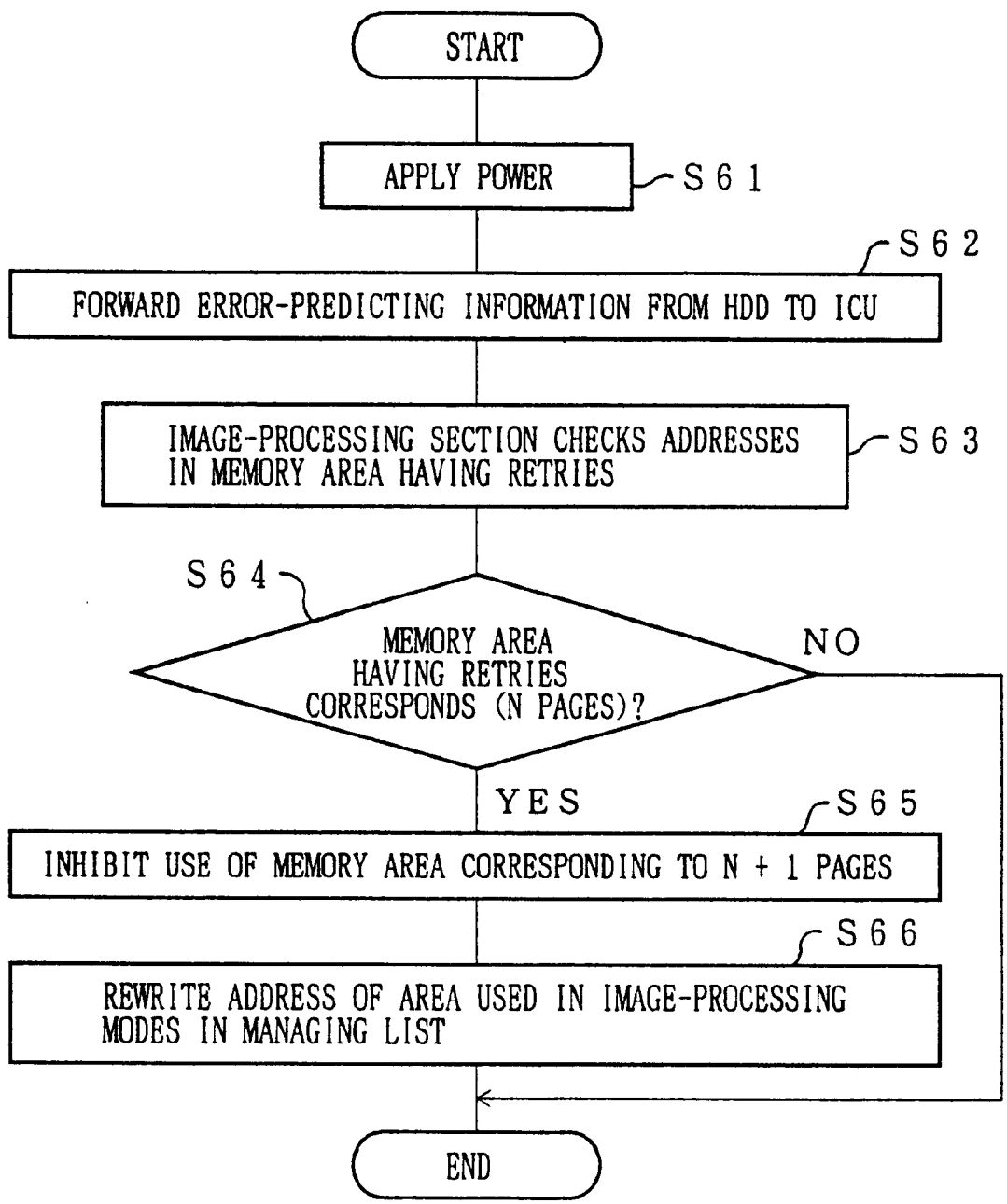
FIG. 17, which shows still another embodiment of the present invention, is a flow chart that shows processing operation related to error-prediction of the digital copying machine.

As illustrated in FIG. 17, upon application of power to the image-forming apparatus (S61), error-prediction information is forwarded to the image-processing section 54 from hard disk 53b (S62).

Based upon the error-prediction information, the image-processing section 54 confirms the address of a memory area at which retries occurred (S63). A judgement is made as to whether or not there is a memory area at which retries occurred by the address confirmation by the image-processing section 54 (S64). At this time, if there is a memory area at which retries occurred, the number of pages (N-number of pages), which correspond to the memory area, is simultaneously confirmed.

If the memory area exceeds N pages, the use of the memory area corresponding to N+1 pages is inhibited (S65), and only the process corresponding to pages which can be carried out by using the rest of the memory area is operable. In other words, if the memory area at which retries has occurred exceeds one page, the use of the memory area corresponding to two pages is inhibited. This is a result of the fact that anything that exceeds the above-mentioned memory is considered to be a second page.

More specifically, in the case when the hard disk 53b deals with image data, in order to write the image data using continuous addresses, image-data is forwarded after a memory area corresponding to required pages has been maintained prior to the writing operation. Therefore, if memory area at which retries occurred exceeds 1 page, the use of the memory area corresponding to 2 pages is inhibited.

For example, in the electronic RDH operation, when it is assumed that the number of pages to be processed is 100 in the case of no retries in the memory area, if a memory area exceeding 49 pages is subjected to retries, the use of the memory area corresponding to 50 pages is inhibited. In other words, the number of processable pages in the image processing mode is restricted to 50 pages based upon the error-predicting information; thus, the frequency of use of the hard disk 53b is reduced to half. More specifically, the memory area that has a smaller number of retries is selected and used.

Moreover, in the above-mentioned flow chart, another arrangement may be proposed in which when the number of retries in the memory area specified in the image-processing mode in use has reached a predetermined value, the output of the image is temporarily stopped, and the image data of the above-mentioned memory area is repaired.

In this case, the image-processing section 54 counts the number of retires in the hard disk 53b, and an error prediction is carried out by the counted value. Then, processes related to the area at which any error is predicted, that is, the area having a great number of retries, are temporarily suspended.

After this suspension, the image data in the above-mentioned memory area is repaired. In other words, since, in the above-mentioned memory area, data is written in a substitute memory area due to retries of the image data, these are connected and forwarded to another memory area (a portion without abnormality) as continuous address data, where the processes are resumed.

Moreover, in the above-mentioned flow chart, another arrangement may be proposed in which, after the number of retries in the memory area specified in the image-processing mode in use has reached a predetermined value, images which are outputted thereafter are discharged in a manner different from that carried out before.

In this case, the image-processing section 54 counts the number of retries in the hard disk 53b, and any error is predicted based on the counted value. When image data, stored in the memory area at which any error is predicted, is continuously outputted in the multi-shot operation, it is outputted in a combined manner into one page so that the time of use of the hard disk 53b is shortened. In order to combine it into one page, it is read from the hard disk 53b and reduced.

In this manner, image data corresponding to a plurality of pages is read from the hard disk 53b, and reduced and combined into one page, and this combined image is stored in a page memory (storage means: a main memory 53a in FIG. 5 in this case), and the next reading operation is carried out from the page memory; thus, only one access to the hard disk 53b is required.

As described above, in the image-processing apparatus of the present embodiment, at the time when any error in the hard disk 53b is predicted, if an outputting process is being carried out, the outputting process is temporarily suspended, and after the image in the possible error area has been transferred to a safe area, the process is resumed; thus, the number of accesses to the possible error area is reduced and the time of the outputting process is shortened, both making it possible to readily take measures to errors in the hard disk 53b.

Embodiment 6

In this embodiment, an explanation will be given of a method by which the processing function of image data using the hard disk 53b is restricted based upon error-predicting information in the hard disk 53b that stores information related to images.

In the digital copying machine 1 of the present embodiment, processing methods in the copying mode are mainly classified into two processing methods, that is, one method in which no hard disk 53b is required for copying and the other method in which the hard disk 53b is required for copying.

With respect to the method in which no hard disk 53b is required for copying, specific examples are processing methods, such as one-sided/double-sided copying and variable magnification copying, and these are conventional analog machines' functions. In these copying functions, image data, outputted from the CCD 26, is inputted to the CCD input section 50a of the image-data input section 50, and the inputted image is stored in a memory such as RAM, and outputted to the laser output section 52d of the output section 52 so as to carry out a copying operation.

Figure 9:
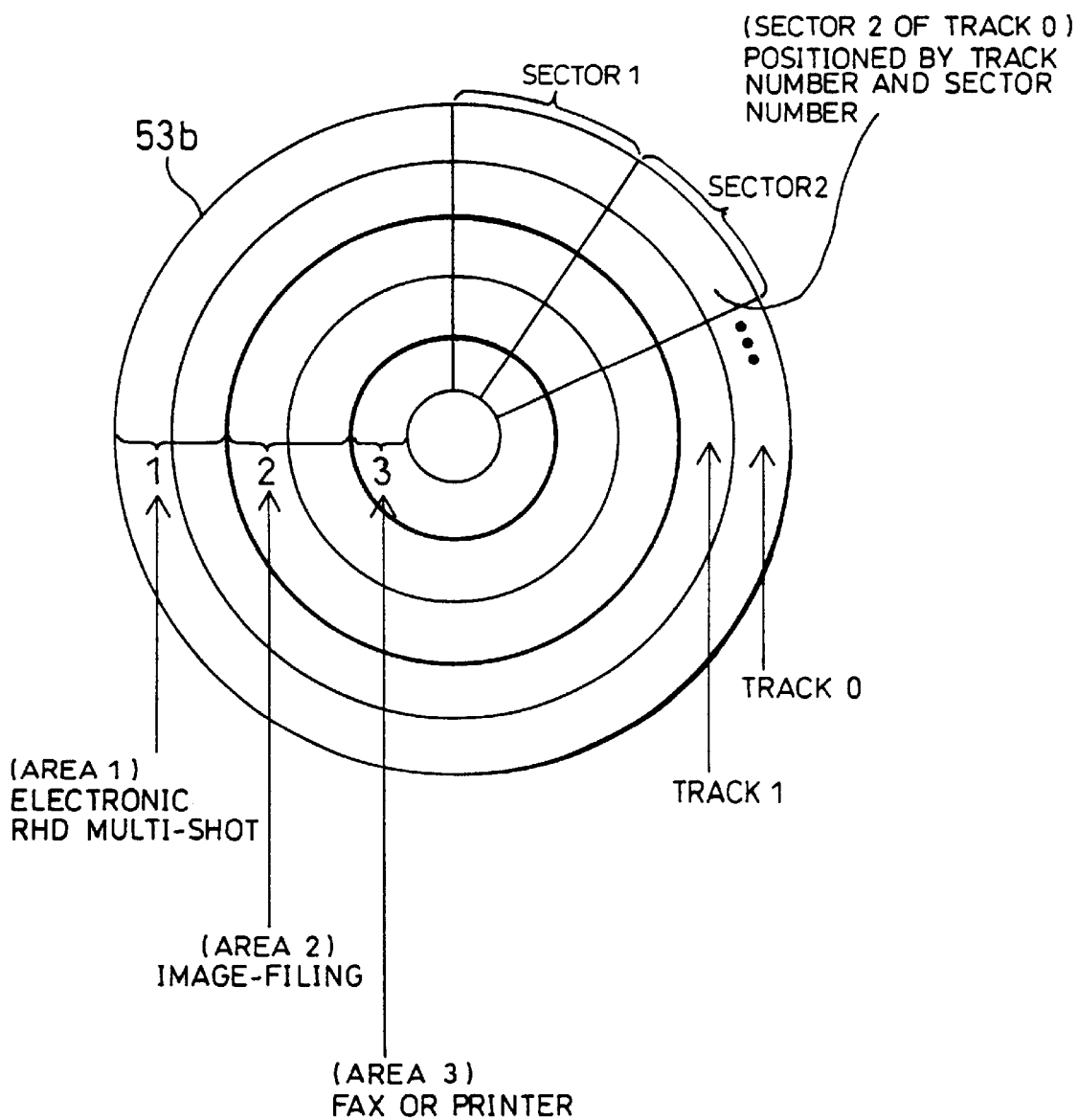
FIG. 9 is an explanatory view that shows an image-data storage region of the hard disk.

Moreover, with respect to the method in which the hard disk 53b is required for copying, specific examples are processes such as electronic RDH (Recirculating Document Handler), image filing and multi-shot (4 in 1), and these functions are typical of digital copying machines. In these copying functions, image data, which corresponds to a plurality of pages, is continuously inputted at one time through the CCD input section 50a of the image data input section 50, and the inputted image data is successively stored in a first area or a second area on the hard disk 53b as shown in FIG. 9. Then, in accordance with functions selected on the operation panel, the image data, stored in the hard disk 53b, is edited in the image-processing section 54, and outputted to the laser output section 52d so as to carry out a copying operation. Additionally, the above-mentioned image filing function is a function by which document data, sharedly owned in an office, etc., is sharedly maintained in the hard disk 53b, and the multi-shot function is a function by which image data, which corresponds to a plurality of documents that have been read, is automatically subjected to a variable magnification so that it is outputted onto a one sheet of recording paper.

Moreover, the digital copying machine 1 also has functions as a facsimile and a printer that are functions except for those in the copying mode. When the digital copying machine 1 is used in the facsimile mode, a third area in the hard disk 53b is allocated as an image-storing area used for facsimile, as shown in FIG. 9. Sent and received image data is stored in the third area in an image-compressed state by means of the image-compression system such as MH (Modified Huffman)/MR (Modified Read) system. The sent and received data, stored in the third area, is outputted (transmitted/printed) after having been restored from the compressed image data.

Furthermore, if not used in the facsimile mode, the third area is allocated as a received-information storing area for printing. In other words, page-printing description language (PDL), transmitted from an external apparatus such as a personal computer, etc., is stored in the third area. The page-printing description language (PDL), stored in the third area, allows image data to be developed in a bit map format in a memory such as a RAM so as to output the image data.

Figure 18:
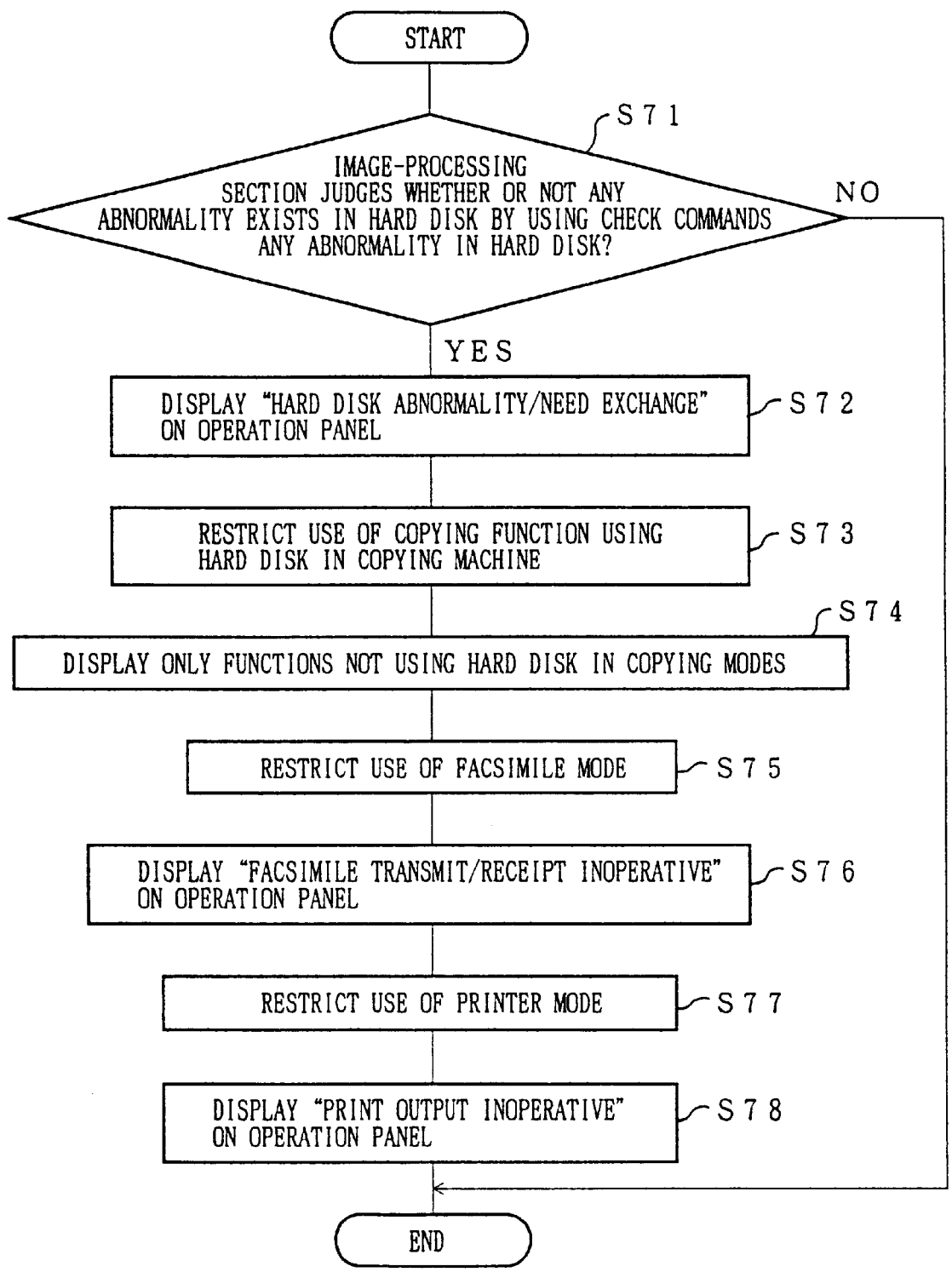
FIG. 18, which shows still another embodiment of the present invention, is a flow chart that shows processing operation related to error-prediction of the digital copying machine.

Next, referring to a flow chart in FIG. 18, an explanation will be given of a processing operation of the digital copying machine 1 that is carried out when any abnormality is detected in the hard disk 53b based on the error-predicting information. Here, it is supposed that the operation of FIG. 18 is started upon completion of the steps S1 through S5 in FIG. 1.

As described earlier, the error prediction on the hard disk 53b is executed by using check commands between the hard disk 53b and the image-processing section 54. When any abnormality in the hard disk 53b is detected by the check commands (YES at S71), the image-processing section 54 allows the operation panel unit 55 to display a screen message indicating "Abnormality in Hard Disk", "Hard Disk Exchange Required", etc. through the central processing unit 58 (S72).

Successively, the image-processing section 54 demands the operation panel unit 55 through the central processing unit 58 not to give a screen display with respect to functions in which the hard disk 53b has to be used to make copies. In other words, in accordance with the instruction from the image-processing section 54, the operation panel unit 55 restricts copying functions, such as electronic RDH, image filing, image-shift and compose and multi-shot (4 in 1) so that operations for these functions are not accepted (S73). However, with respect to operations such as one-sided/double-sided copying and variable magnification processes which are available without using the hard disk 53b, these copying operations are accepted, and displays for these functions are provided (S74).

As described above, in the present digital copying machine 1, in the case of detection of any abnormality in the hard disk 53b, that is, in the case when the hard disk 53b is likely to have an error, only general copying functions without the need for the hard disk 53b are made operative without stopping all the copying functions.

Moreover, the digital copying machine 1 of the present embodiment is provided with facsimile and printer modes as functions other than the copying mode. If an error occurs in the hard disk 53b when the facsimile mode is in use, sent and received images, which have been compressed in the image-compression systems such as MH/MR, can not be restored (decompressed). This might make it impossible to transmit and receive the images to and from the other party, or print the images. Therefore, if the digital copying machine has a facsimile mode, the image-processing section 54 restricts the use of the facsimile mode (S75), and demands the operation panel unit 55 to display a message indicating that the facsimile mode cannot be used because of a possible trouble in the hard disk 53b (S76).

Furthermore, if an error occurs in the hard disk 53b when the printer mode is in use, images cannot be developed from page-printing description language (PDL) for page printer into a bit map format in memory such as a RAM. Therefore, if the digital copying machine has a printer mode, the image-processing section 54 restricts the use of the printer mode (S77), and demands the operation panel unit 55 to display a message indicating that the printer mode cannot be used because of a possible trouble in the hard disk 53b (S78).

However, if the digital copying machine 1 does not have a facsimile mode, those steps S75 and S76 are omitted, and if it does not have a printer mode, those steps S77 and S78 are omitted.

As described above, in the digital copying machine of the present embodiment, error-predicting information is forwarded from the hard disk 53b to the image-processing section 54, and based on the information, the image-processing section 54 analyzes the contents of warning from the hard disk 53b so that an appropriate counter measure can be taken. With this arrangement, although copying functions, such as electronic RDH, image filing, image-shift and compose and multi-shot (4 in 1), which are not operative without using the hard disk 53b, are restricted, other general copying functions without the need for the hard disk 53b are made operative.

Embodiment 7

In this embodiment, an explanation will be given of another method in which the error-predicting information in the hard disk 53b also contains information related to the possible error area and by which copying functions that require the hard disk 53b are restricted based upon the information.

In respective functions of the copying mode using the hard disk 53b, the areas of use in the hard disk 53b are assigned as follows: As illustrated in FIG. 9, the first area of the hard disk 53b is assigned as an area used for the electronic RDH and the multi-shot (4 in 1) in the copying mode, and the second area is assigned as an area used for image-filing in the copying mode.

Figure 19:
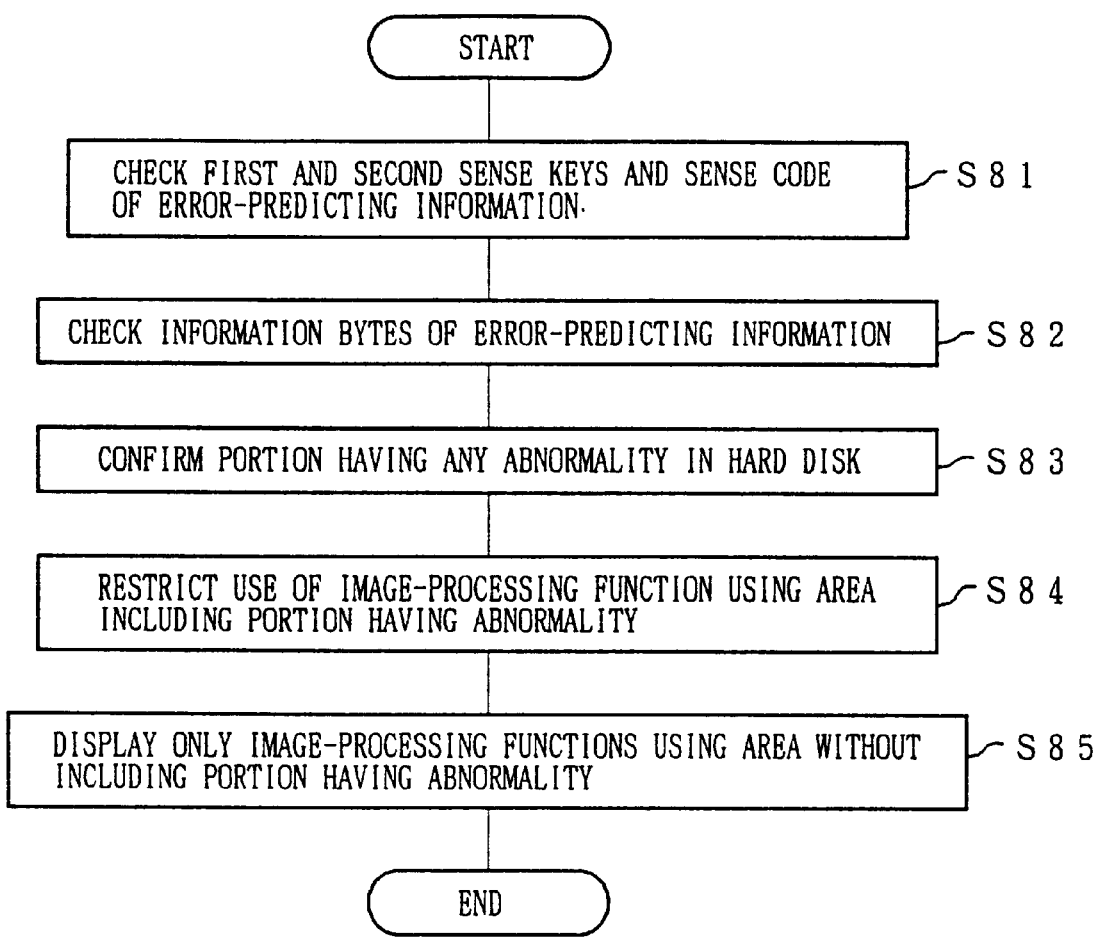
FIG. 19, which shows still another embodiment of the present invention, is a flow chart that shows processing operation related to error-prediction of the digital copying machine.

When error-predicting information is detected, a process for analyzing the information is carried out. Referring to a flow chart in FIG. 19, this operation is explained in detail. Here, it is supposed that the flow chart of FIG. 19 starts after those processes up to S8 shown in FIG. 1 have been completed, and gives more detailed examples of processes than those shown in S9 through S12.

In this error analysis, the classification and kind of error in the hard disk 53b are first detected by checking the first and second sense keys and sense codes (S81). Further, the start address and end address of the possible error area are detected by means of information bytes (S82). Based upon the detected start address and end address of the possible error area, the image-processing section 54 confirms the location of the possible error area in the hard disk 53b (S83). Although the possible error area can be confirmed by the sector Nos. and track Nos., this method merely gives an approximate confirmation.

After having confirmed which the possible error area is located in the hard disk 53b, the first area or the second area, the image-processing section 54 restricts functions so that those functions assigned to the possible error area can not be used (S84). Then, it allows only the functions assigned to the area without containing the possible error area to be displayed on the operation panel of the operation panel unit 55 (S85).

For example, if the image-processing section 54 detects the start address and the end address of the place of occurrence of an abnormality, and confirms that the possible error area is located in the first area, it restricts the use of the electronic RDH and multi-shot (4 in 1) functions assigned to the first area, while it demands the operation panel unit 55 for a display indicating that the image-filing function, assigned to the second area, can be used.

As described above, in the digital copying machine 1 of the present embodiment, the error-predicting information in the hard disk 53b contains information related to the possible error area, and only the processing functions assigned to the possible error area can be restricted. Therefore, the other processing functions that use the other part of the hard disk 53b except for the possible error area can be used.

Embodiment 8

In this embodiment, an explanation will be given of another method in which the error-predicting information in the hard disk 53b also contains information related to the capacity of storage data in the possible error area and by which copying functions that require the hard disk 53b are restricted based upon the information.

Figure 20:
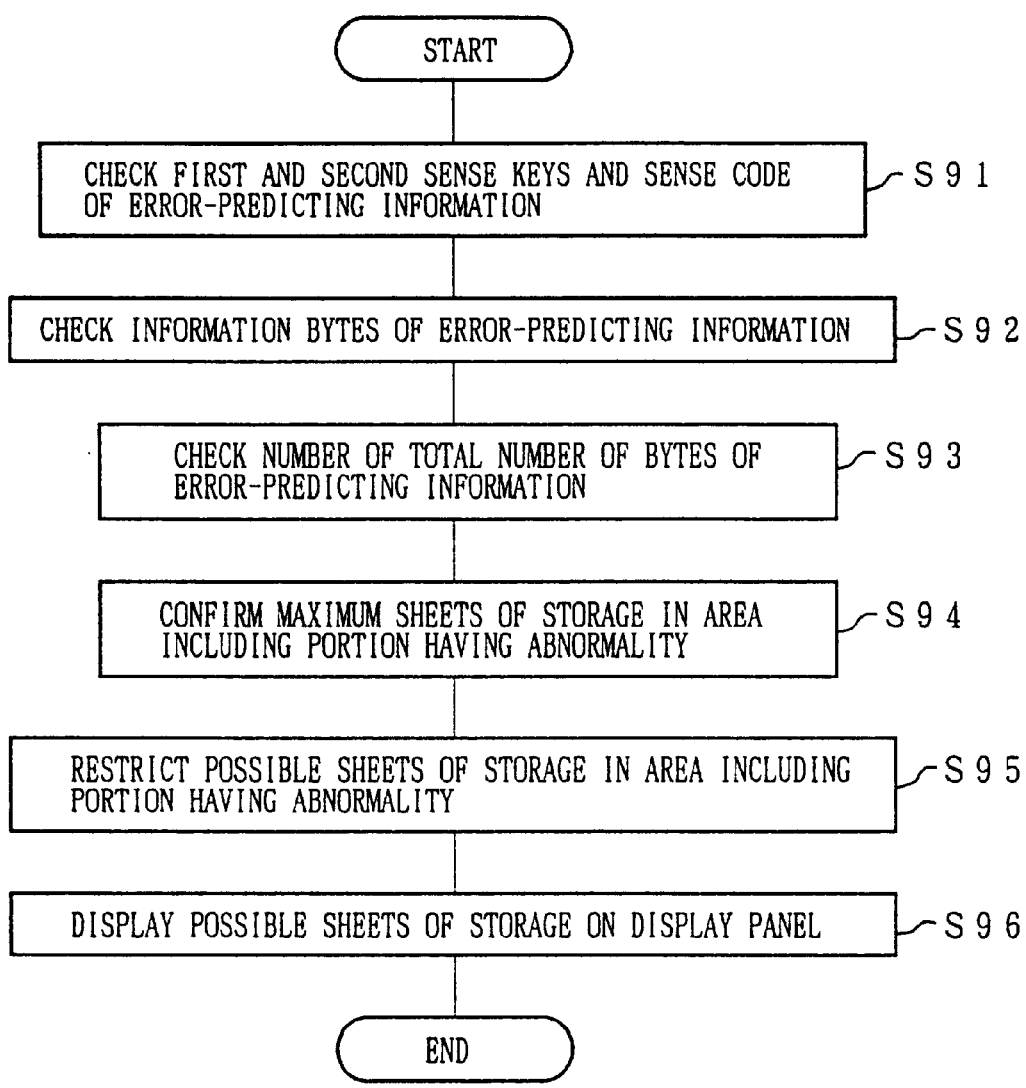
FIG. 20, which shows still another embodiment of the present invention, is a flow chart that shows processing operation related to error-prediction of the digital copying machine.

When error-predicting information is detected, a process for analyzing the information is carried out. Referring to a flow chart in FIG. 20, this operation is explained in detail. Here, it is supposed that the flow chart of FIG. 20 starts after those processes up to S8 shown in FIG. 1 have been completed, and gives more detailed examples of processes than those shown in S9 through S12.

In this error analysis, the classification and kind of error in the hard disk 53b are first detected by checking the first and second sense keys and sense codes (S91). Further, the start address and end address of the possible error area are detected by means of information bytes (S92). Based upon the detected start address and end address of the possible error area, the image-processing section 54 confirms the location of the possible error area in the hard disk 53b. Successively, the data capacity of the possible error area is detected by checking the total number of bytes contained in the error-predicting information (S93).

After having confirmed where the possible error area is located, the first area or the second area in the hard disk 53b, the image-processing section 54 confirms how much data, for example, how many sheets of A-4 paper, the area containing the possible error area can store, that is, the maximum number of sheets of storage in the area (S94). Then, the number of sheets of storage which corresponds to the data capacity of the possible error area found in S94 is calculated, and the number, given by subtracting the number of sheets of storage from the maximum number of sheets of storage, is set as the number of sheets of possible storage in the area containing the possible error area. Thus, a restriction is carried out so that the number of sheets of possible storage becomes equal to the maximum number of sheets of storage in the area (S95). Further, the number of sheets of possible storage is displayed on the operation panel of the operation panel unit 55 (S96).

For example, it is supposed that the image-processing section 54 detects a possible error area in the first area in the same manner as described earlier and confirms that the capacity corresponding to 4 M bytes (which equals to one sheet of A-4 paper) might suffer from an error. In this case, supposing that the maximum number of sheets of storage of the electronic RDH and multi-shot (4 in 1) functions during a normal operation, assigned to the first area, is 100 sheets (A-4 size), the image-processing section 54 allows the operation panel unit 55 to display a message indicating that only storage corresponding to 99 sheets (100−1 sheets) can be available.

As described above, in the digital copying machine 1 of the present embodiment, the error-predicting information in the hard disk 53b contains information related to the data capacity of the possible error area, and a restriction is imposed based upon the maximum number of sheets of storage of the processing functions assigned to the possible error area. Therefore, even with respect to functions using the hard disk 53b within the possible error area, they are not completely unusable, and become partially usable.

In the above-mentioned embodiments 6 through 8, explanations have been given of methods for restricting the use of processing functions that use the hard disk 53b based upon the error-predicting information. In the following embodiments, explanations will be given of methods for assigning storage areas of image data stored in the hard disk 53b in accordance with respective processing functions.

Embodiment 9

In this embodiment, an explanation will be given of a method in which until the error-predicting information of a specific area has reached a predetermined level, the area is assigned to a mode in which the hard disk 53b is frequently accessed and after the error-predicting information has reached the predetermined level, the area is assigned to a mode in which the hard disk 53b is less frequently accessed.

Figure 21:
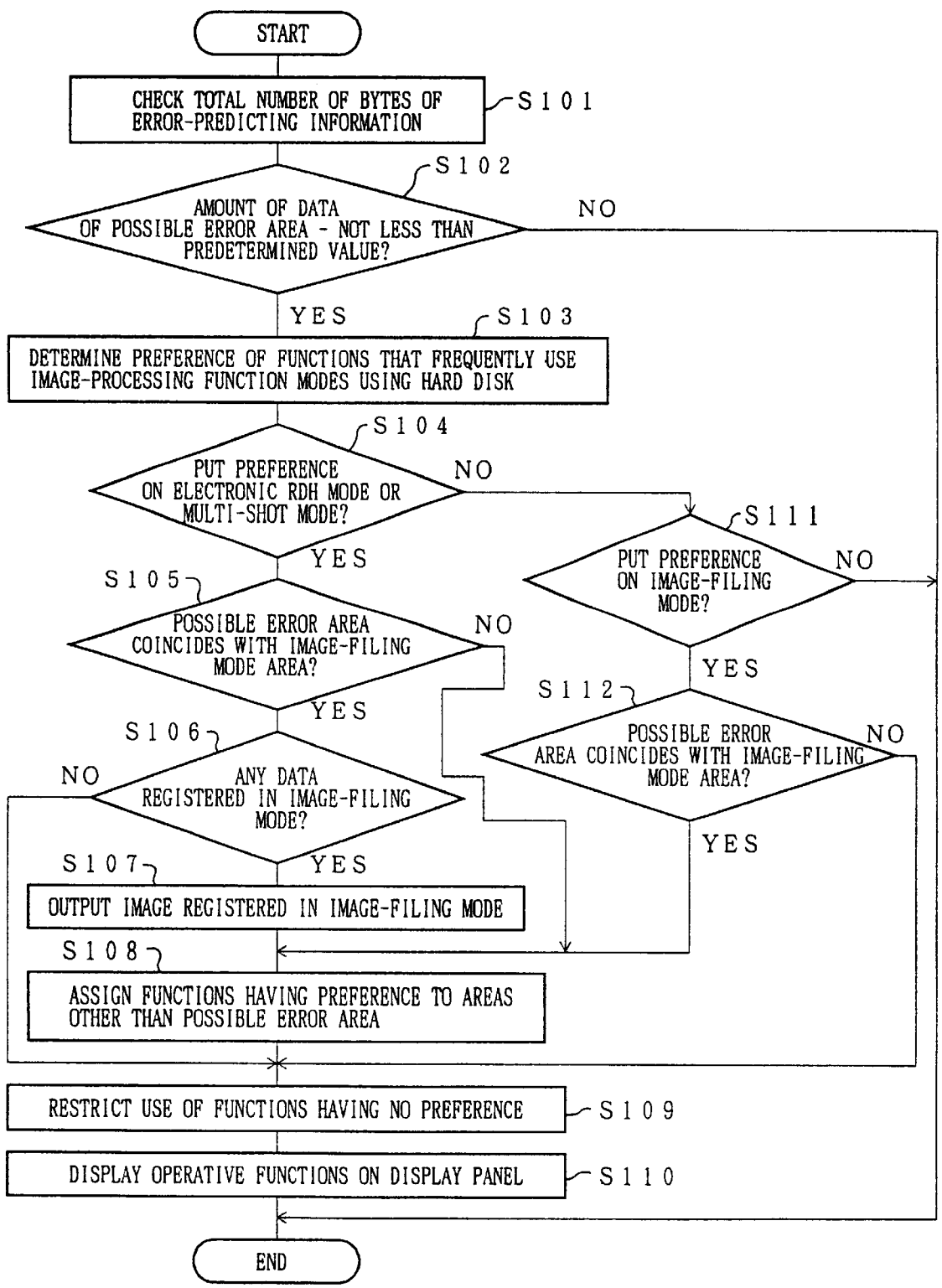
FIG. 21, which shows still another embodiment of the present invention, is a flow chart that shows processing operation related to error-prediction of the digital copying machine.

When error-predicting information is detected, a process for analyzing the information is carried out. Referring to a flow chart in FIG. 21, this operation is explained in detail. Here, it is supposed that the flow chart of FIG. 21 starts after those processes up to S8 shown in FIG. 1 have been completed, and gives more detailed examples of processes than those shown in S9 through S12.

In this error analysis, the total number of bytes of the error-predicting information is first checked (S101), and the data capacity of the possible error area of the hard disk 53b is detected. Then, a judgement is made as to whether or not the data capacity of the possible error area is not less than a predetermined value (S102). This predetermined value is set beforehand, for example, at a capacity corresponding to 90 sheets of A-4 size, supposing that the maximum number of sheets of storage for each of the first and second areas is 100 sheets of A-4 size.

If the data capacity of the possible error area is greater than the predetermined value (YES at S102), the image-processing section 54 receives information of frequency of use that shows the accumulated number of use for either the functions of the electronic RDH and multi-shot (4 in 1) assigned to the first area in the hard disk 53b or the image-filing function assigned to the second area, from the operation panel unit 55 through the central processing unit 58. Then, referring to the information of frequency of use, the image-processing section 54 gives preference to the function that has the most number of use (S103).

Successively, at S104, a judgement is made as to whether or not the function that has the preference is the electronic RDH mode or not, and if the electronic RDH mode has the preference (YES at S104), the sequence proceeds to S105. If the electronic RDH mode does not have the preference (No at S104), the sequence proceeds to S111.

At S105, a judgement is made as to whether or not the possible error area is contained in the area assigned to the image-filing mode. If the possible error area is contained in the area assigned to the image-filing mode (YES at S105), the sequence proceeds to S106, and if it is not contained in the area assigned to the image-filing mode (NO at S105), the sequence proceeds to S108.

At S106, a judgement is made as to whether or not any data which has been registered in the image-filing mode exists in the second area. If there exists data that has been registered as such (YES at S106), the sequence proceeds to S107, while if no data has been registered as such (NO at S106), the sequence proceeds to S109.

At S107, the registered image having the image-filing mode, stored in the second area, is outputted. At S108, a re-assignment is carried out so that the image-processing function having the preference uses the area other than the possible error area. At S109, the use of the image-processing function having no preference is restricted. Further, as S110, the usable functions are displayed on the operation panel.

Moreover, at S111, a judgement is made as to whether or not the function having the preference is the image-filing mode, and if the image-filing mode has the preference (YES at S111), the sequence proceeds to S112, while if the image-filing mode does not have the preference (NO at S111), this sequence is complete.

At S112, a judgement is made as to whether or not the possible error area is contained in the area assigned to the image-filing mode. If the possible error area is contained in the area assigned to the image-filing mode (YES at S112), the sequence proceeds to S108, and if it is not contained in the area assigned to the image-filing mode (NO at S112), the sequence proceeds to S109. Here, the case giving NO at S111 is a case in which no preference is given to any of the image-processing functions using the hard disk 53b, that is, a case in which the frequency of use for functions without the need for the hard disk 53b is the highest.

As described above, in the digital copying machine 1 of the present embodiment, based upon the error-predicting information in the hard disk 53b, if the data capacity of the possible error area is greater than a predetermined value, the use of the possible error area is restricted. However, with respect to functions which are frequently used by the user, they are re-assigned to the area in the hard disk 53b other than the possible error area. Therefore, those functions which are frequently used by the user are made operative continuously.

Embodiment 10

In this embodiment, an explanation will be given of a method for determining areas for storing image data based upon the types and features of the image data as well as based upon the error-predicting information.

In the digital copying machine 1 of the present embodiment, in the case when it is used in the copying mode or when it is used in the scanner mode by inputting image through the image-data input section 50 and forwarding the inputted image to a personal computer, it is preferable for the image data to be forwarded at higher speeds. For this reason, the image data, inputted through the CCD 26, is temporarily stored in a page memory such as a RAM, and the image data is successively stored in the hard disk 53b through the RAM. Thus, the hard disk 53b successively outputs the stored image data, thereby improving the forwarding efficiency of the image data. In this case, the RAM serves as a temporary buffer memory when the storing speed of the hard disk 53b is not fast enough.

When error-predicting information is detected, a process for analyzing the information is carried out.

Figure 22:
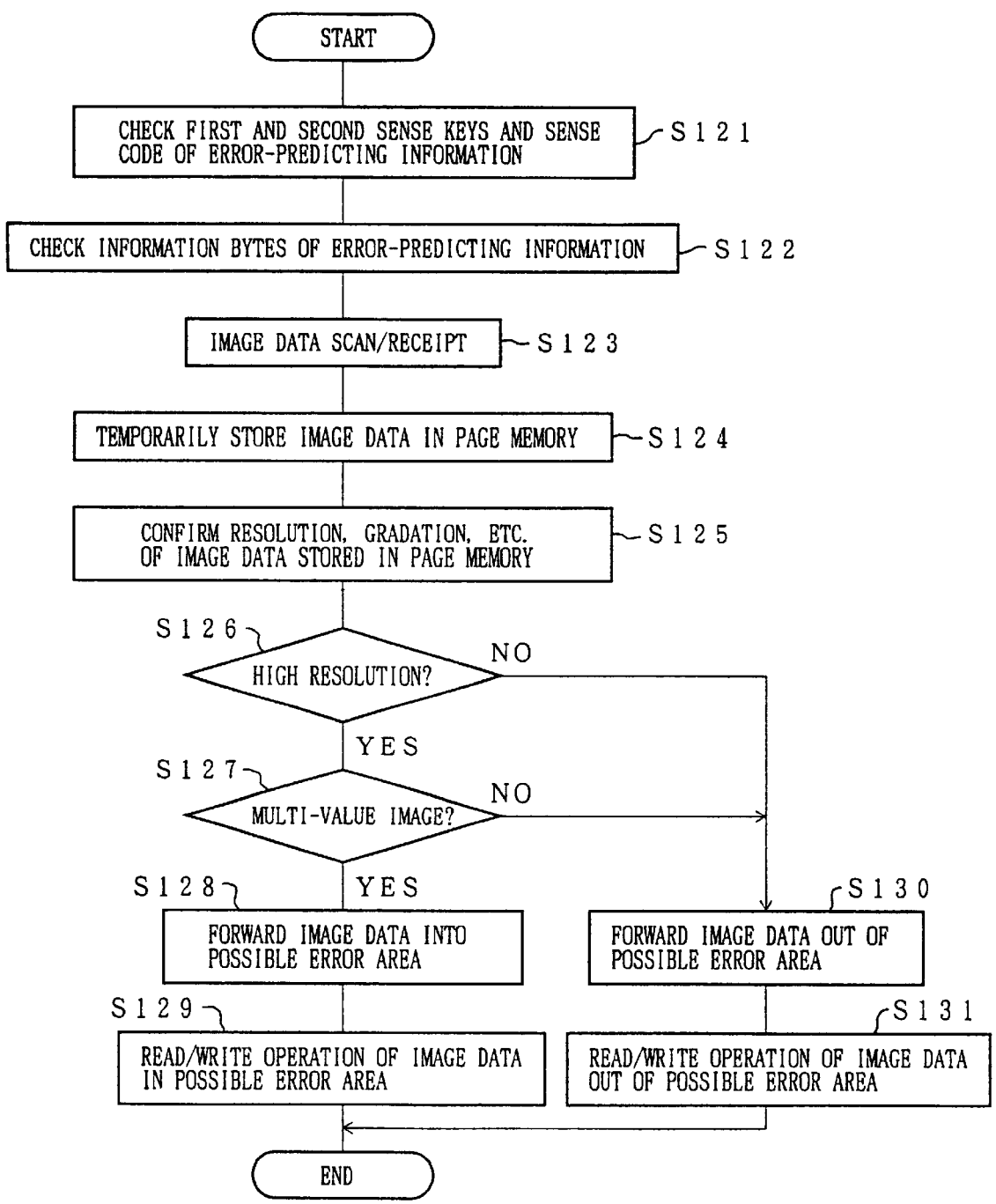
FIG. 22, which shows still another embodiment of the present invention, is a flow chart that shows processing operation related to error-prediction of the digital copying machine.

Referring to a flow chart in FIG. 22, this operation is explained in detail. Here, it is supposed that the flow chart of FIG. 22 starts after those processes up to S8 shown in FIG. 1 have been completed, and gives more detailed examples of processes than those shown in S9 through S12.

In this error analysis, the first and second sense keys and sense codes are checked (S121) so that the classification and kind of error in the hard disk 53b are detected. Moreover, the information bytes are checked (S122) so that the start address and end address of the possible error area in the hard disk 53b are detected. The image-processing section 54 recognizes in detail where the possible error area is located based upon the detected start address and end address of the possible error area.

In the present embodiment, in the scanner section 2 in the digital copying machine, an original document is laser-scanned, and image data is obtained by receiving the reflected light signal by the CCD (S123).

Next, the inputted image data is temporarily stored in a page memory such as a RAM (S124). The image data, temporarily stored in the page memory, is added by an image-data managing table. Referring to the contents of the image-data managing table stored in the page memory, the image-processing section 54 confirms information, such as resolution information and gradation information, of the image data (S125).

When the resolution of the image data is high (YES at S126), that is, when the resolution is not less than 400 DPI with pixel information of multi-values in the image-data managing table (YES at S127), the image-processing section 54 forwards the image data stored in the page memory to the possible error area in the hard disk 53b (S128). Then, the image-processing section 54 subjects the image data forwarded into the possible error area to a READ/WRITE process, and then outputs the resulting data (S129).

In contrast, when the resolution of the image data is low (NO at S126), that is, when the resolution is less than 400 DPI with binary pixel information in the image-data managing table (NO at S127), the image-processing section 54 forwards the image data stored in the page memory to an area other than the possible error area in the hard disk 53b (S130). Then, the image-processing section 54 subjects the image data forwarded to the area other than the possible error area to a READ/WRITE process, and then outputs the resulting data (S131).

As described above, in the digital copying machine 1 of the present embodiment, the area in which image data is to be stored is determined based upon the type of image data and the error-predicting information of the hard disk 53b; therefore, even if an error occurs as predicted by the hard disk, it is possible to reduce the adverse effects on the output image. In other words, since the image data stored in the possible error area has a high resolution and is data of a multi-value image; therefore, even if an error occurs in the hard disk 53b as predicted, the image data stored in the area has high density in the data amount and has less visible affects even when it is outputted.

Embodiment 11

In this embodiment, an explanation will be given of a method in which a feature of image data is extracted from the image data stored in the page memory and the area for storing the image data is determined based on the feature and the error-predicting information of the hard disk 53b.

Figure 23:
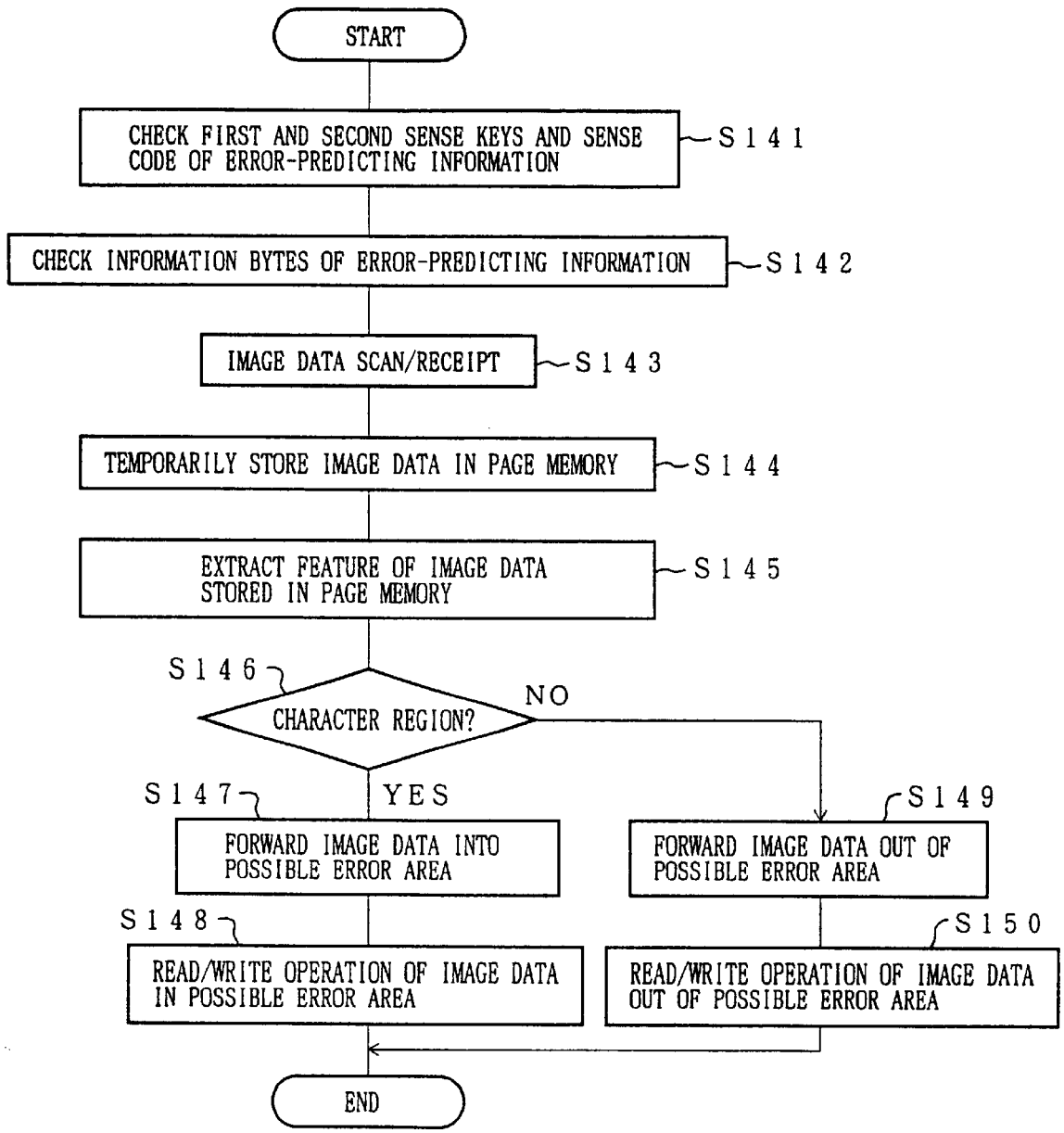
FIG. 23, which shows still another embodiment of the present invention, is a flow chart that shows processing operation related to error-prediction of the digital copying machine.

When error-predicting information is detected, a process for analyzing the information is carried out. Referring to a flow chart in FIG. 23, this operation is explained in detail. Here, it is supposed that the flow chart of FIG. 23 starts after those processes up to S8 shown in FIG. 1 have been completed, and gives more detailed examples of processes than those shown in S9 through S12.

In this error analysis, the first and second sense keys and sense codes are checked (S141) so that the classification and kind of error in the hard disk 53b are detected. Moreover, the information bytes are checked (S142) so that the start address and end address of the possible error area in the hard disk 53b are detected. The image-processing section 54 recognizes in detail where the possible error area is located based upon the detected start address and end address of the possible error area.

In the present embodiment, in the scanner section 2 in the digital copying machine, an original document is laser-scanned, and image data is obtained by receiving the reflected light signal by the CCD (S143).

Next, the inputted image data is temporarily stored in a page memory such as a RAM (S144). With respect to the image data temporarily stored in the page memory, the feature of the image data is extracted (S145) by the image process section 51f (a feature-extracting means) in the image-data processing section 51 so that a judgement is made as to whether the image data is data belonging to the character region or data belonging to the half-tone region.

If the image data belongs to the character region (YES at S146), the image-processing section 54 forwards the image data stored in the page memory to the possible error area in the hard disk 53b (S147). Then, the image-processing section 54 subjects the image data forwarded into the possible error area to a READ/WRITE process, and then outputs the resulting data (S148).

On the other hand, if the image data does not belong to the character region (NO at S146), that is, if the image data belongs to the intermediate gray-scale region, the image-processing section 54 forwards the image data stored in the page memory to the outside of the possible error area in the hard disk 53b (S149). Then, the image-processing section 54 subjects the image data forwarded to the outside of the possible error area to a READ/WRITE process, and then outputs the resulting data (S150).

As described above, in the digital copying machine 1 of the present embodiment, the area in which image data is to be stored is determined based upon the type of image data and the error-predicting information of the hard disk 53b; therefore, even if an error occurs as predicted by the hard disk 53b, it is possible to reduce the adverse effects on the output image.

In other words, the feature of the image data stored in the page memory is extracted, and half-tone images such as photographs are stored in an area other than the possible error area, while character images are stored in the possible error area. In this case, even if an error occurs in the possible error area as predicted by the hard disk 53b, no adverse effects are given on the area in which the half-tone images are stored; therefore, no blanks (white/black blanks in half-tone images) in images occur. Here, with respect to character images which consist of white/black density information, even if blanks (white/black blanks) in images occur, the effects are less conspicuous in the outputted images.

Embodiment 12

In this embodiment, an explanation will be given of a method for determining an area for storing image data based upon the compression system of image data stored in the page memory and the error-predicting information in the hard disk 53b.

Figure 24:
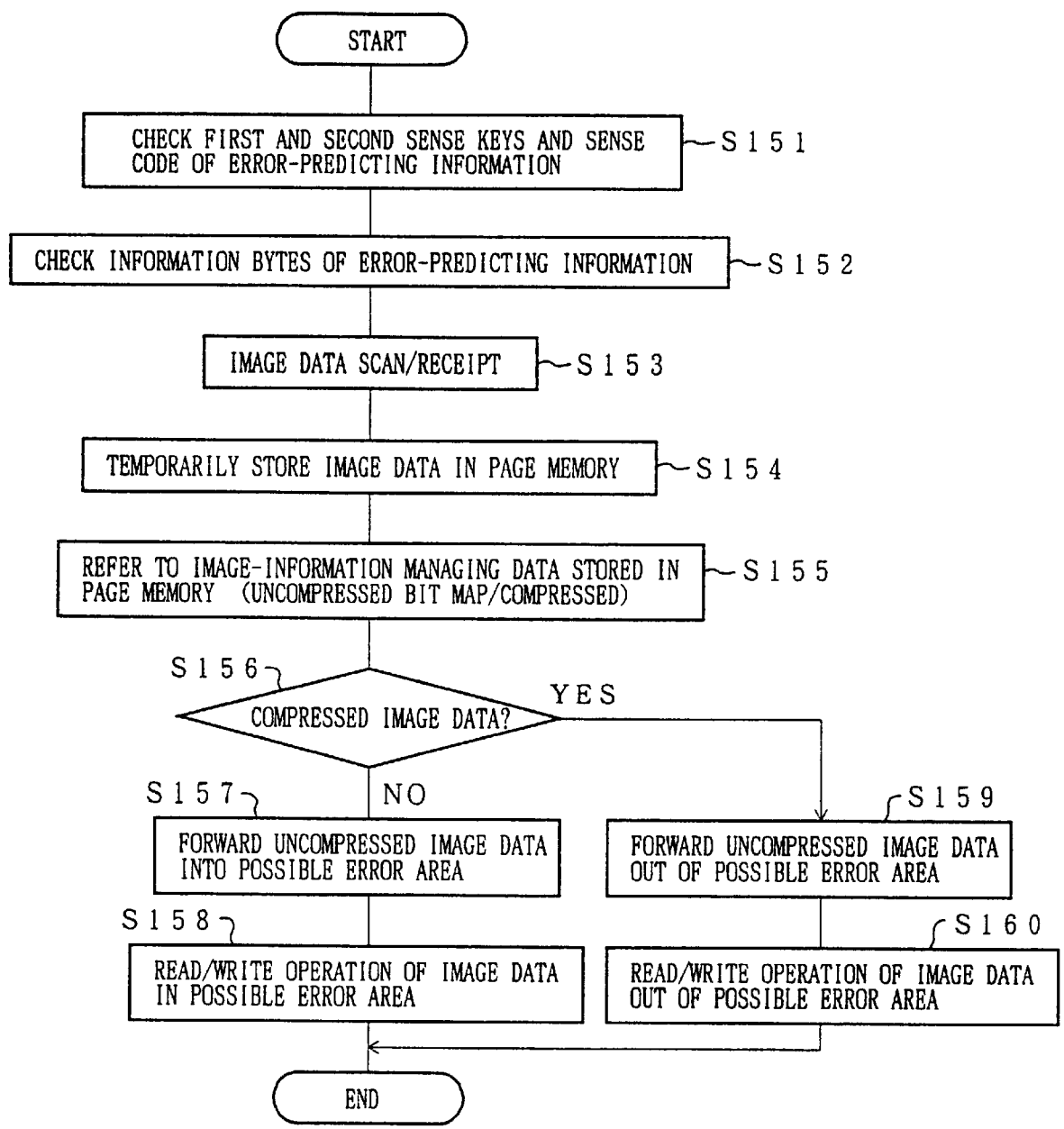
FIG. 24, which shows still another embodiment of the present invention, is a flow chart that shows processing operation related to error-prediction of the digital copying machine.

When error-predicting information is detected, a process for analyzing the information is carried out. Referring to a flow chart in FIG. 24, this operation is explained in detail. Here, it is supposed that the flow chart of FIG. 24 starts after those processes up to S8 shown in FIG. 1 have been completed, and gives more detailed examples of processes than those shown in S9 through S12.

In this error analysis, the first and second sense keys and sense codes are checked (S151) so that the classification and kind of error in the hard disk 53b are detected. Moreover, the information bytes are checked (S152) so that the start address and end address of the possible error area in the hard disk 53b are detected. The image-processing section 54 recognizes in detail where the possible error area is located based upon the detected start address and end address of the possible error area.

In the present embodiment, in the scanner section 2 in the digital copying machine, an original document is laser-scanned, and image data is obtained by receiving the reflected light signal by the CCD (S153).

Next, the inputted image data is temporarily stored in a page memory such as a RAM (S154). The image data, temporarily stored in the page memory, is added by an image-data managing table. Referring to the contents of the image-data managing table stored in the page memory, the image-processing section 54 confirms information related to the image-compression system of the image data (S155).

When the image-compression system of the image data is the bit-map system, that is, when the image data is not compressed (NO at S156), the image-processing section 54 forwards the image data stored in the page memory to the possible error area in the hard disk 53b (S157). Then, the image-processing section 54 subjects the image data forwarded into the possible error area to a READ/WRITE process, and then outputs the resulting data (S158).

In contrast, when the image-compression system of the image data is an actual image-compression system (YES at S156), the image-processing section 54 forwards the image data stored in the page memory to an area other than the possible error area in the hard disk 53b (S159). Then, the image-processing section 54 subjects the image data forwarded to the area other than the possible error area to a READ/WRITE process, and then outputs the resulting data (S160).

As described above, in the digital copying machine 1 of the present embodiment, the area in which image data is to be stored is determined based upon the type of image data and the error-predicting information of the hard disk 53b; therefore, even if an error occurs as predicted by the hard disk 53b, it is possible to reduce the adverse effects on the output image.

In other words, when the image data, stored in the page memory, is compressed data, the image data is stored in an area other than the possible error area, and when it is not compressed data, it is stored in the possible error area. In this case, even if an error occurs in the hard disk 53b as predicted, no adverse effects are given on the compressed image that is difficult to restore. In contrast, the image data that is subject to the effects of the error is not compressed, therefore, it is easily restored without being adversely affected.

In the above-mentioned embodiments 9 through 12, explanations have been given of methods for assigning storage areas to image data stored in the hard disk 53b depending on the processing functions. Here, in the following embodiments explanations will be given of methods for shifting image data stored in the hard disk 53b depending on the error-predicting information and processing functions to be used.

Embodiment 13

When error-predicting information is detected, a process for analyzing the information is carried out.

Figure 25:
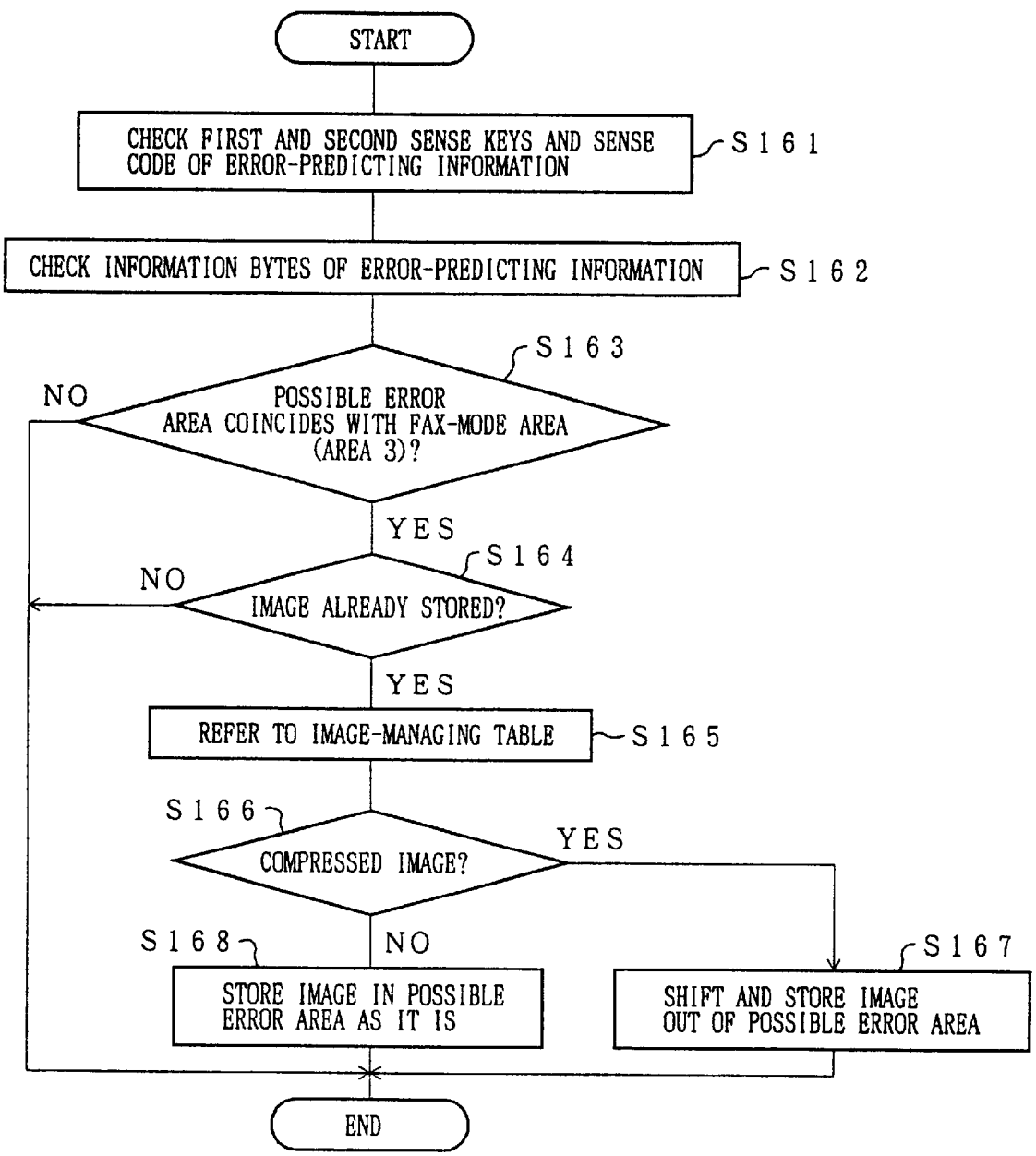
FIG. 25, which shows still another embodiment of the present invention, is a flow chart that shows processing operation related to error-prediction of the digital copying machine.

Referring to a flow chart in FIG. 25, this operation is explained in detail. Here, it is supposed that the flow chart of FIG. 25 starts after those processes up to S8 shown in FIG. 1 have been completed, and gives more detailed examples of processes than those shown in S9 through S12.

In this error analysis, the first and second sense keys and sense codes are checked (S161) so that the classification and kind of error in the hard disk 53b are detected. Moreover, the information bytes are checked (S162) so that the start address and end address of the possible error area in the hard disk 53b are detected. The image-processing section 54 recognizes in detail where the possible error area is located based upon the detected start address and end address of the possible error area.

If the possible error area is located in the third area (see FIG. 9) that has been assigned for use in the facsimile mode (YES at S163), the image-processing section 54 confirms whether or not image data has already stored in the possible error section (S164).

If image data has already been stored (YES at S164), the image-processing section 54 refers to the contents of the image-data managing table added to the image when it is stored in the hard disk 53b in order to extract the feature of the image (S165), and confirms the image-compression system of the image data (S165).

When the image-compression system of the image data is an actual image-compression system (YES at S166), the image-processing section 54 shifts the image data from the possible error area to another area within the same area (the third area) (S167). Further, when the image-compression system shows that no compression is given (NO at S166), the image data is not shifted and stored in the same area as it is (S168).

As described above, in the digital copying machine 1 of the present embodiment, the feature of image data stored in the hard disk 53b is extracted, and based upon the feature and the error-predicting information in the hard disk 53b, the image data, stored in the possible error area, can be shifted; therefore, even if an error occurs in the possible error area as predicted by the hard disk 53b, it is possible to reduce the adverse effects given to the outputted image.

In other words, when the image data stored in the hard disk 53b is compressed data, the image data is shifted out of the possible error area. Therefore, even if an error occurs as the hard disk 53b has expected, no adverse effect is given to the compressed image that is difficult to restore.

Embodiment 14

Figure 26:
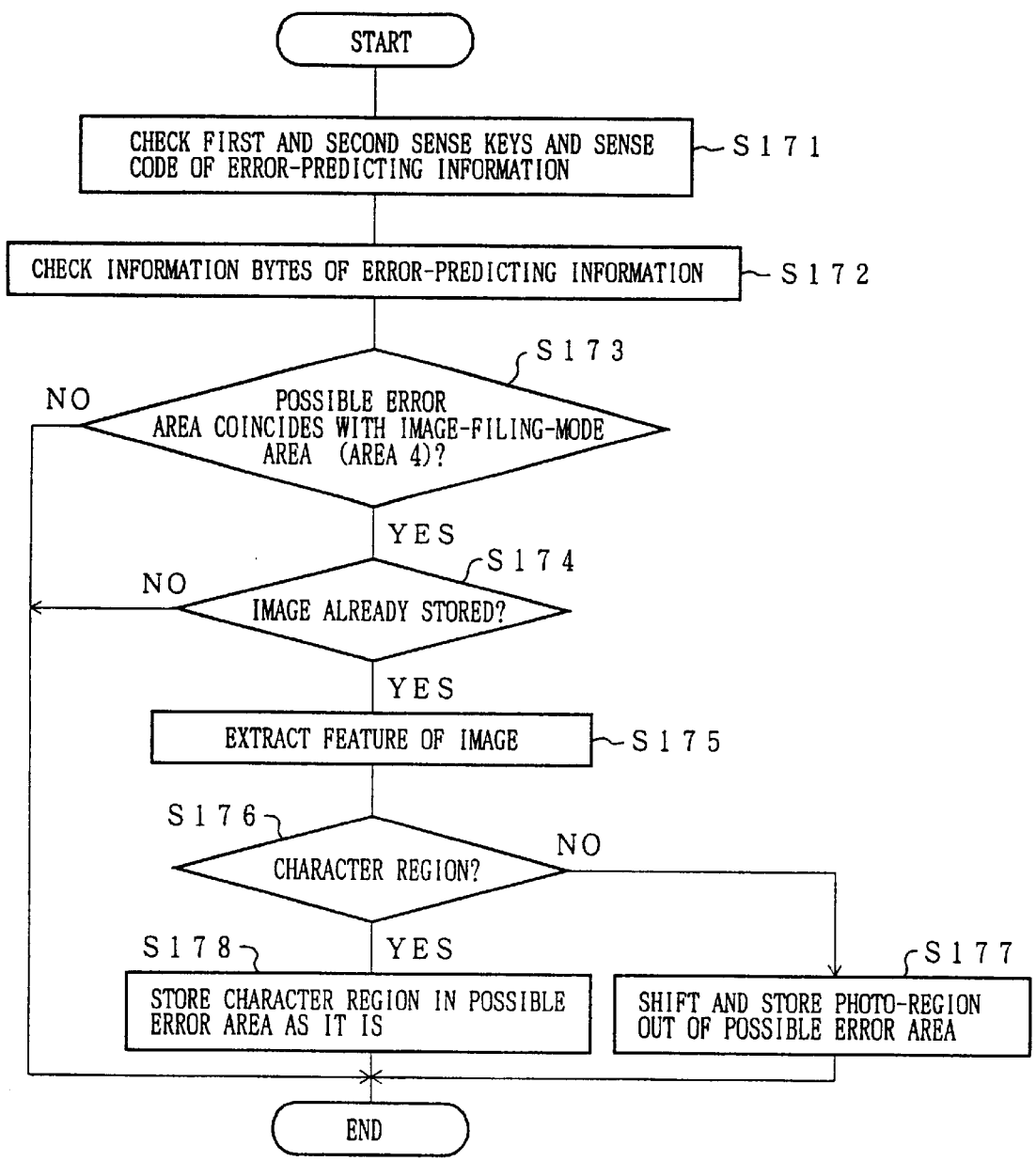
FIG. 26, which shows still another embodiment of the present invention, is a flow chart that shows processing operation related to error-prediction of the digital copying machine.

When error-predicting information is detected, a process for analyzing the information is carried out. Referring to a flow chart in FIG. 26, this operation is explained in detail. Here, it is supposed that the flow chart of FIG. 26 starts after those processes up to S8 shown in FIG. 1 have been completed, and gives more detailed examples of processes than those shown in S9 through S12.

In this error analysis, the first and second sense keys and sense codes are checked (S171) so that the classification and kind of error in the hard disk 53b are detected. Moreover, the information bytes are checked (S172) so that the start address and end address of the possible error area in the hard disk 53b are detected. The image-processing section 54 recognizes in detail where the possible error area is located based upon the detected start address and end address of the possible error area.

If the possible error area is located in the second area (see FIG. 9) that has been assigned for use in the image-filing mode (YES at S173), the image-processing section 54 confirms whether or not image data has already stored in the possible error section (S174).

If image data has already been stored (YES at S174), the feature of the image data stored in the hard disk 53b is extracted by the image process section 51f of the image-data processing section 51 (S175), and a judgement is made as to whether the image data is data belonging to the character region or data belonging to the half tone region.

If the image data does not belong to the character region (NO at S176), that is, if the image data belongs to the half-tone region, the image data is shifted out of the possible error area to another area within the same area (the second area) (S177). Further, if the image data belongs to the character region (YES at S176), the image data is not shifted and stored in the same place as it is (S 178).

As described above, in the digital copying machine 1 of the present embodiment, the feature of the image data stored in the hard disk 53b is extracted, and based on the feature and the error-predicting information in the hard disk, the image data, stored in the possible error area, can be shifted; therefore, even if an error occurs in the possible error area as predicted by the hard disk 53b, it is possible to reduce the adverse effects exerted on the output image.

In other words, if the image data stored in the hard disk 53b is a half-tone image, the image data is shifted out of the possible error area, and if the image data stored in the hard disk 53b is a character image, the image data is stored in the possible error area as it is. In this case, even if an error occurs in the possible error area as predicted by the hard disk 53b, the half-tone image, which has a great image-degradation in the event of an image blank, is free from the adverse effects. Further, with respect to the character image, since information in the character region consists of white/black density information, the effects are less conspicuous in the outputted image even if a blank (a white/black blank) in the image occur.

Embodiment 15

Figure 27:
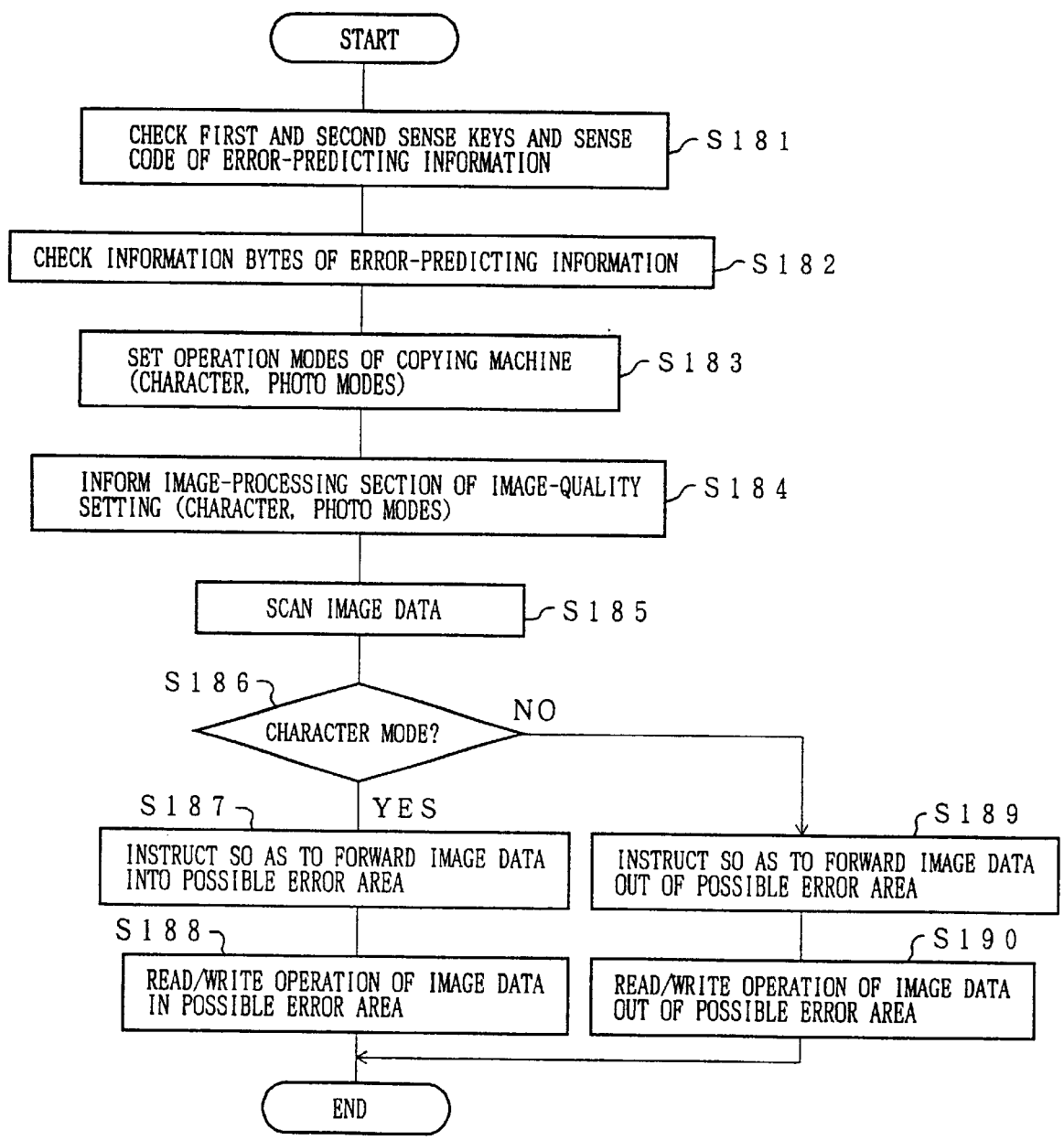
FIG. 27, which shows still another embodiment of the present invention, is a flow chart that shows processing operation related to error-prediction of the digital copying machine.

When error-predicting information is detected, a process for analyzing the information is carried out. Referring to a flow chart in FIG. 27, this operation is explained in detail. Here, it is supposed that the flow chart of FIG. 27 starts after those processes up to S8 shown in FIG. 1 have been completed, and gives more detailed examples of processes than those shown in S9 through S12.

In this error analysis, the first and second sense keys and sense codes are checked (S181) so that the classification and kind of error in the hard disk 53b are detected. Moreover, the information bytes are checked (S182) so that the start address and end address of the possible error area in the hard disk 53b are detected. The image-processing section 54 recognizes in detail where the possible error area is located based upon the detected start address and end address of the possible error area.

When the user uses the present digital copying machine 1, individual settings are made on the operation panel of the operation panel unit 55. In this case, image-quality settings, such as whether the image to be inputted is a character image or a photograph image (half tone data) (S183) are carried out (S183). The set image quality, that is, an operation mode is sent to the image-processing section 54 through the central processing unit 58 (S184). Upon receipt of the information, the image-processing section 54 confirms whether the image that is to be inputted is a character image or a photograph (half tone) image. Thereafter, the original document is laser-scanned by the scanner section 2 of the digital copying machine 1, and the image data is obtained by receiving the reflected light signal by the CCD (S185).

If the image-quality setting shows that the original document mainly consists of character regions (YES at S186), the image-processing section 54 forwards the image data to the possible error area in the hard desk 53b, and allows the hard disk 53b to store the data (S187). Then, the image-processing section 54 subjects the image-data forwarded into the possible error area to a READ/WRITE process, and outputs the resulting data (S188).

In contrast, if the image-quality setting shows that the original document mainly consists of half-tone regions (NO at S186), the image-processing section 54 forwards the image data to another area other than the possible error area in the hard disk 53b, and allows the hard disk 53b to store the data (S189). Then, the image-processing section 54 subjects the image-data forwarded to another area other than the possible error area to a READ/WRITE process, and outputs the resulting data (S190).

As described above, in the digital copying machine 1 of the present embodiment, the feature of image data that is to be inputted is extracted, and based upon the feature and the error-predicting information in the hard disk 53b, the image data, stored in the possible error area, can be shifted; therefore, even if an error occurs in the possible error area as predicted by the hard disk 53b, it is possible to reduce the adverse effects given to the outputted image.

In other words, if the image data that is to be inputted is a half-tone image, the image data is shifted out of the possible error area, and if the image data stored in the hard disk 53b is a character image, the image data is stored in the possible error area as it is. In this case, even if an error occurs in the possible error area as predicted by the hard disk 53b, the half-tone image, which has a great image-degradation in the event of an image blank, is free from the adverse effects. Further, with respect to the character image, since information in the character region consists of white/black density information, the effects are less conspicuous in the outputted image even if a blank (a white/black blank) in the image occur.

Embodiment 16

Figure 28:
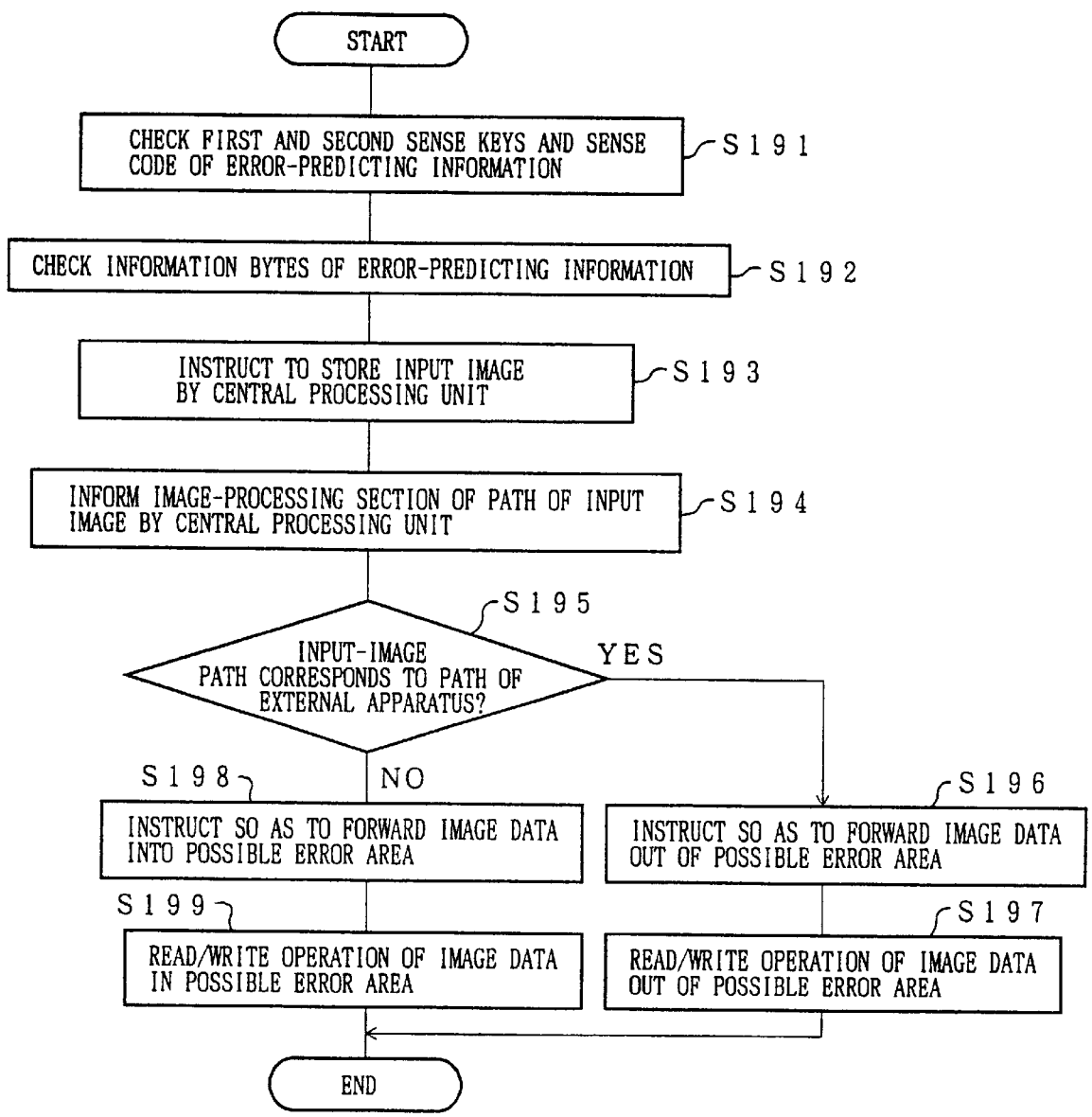
FIG. 28, which shows still another embodiment of the present invention, is a flow chart that shows processing operation related to error-prediction of the digital copying machine.

When error-predicting information is detected, a process for analyzing the information is carried out. Referring to a flow chart in FIG. 28, this operation is explained in detail. Here, it is supposed that the flow chart of FIG. 28 starts after those processes up to S8 shown in FIG. 1 have been completed.

In this error analysis, the first and second sense keys and sense codes are checked (S191) so that the classification and kind of error in the hard disk 53b are detected. Moreover, the information bytes are checked (S192) so that the start address and end address of the possible error area in the hard disk 53b are detected. The image-processing section 54 recognizes in detail where the possible error area is located based upon the detected start address and end address of the possible error area.

Upon receipt of an instruction for storing the input image data from the central processing unit 58 (S193), the image-processing section 54 confirms whether the image-input path of the image data to be inputted is from the digital copying machine 1 main body or from an external apparatus, such as a facsimile and a personal computer, that is externally connected (S194), based on the information that is also given from the central processing unit 58 (S194).

In general, in the case when an image input is given from an external communication unit (facsimile, personal computer, etc.), the image data tends to be inputted in a compressed format so as to shorten the processing time and hence reduce expenses such as communication costs. In contrast, image data that is inputted from the digital copying machine 1 main body tends to be image data in a bit-map format that is not compressed.

For this reason, when an instruction for storing an input image given by the central processing unit 58 is related to a path from an external apparatus (YES at S195), the image-processing section 54 makes a judgement that the image to be stored in the hard disk 53b is a compressed image, and instructs the hard disk 53b to store the image in an area other than the possible error area (S196). Then, the image-processing section 54 subjects the image data forwarded to an area other than the possible error area to a READ/WRITE process, and outputs the resulting data (S197).

In contrast, when an instruction for storing an input image given by the central processing unit 58 comes from the digital copying machine 1 main body (NO at S195), the image-processing section 54 makes a judgement that the image to be stored in the hard disk 53b is not a compressed image, and instructs the hard disk 53b to store the image in the possible error area (S198). Then, the image-processing section 54 subjects the image data forwarded to the possible error area to a READ/WRITE process, and outputs the resulting data (S199).

As described above, in the digital copying machine 1 of the present embodiment, the feature of image data that is to be inputted is extracted, and based upon the feature and the error-predicting information in the hard disk 53b, the image data, stored in the possible error area, can be shifted; therefore, even if an error occurs in the possible error area as predicted by the hard disk 53b, it is possible to reduce the adverse effects given to the outputted image.

In other words, when the image data stored in the hard disk 53b is compressed data, the image data is shifted out of the possible error area. Therefore, even if an error occurs as the hard disk 53b has expected, no adverse effect is given to the compressed image that is difficult to restore.

Embodiment 17

In the above-mentioned arrangements of the respective embodiments, after any error in the hard disk 53b has been predicted, troubles caused by the error can be minimized by restricting the use of the image-processing functions and respective modes depending on the amount of data storage and areas in the possible error area, as described above.

However, it is only natural that there are occasions that demand the prompt use of the currently restricted functions and modes, such as electronic RDH, image filing, image shift and compose and multi-shot (4 in 1) that are image-processing functions in the copy mode and the facsimile and printer modes.

Figure 29:
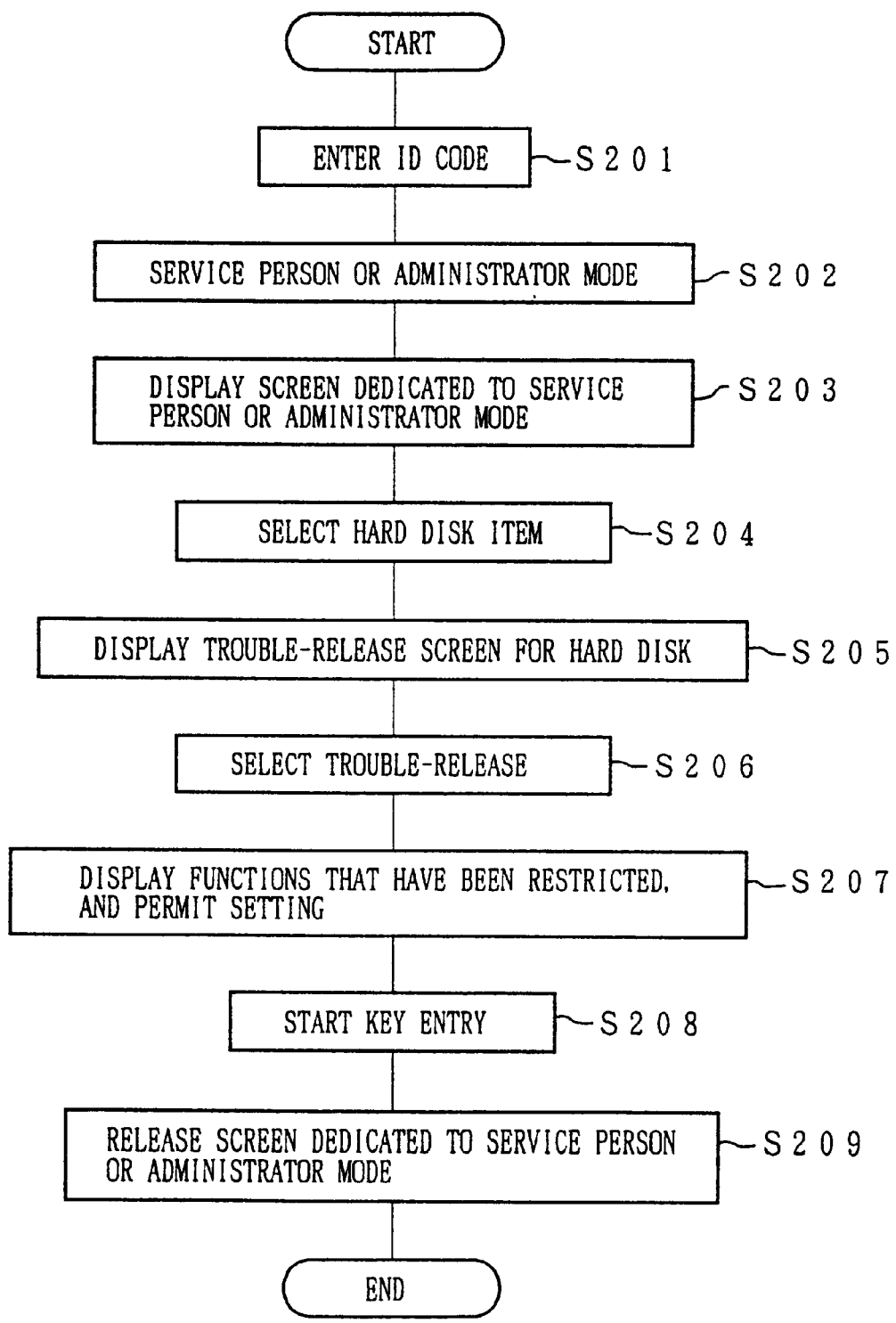
FIG. 29, which shows still another embodiment of the present invention, is a flow chart that shows processing operation related to error-prediction of the digital copying machine.

Moreover, even if the above-mentioned modes and functions are currently restricted, the hard disk 53b itself merely predicts the occurrence of any error and calls for the exchange of the hard disk 53b; and the hard disk 53b has not been completely broken down. Therefore, even if an access is made to the hard disk 53b, it does not cause an error at once. For this reason, in the present embodiment, referring to a flow chart in FIG. 29, an explanation will be given of an arrangement wherein with respect to the modes and functions currently restricted, the user can release the restriction. Here, it is supposed that the flow chart of FIG. 29 starts from a restricted state of the use of modes and functions that require the use of the hard disk 53b, that is, it starts after completion of the processes shown in FIG. 1.

First, when the user wants to release the restriction of the use of the modes and functions that require the use of the hard disk 53b, he or she inputs an ID code through the ten keys of the operation panel unit 55 serving as a restriction-releasing means (S201), with the result that the liquid crystal display screen of the operation panel unit 55 switches to an administrator mode or a service person mode used for maintenance and inspection (S202).

On the display screen in the service person mode, items required for maintenance and inspection are displays, and on the display screen in the administrator mode, items required for management and operation are displayed (S203). Upon selection of the item "hard disk" among these items (S204), a hard-disk-trouble releasing screen appears so as to allow selection as to whether or not the hard-disk-trouble is released (S205).

Upon selection of the trouble release (S206), with respect to the modes and functions that cannot be used without using the hard disk 53b and that have been restricted, the operation panel unit 55 releases the restriction of copying functions such as electronic RDH, image filing, image shift and compose and multi-shot (4 in 1) by the setting of the restriction-releasing information, and again displays the various editing functions and the various modes so that the setting of desired editing function and mode is allowed (S207).

Finally, when the start key is pressed (S208), the screen dedicated to the service person mode or the administrator mode is complete, thereby returning to the original screen (S209).

Figure 30:
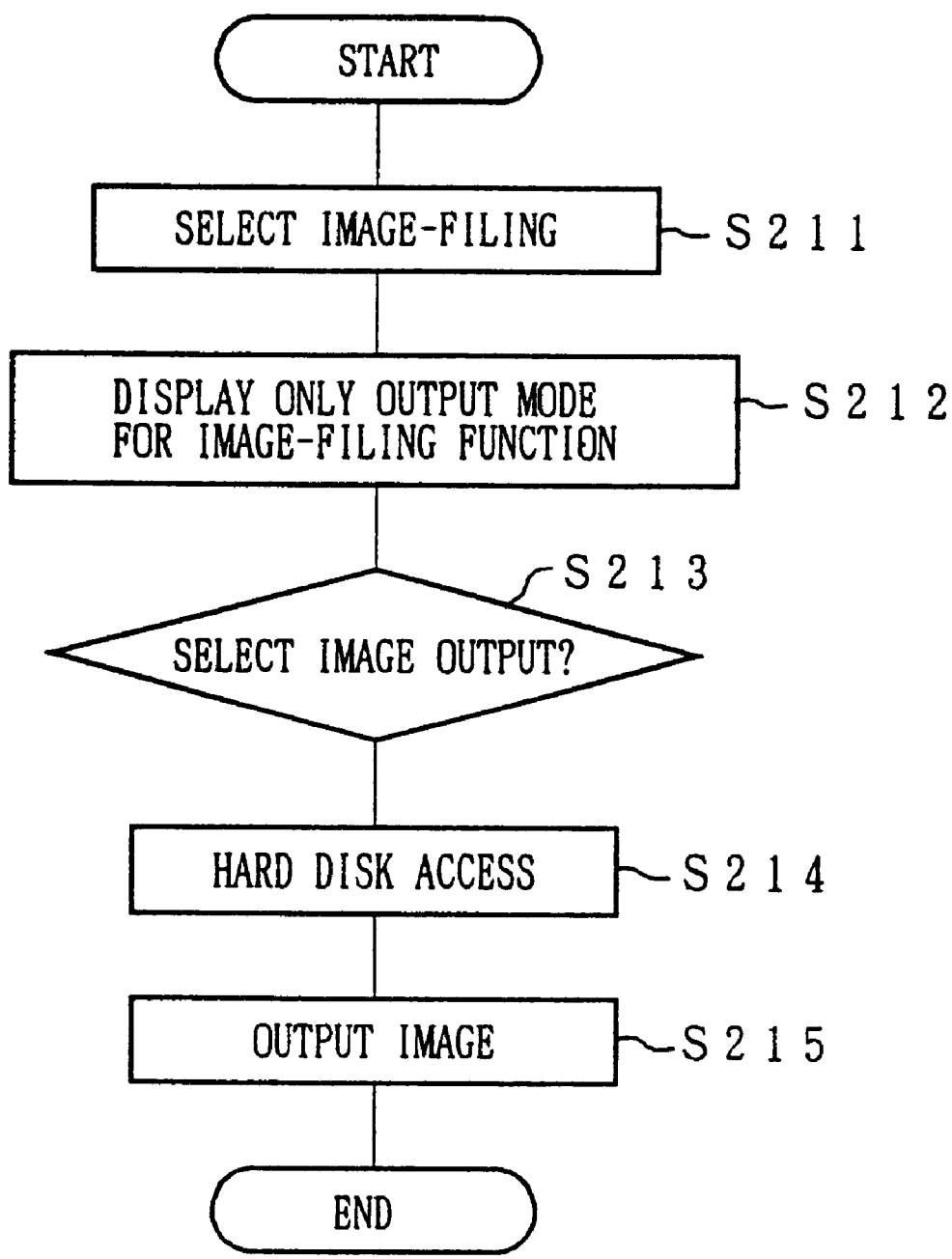
FIG. 30, which shows still another embodiment of the present invention, is a flow chart that shows processing operation related to error-prediction of the digital copying machine.

Moreover, after the restriction-releasing process has been carried out, the selection of the image-filing function allows the following processes to be carried out: Referring to a flow chart in FIG. 30, an explanation will be given of these processes. Here, it is supposed that the flow chart of FIG. 30 starts after the processes of the flow chart shown in FIG. 29 have been completed.

Normally (if the hard disk 53b functions normally), the selection of the image-filing function displays a selection screen for two modes, that is, image registration and image output, and either of the two modes is selected.

However, after the above-mentioned restriction-releasing process has been carried out, the selection of the image-filing function (S211) allows only the image-output mode to be displayed, without displaying the image-registration mode (S212).

Here, upon selection of the image-output mode (YES at S213), since the user selects desired image data with respect to image data that has been inputted through the image-data input section 50 and that has been registered prior to the prediction of error by the hard disk 53b, the image data, selected by the user, is accessed from one of areas that have been divided for filing images in the hard disk 53b (S214), and the resulting image is outputted and printed (S215).

As described above, in the digital copying machine 1 of the present embodiment, even in the case when the hard disk 53b is likely to cause an error in accordance with the error-predicting information in the hard disk 53b, upon request for the use of the processing functions and modes that require to use the hard disk 53b, it is possible to release the restriction; therefore, it becomes possible to improve the operability of the apparatus.

Moreover, the release of the restriction is carried out under the limited mode, such as the administrator mode or the service person mode, requiring the entry of the ID code; therefore, even when the system is used by a large number of unauthorized people, it is possible to prevent the apparatus from being randomly used and it is also possible to balance the improvement of operability and the reduction of troubles that might be caused in the event of an error.

Furthermore, upon selection of the image-filing function after the above-mentioned restriction-releasing mode, the image-registration mode is not displayed and the apparatus is still partially restricted, with the result that new images are not registered in the hard disk 53b through the image-data input section 50. In other words, the above-mentioned restriction-releasing process is only applied to the restriction to the output of image data that has already been registered, and the restriction to registration of new image data is not released; therefore, it is possible to minimize the damage that might be caused in the event of an error.

Embodiment 18

The above-mentioned explanations of the respective embodiments have practically exemplified various error-predicting processes in the digital copying machine 1. The following explanations will discuss practical examples for carrying out the error-predicting processes with appropriate timing.

Figure 31:
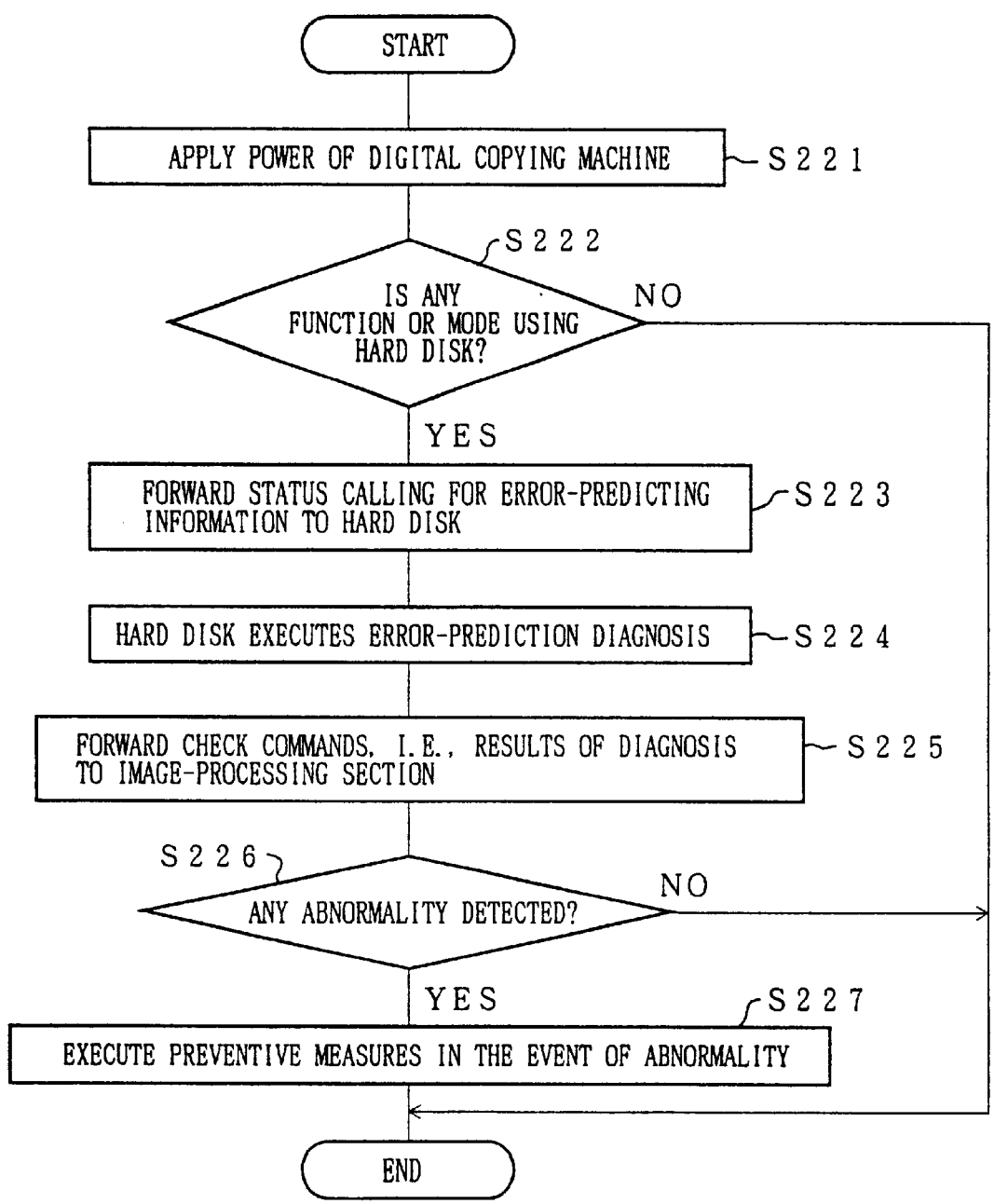
FIG. 31, which shows still another embodiment of the present invention, is a flow chart that shows timing in which error-prediction processing operations of the digital copying machine are carried out.

As illustrated in FIG. 31, upon application of power to the digital copying machine 1 (S221), the image-processing section 54 first confirms whether or not the digital copying machines possesses copying functions and editing functions, such as electronic RDH, image-filing, image shift and compose and multi-shot (4 in 1), which are the functions requiring the use of the hard disk 53b, and a composite mode of facsimile and printer modes, which uses the hard disk 53b as an image memory (S222).

After the image-processing section 54 has confirmed that there are functions and modes requiring the use of the hard disk 53b (YES at S222), it forwards a status calling for error-predicting information to the hard disk 53b (S223). In accordance with the status calling for error-predicting information, the hard disk 53b carries out an error-predicting diagnosis process on the hard disk 53b (S224), and forwards check commands that are results of the error-predicting diagnosis to the image-processing section 54 (S225).

When the image-processing section 54 detects any abnormality from the check commands (YES at S226), a counter measure in the event of abnormality is carried out (S227). Here, with respect to the counter measure carried out at S227, one of the methods described in the embodiments 1 through 17 may be adopted, or a plurality of methods among those methods may be adopted in a combined manner.

Here, an error-predicting operation control means and a managing means, described in the claims, correspond to the image-processing section 54.

As described above, upon application of power to the digital copying machine, a judgement is first made as to whether or not there are any functions and modes requiring the use of the hard disk 53b, and only in the cases in which such functions and modes exist, the error-predicting diagnosis is carried out; therefore, no error-predicting diagnosis is carried out when it is not necessary to carry out an error-predicting diagnosis so that it is possible to eliminate wasteful use of power consumption and loss time required for carrying out the error-predicting diagnosis.

Additionally, the above-mentioned digital copying machine 1 is preferably applied to digital copying machines in which both of the cases, that is, a case having functions and modes requiring the hard disk 53b and a case no such functions and modes are added, are anticipated, like a digital copying machine to which, for example, a facsimile function, etc. is optionally added.

Embodiment 19

Referring to a flow chart of FIG. 32, an explanation will be given of another practical example for carrying out error-predicting processes with appropriate timing, which is different from the example shown in the flow chart of FIG. 31.

Figure 32:
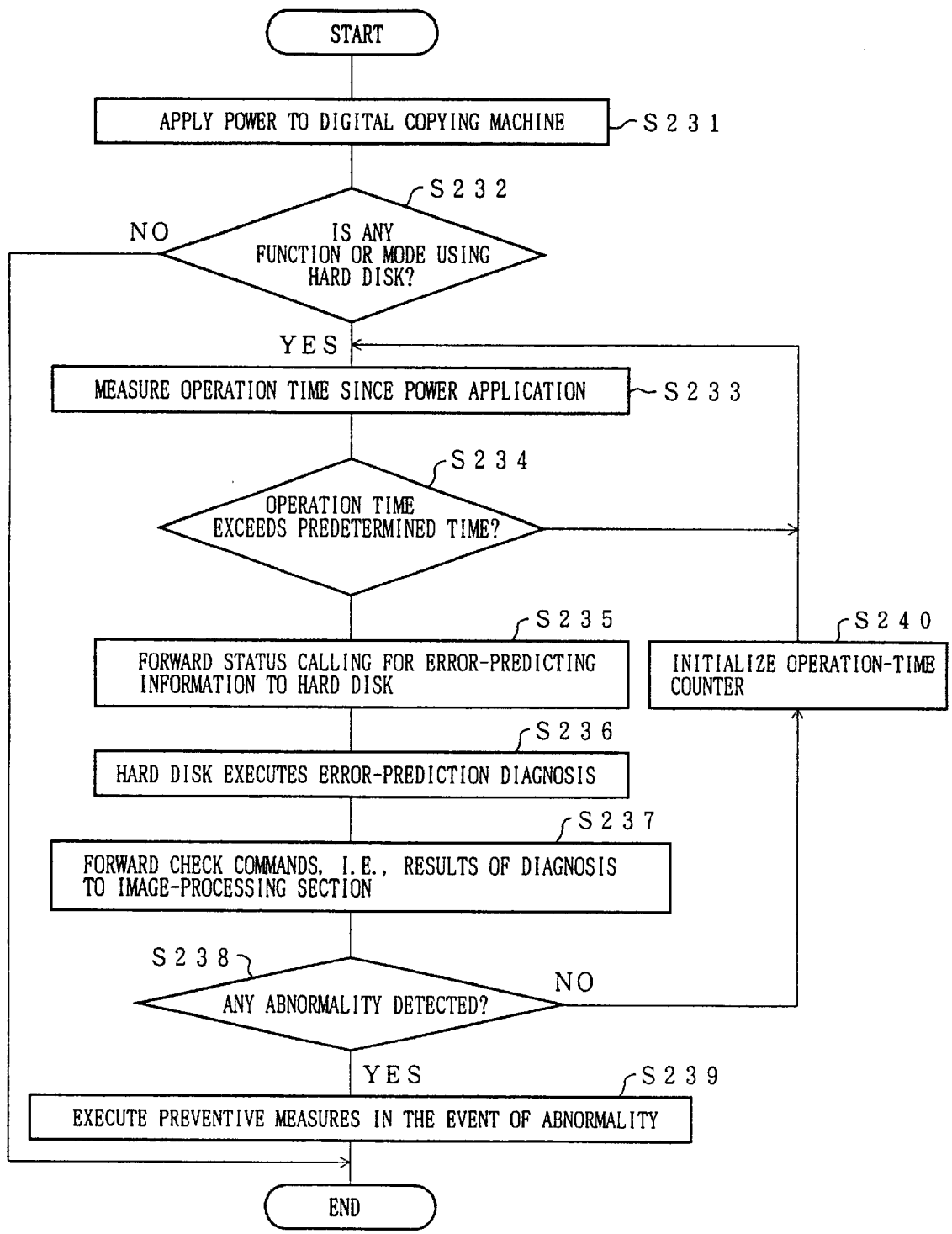
FIG. 32, which shows still another embodiment of the present invention, is a flow chart that shows timing in which error-prediction processing operations of the digital copying machine are carried out.

As illustrated in FIG. 32, upon application of power to the digital copying machine 1 (S231), the image-processing section 54 first confirms whether or not the digital copying machines possesses copying functions and editing functions, such as electronic RDH, image-filing, image shift and compose and multi-shot (4 in 1), which are the functions requiring the use of the hard disk 53b, and a composite mode of facsimile and printer modes, which uses the hard disk 53b as an image memory (S232).

After the image-processing section 54 has confirmed that there are functions and modes requiring the use of the hard disk 53b (YES at S232), the image-processing section 54 counts the operation-time counter of the digital copying machine 1 by using the timer that is installed therein so that the continuous operation time from the application of power to the digital copying machine (S233) Here, the timer and operation-time counter correspond to a time-counting means in the claims.

When the above-mentioned operation time has reached a predetermined period of time (YES at S234), the image-processing section 54 forwards a status calling for error-predicting information to the hard disk 53b (S235). In accordance with the status calling for error-predicting information, the hard disk 53b carries out an error-predicting diagnosis process on the hard disk 53b (S236), and forwards check commands that are results of the error-predicting diagnosis to the image-processing section 54 (S237).

When the image-processing section 54 detects any abnormality from the check commands (YES at S238), a counter measure in the event of abnormality is carried out (S239). Here, with respect to the counter measure carried out at S227, one of the methods described in the embodiments 1 through 17 may be adopted, or a plurality of methods among those methods may be adopted in a combined manner.

Further, when no abnormality is detected from the check commands (NO at S238), the image-processing section 54 makes a judgement that the hard disk 53b is functioning normally, and initializes the operation time counter (S240). Thus, the sequence is returned to S233 at which the continuous operation time of the digital copying machine 1 is again measured by the timer that is installed therein.

With the above-mentioned arrangement, it is not only possible to carry out the error-predicting diagnosis upon application of power to the digital copying machine 1, but also possible to carry out the error-predicting diagnosis periodically for each predetermined period of time after the application of power. Consequently, the error-predicting diagnosis process can be carried out on a digital copying machine 1 whose power is basically kept on, such as, for example, a composite digital copying machine to which a facsimile function is added and a digital copying machine, etc., which is installed in a convenience store, etc.

Embodiment 20

Referring to a flow chart of FIG. 33, an explanation will be given of still another practical example for carrying out error-predicting processes with appropriate timing.

Figure 33:
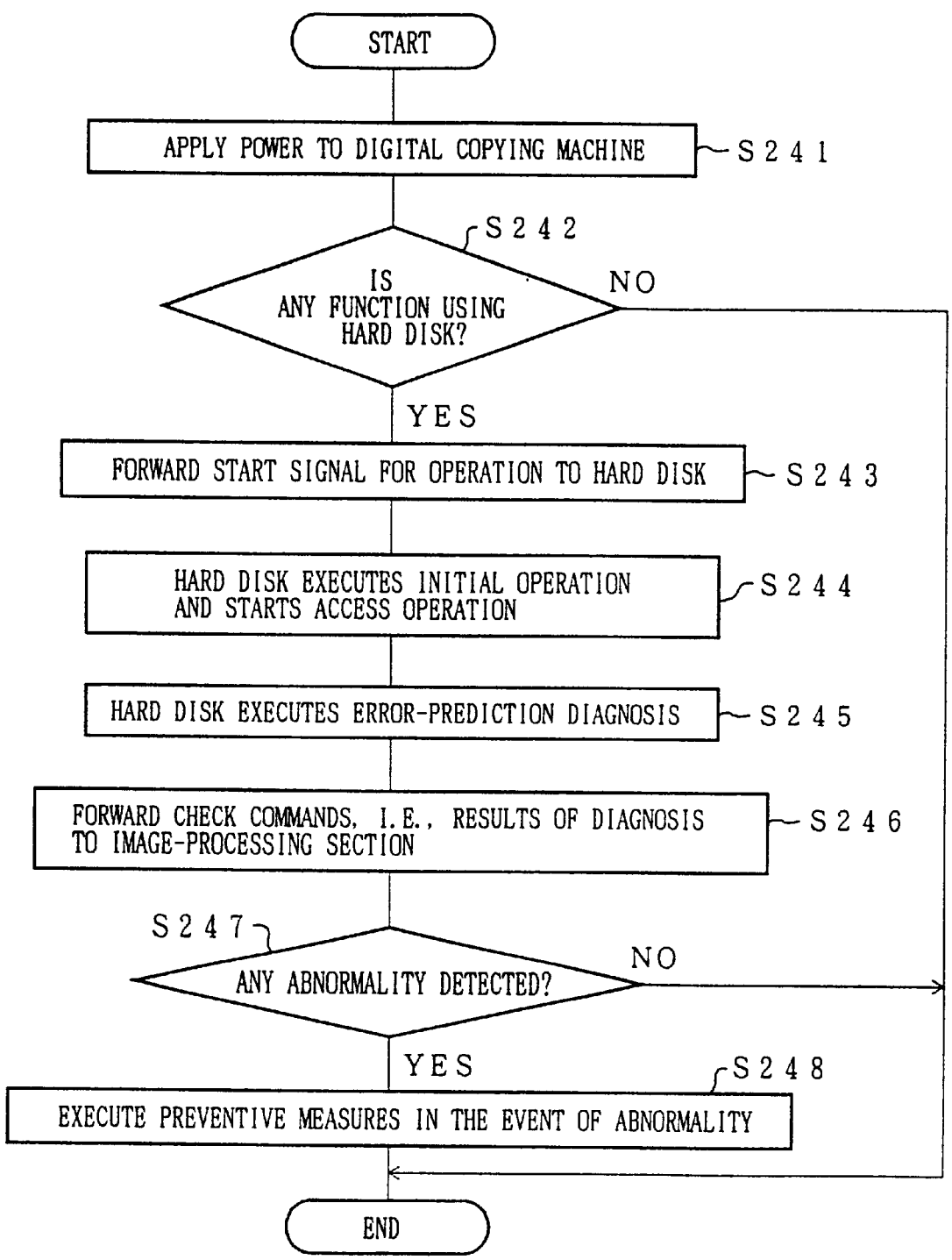
FIG. 33, which shows still another embodiment of the present invention, is a flow chart that shows timing in which error-prediction processing operations of the digital copying machine are carried out.

As illustrated in FIG. 33, upon application of power to the digital copying machine 1 (S241), the image-processing section 54 first confirms whether or not the digital copying machines possesses copying functions and editing functions, such as electronic RDH, image-filing, image shift and compose and multi-shot (4 in 1), which are the functions requiring the use of the hard disk 53b, and a composite mode of facsimile and printer modes, which uses the hard disk 53b as an image memory (S242).

After the image-processing section 54 has confirmed that there are functions and modes requiring the use of the hard disk 53b (NO at S242), power is supplied to the hard disk 53b so that the image-processing section 54 forwards a start signal (an initial signal) for a hard disk operation to the hard disk 53b (S243). In accordance with the start signal, the hard disk 53b carries out the initial operation of the hard disk 53b, thereby starting an access operation (S244) as well as carrying out an error-predicting diagnosis process on the hard disk 53b (S245). Upon completion of the error-predicting diagnosis process, the hard disk 53b forwards check commands that are the results of the error-prediction diagnosis to the image-processing section 54 (S246).

When the image-processing section 54 detects any abnormality from the check commands (YES at S247), a counter measure in the event of abnormality is carried out (S248). Here, with respect to the counter measure carried out at S248, one of the methods described in the embodiments 1 through 17 may be adopted, or a plurality of methods among those methods may be adopted in a combined manner.

As described above, in the above-mentioned example, the error-predicting diagnosis of the hard disk 53b is not carried out by receiving the status calling for the error-predicting information as in the cases of FIG. 31 and FIG. 32, but automatically carried out by the start signal that is always forwarded to the hard disk 53b upon application of power to the digital copying machine 1. For this reason, the image-processing section 54 allows the hard disk 53b to carry out the error-predicting diagnosis process merely by recognizing the presence or absence of a connection to the hard disk 53 without calling for a control sequence.

Embodiment 21

Referring to a flow chart of FIG. 34, an explanation will be given of still another practical example for carrying out error-predicting processes with appropriate timing.

Figure 34:
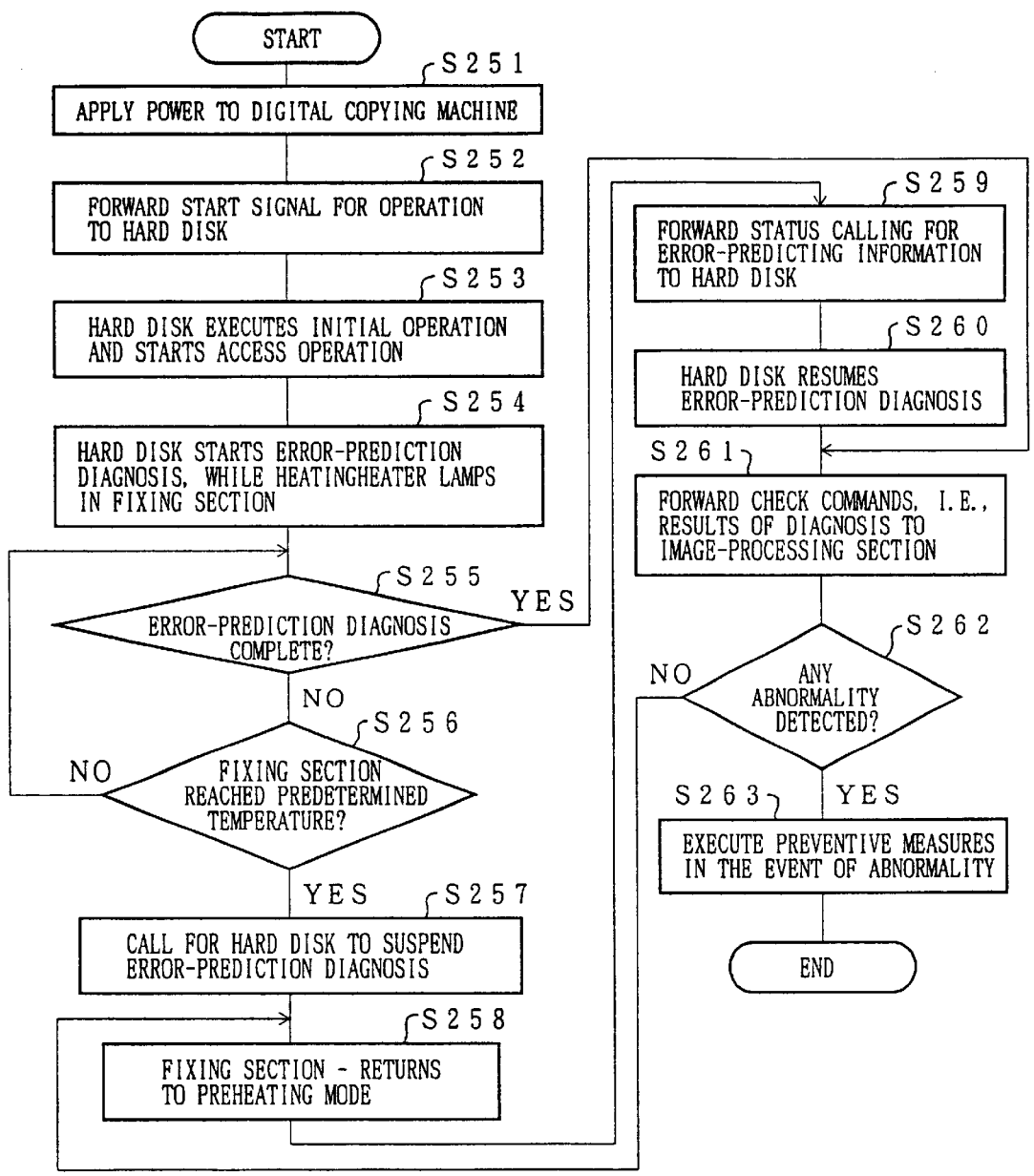
FIG. 34, which shows still another embodiment of the present invention, is a flow chart that shows timing in which error-prediction processing operations of the digital copying machine are carried out.

As illustrated in a flow chart in FIG. 34, first, upon application of power to the digital copying machine 1 (S251), power is supplied to the hard disk 53b so that the image-processing section 54 forwards a start signal (an initial signal) for a hard disk operation to the hard disk 53b (S252). In accordance with the start signal, the hard disk 53b carries out an initial operation of the hard disk 53b, thereby starting an access operation (S253). Simultaneously, the hard disk 53b starts an error-predicting diagnosis process, and the heating process of a heater lamp in the fixing device 39 in the digital copying machine 1 is also started (S254).

When the error-predicting diagnosis on the hard disk 53b has been completed (YES at S255) before the heater lamp of the fixing device 29 has reached a predetermined temperature, that is, before the worming up of the fixing section 39, the sequence proceeds to S261 so that the hard disk 53b forwards check commands that are the results of the diagnosis to the image-processing section 54.

When the image-processing section 54 detects any abnormality from the check commands (YES at S262), a counter measure in the event of abnormality is carried out (S263). Here, with respect to the counter measure carried out at S263, one of the methods described in the embodiments 1 through 17 may be adopted, or a plurality of methods among those methods may be adopted in a combined manner.

However, when the warm up of the fixing device 39 has been completed (YES at S256) prior to completion of the error-predicting diagnosis on the hard disk 53b at S254, the image-processing section 54 calls for the hard disk 53b to suspend the error-predicting diagnosis (S257).

In this case, after a lapse of predetermined time since the completion of a printing job, etc., in the digital copying machine 1, the heater lamp of the fixing device 39 is turned off, with the result that the heater lamp has a temperature drop to a predetermined temperature, and enters a preheating (energy-saving) mode for maintaining this predetermined temperature (S258). When the fixing device 39 enters the preheating mode, the image-processing section 54 forwards the status calling for the error-predicting information to the hard disk 53b (S259), and in accordance with the status calling for the error-predicting information, the hard disk 53b carries out an error-predicting diagnosis process on the hard disk 53b (S260).

Moreover, when no abnormality is detected at S262, the sequence proceeds to S258, thereby carrying out the error-predicting diagnosis periodically each time the fixing device 39 enters the preheating mode.

As described above, in the above-mentioned example, the error-predicting diagnosis on the hard disk 53b is carried out during the warm up time of the fixing device 39 that is a preparing period for outputting sheets of copy paper as well as during the preheating mode in the stand-by state. For this reason, it is possible to eliminate loss time required for the error-predicting diagnosis process. Further, since the error-predicting diagnosis is carried out each time the fixing device 39 enters the preheating mode, the error-predicting diagnosis process can be periodically carried out even with respect to a digital copying machine 1 whose power is always kept on.

Embodiment 22

Referring to a flow chart in FIG. 35, an explanation will be given of still another practical example for carrying out error-predicting processes with appropriate timing.

On the display screen of the operation panel unit 55, various image-editing functions are displayed so that the user can select desired editing functions.

Figure 35:
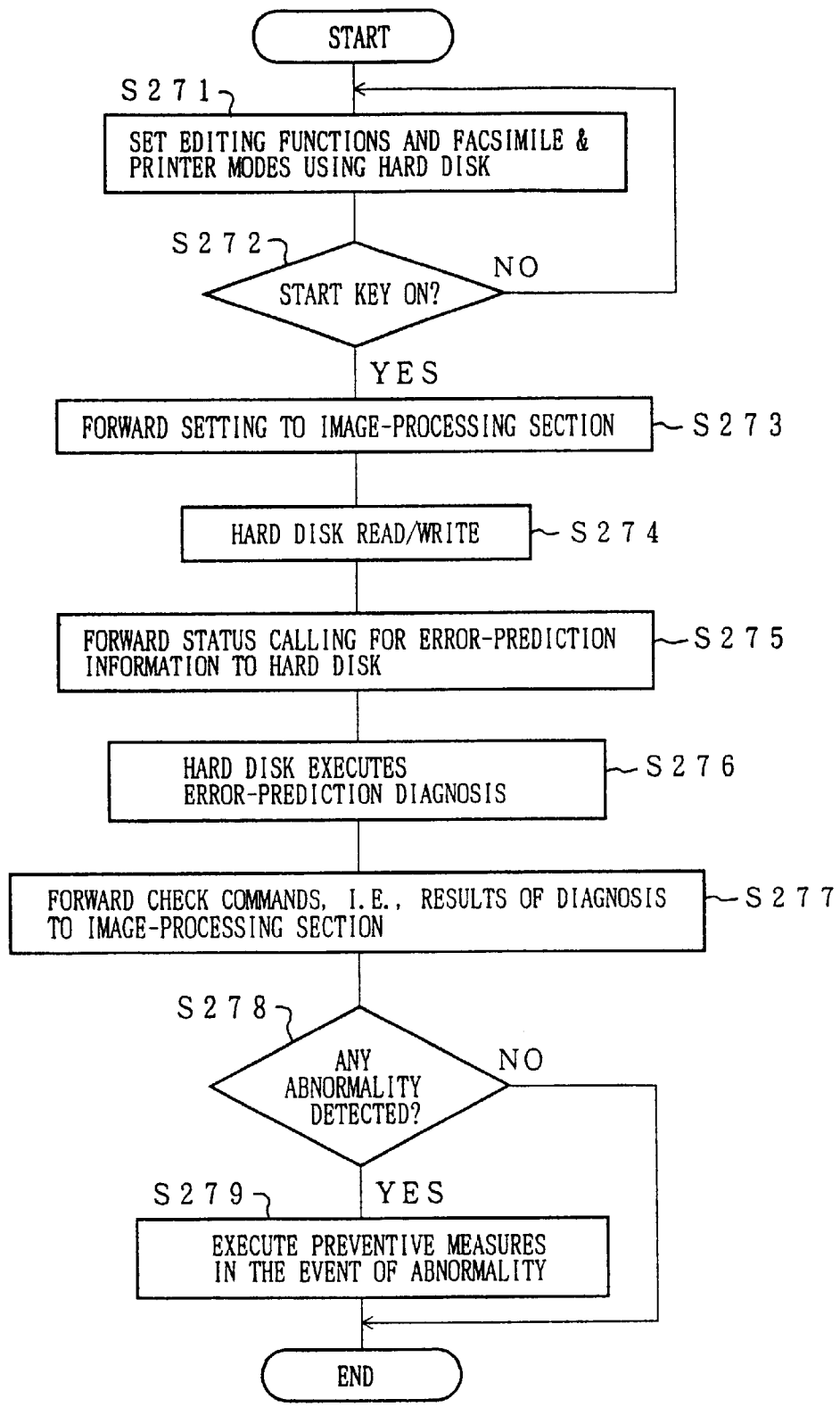
FIG. 35, which shows still another embodiment of the present invention, is a flow chart that shows timing in which error-prediction processing operations of the digital copying machine are carried out.

As illustrated in FIG. 35, in the case when, after one or some of the image-editing functions, such as electronic RDH, image-filing, image shift and compose, multi-shot (4 in 1), etc., that require the use of the hard disk 53b or facsimile and printer modes, etc. that use the hard disk 53b as an image memory, have been selected and setting is made with respect to these functions and modes (S271), the operation panel unit 55 forwards the contents of the setting to the image-processing section 54 (S273) when the start key is pressed after the setting (YES at S272).

In this case, the image-processing section 54 carries out a read or write operation on the hard disk 53b based upon the contents of the setting (S274). Upon completion of the read or write operation, the image-processing section 54 forwards the status calling for the error-predicting information to the hard disk 53b (S275).

In accordance with the status calling for the error-predicting information, the hard disk 53b carries out an error-predicting diagnosis process on the hard disk 53b (S276). After the completion of the error-prediction diagnosis process, the hard disk 53b forwards check commands that are the results of the error-predicting diagnosis to the image-processing section 54 (S277).

When the image-processing section 54 detects any abnormality from the check commands (YES at S278), a counter measure in the event of abnormality is carried out (S279). Further, when no abnormality is detected at S278, the sequence proceeds to S271. Here, with respect to the counter measure carried out at S279, one of the methods described in the embodiments 1 through 17 may be adopted, or a plurality of methods among those methods may be adopted in a combined manner.

As described above, in the above-mentioned embodiment, only in the case when one or some of the functions and modes requiring the use of the hard disk 53b are selected from the operation panel unit 55 and any operation is carried out on the hard disk 53b, the error-predicting diagnosis process is performed; therefore, the error-predicting diagnosis process is carried out more precisely so that the precision of the error-predicting diagnosis is more improved. Moreover, since the error-predicting diagnosis is performed each time an operation requiring the use of the hard disk 53b is carried out, it is possible to carry out the error-predicting diagnosis process periodically even with respect to a digital copying machine 1 whose power is normally kept on.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image-processing apparatus, which is used in an image-forming apparatus using a disk memory device as an image data memory, comprising:

error-predicting means for predicting any error in the disk memory device prior to the occurrence of the error in the disk memory device;

image outputting means which, in the case when any error is predicted in the disk memory device by the error-predicting means, outputs image data stored at an area in the disk memory device at which the error is predicted; and storing-device searching means which, in the case when image data is stored at the area in the disk memory device at which any error has been predicted, searches for another storing device to which the image data is forwarded, wherein the image-outputting means outputs and forwards the image data to the storing device that has been found by the storing-device searching means.

2. The image-processing apparatus as defined in claim 1, wherein upon outputting the image data stored at the area in the disk memory device at which the error is predicted, the image-outputting means adds to the image data message data which calls for the way in which the outputted data is to be dealt with.

3. An image-processing apparatus, which is used in an image-forming apparatus using a disk memory device as an image data memory, the disk memory device being provided with a data-storing region that are divided into a plurality of areas, comprising:

error-predicting means for predicting any error in the disk memory device for each of the divided areas in the disk memory device prior to the occurrence of the error in the disk memory device;

feature-extracting means for extracting a feature of image data to be stored in the disk memory device; and assigning means which, in the case when the error-predicting means has predicted any error in the disk memory device, assigns the image data to one of the areas to be stored in based upon the feature of the image data that has been extracted by the feature-extracting means.

4. The image-processing apparatus as defined in claim 3, wherein the assigning means, in the case when the feature-extracting means has made a judgement that the image data to be stored in the disk memory device is a half-tone image, assigns the image data to one of the areas to be stored in that is out of the area at which the error-predicting means has predicted any error in the disk memory device.

5. The image-processing apparatus as defined in claim 3, wherein the assigning means, in the case when the feature-extracting means has made a judgement that the image data to be stored in the disk memory device is a compressed image, assigns the image data to one of the areas to be stored in that is out of the area at which the error-predicting means has predicted any error in the disk memory device.

6. The image-processing apparatus as defined in claim 3, wherein the assigning means, in the case when the feature-extracting means has made a judgement that the image data to be stored in the disk memory is a character image, assigns the image data to one of the areas to be stored in that is within the area at which the error-predicting means has predicted any error in the disk memory device.

7. An image-processing apparatus, which is used in an image-forming apparatus using a disk memory device as an image data memory, the disk memory device being provided with a data-storing region that are divided into a plurality of areas, comprising:

error-predicting means for predicting any error in the disk memory device for each of the divided areas in the disk memory device prior to the occurrence of the error in the disk memory device;

feature-extracting means for extracting a feature of image data stored in the disk memory device; and data-shifting means for shifting image data stored in any area in the disk memory device to another area, wherein: in the case when the error-predicting means has predicted any error in the disk memory device, the feature-extracting means extracts a feature of image data stored in the area at which any error has been predicted by the error-predicting means, and the data-shifting means shifts the image data stored in the area at which the error has been predicted to another area in accordance with the feature of the image data that has been extracted.

8. The image-processing apparatus as defined in claim 7, wherein the data-shifting means, in the case when the feature-extracting means has made a judgement that image data stored in the area at which any error has been predicted in the disk memory device is a compressed image, shifts the image data to another area.

9. The image-processing apparatus as defined in claim 7, wherein the data-shifting means, in the case when the feature-extracting means has made a judgement that image data stored in the area at which any error has been predicted in the disk memory device is a half-tone image, shifts the image data to another area.

10. The image-processing apparatus as defined in claim 7, wherein the data-shifting means, in the case when the feature-extracting means has made a judgement that image data stored in the area at which any error has been predicted in the disk memory device is a character image, refrains from shifting the image data to another area.

11. An image-processing apparatus, which is used in an image-forming apparatus using a disk memory device as an image data memory, comprising:

error-predicting means for predicting any error in the disk memory device prior to the occurrence of the error in the disk memory device;

error-predicting-operation control means for controlling operations of the error-predicting means; and managing means for making a management as to whether or not functionn requiring the disk memory device are provided in the image-forming apparatus, wherein the error-predicting-operation control means, in the case when power is always applied to the image-forming apparatus, allows the error-predicting means to periodically operate at a predetermined time, and wherein the error-predicting-operation control means controls the operation of the error-predicting means based upon managing information managed by the managing means.

12. The image-processing apparatus as defined in claim 11, further comprising:

a time-counting means for counting a continuously operated time of the image-forming apparatus, wherein the error-predicting-operation control means allows the error-predicting means to operate every time a predetermined time has been counted by the time-counting means since the previous error-predicting operation.

13. The image-processing apparatus as defined in claim 11, wherein the error-predicting-operation control means allows the error-predicting means to operate every time the image-forming apparatus enters a preparatory period or a stand-by period for an image-forming operation.

14. The image-processing apparatus as defined in claim 11, wherein the error-predicting-operation control means allows the error-predicting means to operate after the image-forming apparatus has completed a predetermined image-processing operation by using the disk memory device.

15. An image-forming apparatus, which uses a disk memory-device as an image data memory, comprising:

error-predicting means for predicting any error in the disk memory device prior to the occurrence of the error in the disk memory device;

image-outputting means which, in the case when any error is predicted in the disk memory device by the error-predicting means, outputs image data stored at an area in the disk memory device at which the error is predicted;

storing-device searching means which, in the case when image data is stored at the area in the disk memory device at which any error has been predicted, searches for another storing device to which the image data is forwarded; and transfer-instructing means which, in the case when the storing-device searching means has found another storing device to which the image data is forwarded, gives an instruction for forwarding image data to the storing device, wherein upon receipt of the instruction for forwarding image information from the transfer-instructing means, the image-outputting means outputs and forwards the image data to the storing device specified as a destination in accordance with the contents of the instruction.

16. An image-forming apparatus, which uses a disk memory device as an image data memory, the disk memory device being provided with a data-storing region that are divided into a plurality of areas, comprising:

error-predicting means for predicting any error in the disk memory device for each of the divided areas in the disk memory device prior to the occurrence of the error in the disk memory device;

feature-extracting means for extracting a feature of image data to be stored in the disk memory device; and assigning means which, in the case when the error-predicting means has predicted any error in the disk memory device, assigns the image data to one of the areas to be stored in based upon the feature of the image data that has been extracted by the feature-extracting means.

17. An image-forming apparatus, which uses a disk memory device as an image data memory, the disk memory device being provided with a data-storing region that are divided into a plurality of areas, comprising:

error-predicting means for predicting any error in the disk memory device for each of the divided areas in the disk memory device prior to the occurrence of the error in the disk memory device;

feature-extracting means for extracting a feature of image data stored in the disk memory device; and data-shifting means for shifting image data stored in any area in the disk memory device to another area, wherein: in the case when the error-predicting means has predicted any error in the disk memory device, the feature-extracting means extracts a feature of image data stored in the area at which any error has been predicted by the error-predicting means, and the data-shifting means shifts the image data stored in the area at which the error has been predicted to another area in accordance with the feature of the image data that has been extracted.

* * * * *